United States Patent
Han et al.

(10) Patent No.: US 10,327,230 B2
(45) Date of Patent: *Jun. 18, 2019

(54) METHOD AND APPARATUS FOR TRANSMITTING CONTROL INFORMATION IN WIRELESS COMMUNICATION SYSTEM

(71) Applicant: LG Electronics Inc., Seoul (KR)

(72) Inventors: Seunghee Han, Anyang-si (KR); Jaehoon Chung, Anyang-si (KR); Sungho Moon, Anyang-si (KR); Moonil Lee, Anyang-si (KR); Hyunwoo Lee, Anyang-si (KR)

(73) Assignee: LG Electronics Inc., Seoul (KR)

( * ) Notice: Subject to any disclaimer, the term of this patent is extended or adjusted under 35 U.S.C. 154(b) by 204 days.

This patent is subject to a terminal disclaimer.

(21) Appl. No.: 15/380,290

(22) Filed: Dec. 15, 2016

(65) Prior Publication Data

US 2017/0164347 A1 Jun. 8, 2017

Related U.S. Application Data

(63) Continuation of application No. 14/459,048, filed on Aug. 13, 2014, now Pat. No. 9,554,374, which is a (Continued)

(30) Foreign Application Priority Data

Jan. 26, 2011 (KR) ........................ 10-2011-0007794

(51) Int. Cl.
*H04W 72/04* (2009.01)
*H04L 1/00* (2006.01)
(Continued)

(52) U.S. Cl.
CPC ...... *H04W 72/0406* (2013.01); *H04B 7/2621* (2013.01); *H04L 1/0027* (2013.01); (Continued)

(58) Field of Classification Search
CPC ... H04L 1/0027; H04L 1/1607; H04L 1/1854; H04L 1/1861; H04L 5/0007; H04L 5/001;
(Continued)

(56) References Cited

U.S. PATENT DOCUMENTS 7,830,837 B2 11/2010 Park et al.
7,996,029 B2 8/2011 Chun et al.
(Continued)

FOREIGN PATENT DOCUMENTS

CN 101588224 A 11/2009
EP 2525542 A2 11/2012
(Continued)

OTHER PUBLICATIONS

Ericsson, ST-Ericsson: "PUCCH transmission for Carrier Aggregation", 3GPP TSG RAN WG1 Meeting #58bis, R1-094273, Oct. 12-16, 2009.
(Continued)

*Primary Examiner* — Man U Phan
(74) *Attorney, Agent, or Firm* — Dentons US LLP

(57) ABSTRACT

The present invention relates to a wireless communication system. More particularly, the present invention relates to a method for transmitting acknowledgement/negative ACK (ACK/NACK) in a wireless communication system which supports carrier aggregation, and to an apparatus for the method. A method in which a terminal transmits ACK/NACK in a wireless communication system that supports carrier aggregation comprises the following steps: receiving one or more physical downlink shared channels (PDSCHs); and transmitting ACK/NACK for said one or more PDSCHs via a physical uplink control channel (PUCCH). A PUCCH format for transmitting ACK/NACK is selected by taking the type of the carrier in which said one or more PDSCHs are received into account.

10 Claims, 66 Drawing Sheets

Related U.S. Application Data continuation of application No. 13/575,939, filed as application No. PCT/KR2011/000718 on Feb. 1, 2011, now Pat. No. 8,837,414.

(60) Provisional application No. 61/301,160, filed on Feb. 3, 2010, provisional application No. 61/311,740, filed on Mar. 8, 2010, provisional application No. 61/315,024, filed on Mar. 18, 2010, provisional application No. 61/320,759, filed on Apr. 4, 2010, provisional application No. 61/321,771, filed on Apr. 7, 2010, provisional application No. 61/356,643, filed on Jun. 20, 2010, provisional application No. 61/412,362, filed on Nov. 10, 2010, provisional application No. 61/412,769, filed on Nov. 11, 2010, provisional application No. 61/412,405, filed on Nov. 11, 2010, provisional application No. 61/412,392, filed on Nov. 11, 2010, provisional application No. 61/412,794, filed on Nov. 12, 2010.

(51) Int. Cl.
*H04L 1/16* (2006.01)
*H04L 1/18* (2006.01)
*H04L 5/00* (2006.01)
*H04B 7/26* (2006.01)

(52) U.S. Cl.
CPC .......... *H04L 1/1607* (2013.01); *H04L 1/1854* (2013.01); *H04L 1/1861* (2013.01); *H04L 5/001* (2013.01); *H04L 5/0053* (2013.01); *H04L 5/0055* (2013.01); *H04L 5/0091* (2013.01); *H04W 72/0413* (2013.01); *H04L 5/0007* (2013.01)

(58) Field of Classification Search
CPC ... H04L 5/0053; H04L 5/0055; H04L 5/0091; H04L 5/00; H04B 7/2621; H04W 72/0413; H04W 72/0406; H04W 72/04
USPC ........................................................ 370/329
See application file for complete search history.

(56) References Cited

U.S. PATENT DOCUMENTS

| | | | |
|---|---|---|---|
| 8,320,337 B2 | 11/2012 | Noh et al. | |
| 8,446,859 B2* | 5/2013 | Kim | H04W 74/002 370/328 |
| 8,477,868 B2* | 7/2013 | Han | H04B 7/068 375/259 |
| 9,237,566 B2* | 1/2016 | Park | H04L 1/1861 |
| 2009/0245194 A1 | 10/2009 | Damnjanovic et al. | |
| 2010/0093073 A1* | 4/2010 | Erhardt | C12M 29/26 435/289.1 |
| 2010/0271970 A1* | 10/2010 | Pan | H04L 1/0026 370/252 |
| 2011/0026631 A1* | 2/2011 | Zhang | H04B 7/0613 375/267 |
| 2011/0243066 A1* | 10/2011 | Nayeb Nazar | H04L 1/007 370/328 |
| 2011/0268045 A1* | 11/2011 | Heo | H04L 1/0027 370/329 |
| 2012/0236767 A1* | 9/2012 | Zhu | H04W 52/325 370/280 |
| 2012/0257554 A1* | 10/2012 | Kim | H04L 5/001 370/280 |
| 2012/0300741 A1* | 11/2012 | Han | H04L 1/1854 370/329 |

FOREIGN PATENT DOCUMENTS

| | | |
|---|---|---|
| JP | 2009111780 A | 5/2009 |
| KR | 10-2009-0007129 | 1/2009 |
| KR | 10-2009-0016375 | 2/2009 |
| KR | 10-2009-0107559 | 10/2009 |
| WO | 2009118621 A2 | 10/2009 |
| WO | 2009119818 A1 | 10/2009 |

OTHER PUBLICATIONS

Ericsson, ST-Ericsson: "PUCCH design for carrier aggregation", 3GPP TSG-RAN WG1 #60bis, R1-101730, Apr. 12-16, 2010.
3GPP TS 36.211 V8.9.0 (Dec. 2009), 3rd Generation Partnership Project; Technical Specification Group Radio Access Network; Evolved Universal Terrestrial Radio Access (E-UTRA); Physical Channels and Modulation (Release 8), XP050400542.
R1-100044: 3GPP TSG-RAN WG1 #59bis, Valencia, Spain, Jan. 18-22, 2010. "A/N transmission in the uplink for carrier aggregation" Source:Ericsson, St-Ericsson.
LG Electronics, UL ACK/NACK PUCCH design in LTE-Advanced, 3GPP TSG RAN WG1 #59bis, R1-100215, Valencia, Spain, Jan. 18-22, 2010.
LG Electronics, ACK/NACK resource allocation in LTE-A, 3GPP TSG-RAN WG1#61, R1-103397, May 14, 2010.
Ericsson, ST-Ericsson, on PUCCH resource allocation for carrier aggregation, 3GPP TSG-RAN WG1#60, R1-100845, Feb. 16, 2010.
CATT, UL ACK/NACK multiplexing methods for LTE-A, 3GPP TSG-RAN WG1#61, R1-102643, May 14, 2010.

\* cited by examiner

PUCCH format 1a and 1b structure (normal CP case)

PUCCH format 1a and 1b structure (extended CP case)

PUCCH format 2,2a and 2b structure (normal CP case)

PUCCH format 2,2a and 2b structure (extended CP case)

FIG. 17

Resource allocation: 18 ACK/NACK channels with normal CP $\triangle_{shift}^{PUCCH} = 2$

| Cell specific cyclic shift offset | | RS orthogonal cover | | | ACK/NACK orthogonal cover | | |
|---|---|---|---|---|---|---|---|
| $\delta_{offset}^{PUCCH} = 1$ | $\delta_{offset}^{PUCCH} = 0$ | $\bar{n}_{OC} = 0$ | $\bar{n}_{OC} = 1$ | $\bar{n}_{OC} = 2$ | $n_{OC} = 0$ | $n_{OC} = 1$ | $n_{OC} = 2$ |
| | $n_{CS} = 0$ | n'=0 | | 12 | n'=0 | | 12 |
| 2 | 1 | | 6 | 13 | | 6 | 13 |
| 3 | 2 | 1 | 7 | 14 | 1 | 7 | 14 |
| 4 | 3 | 2 | 8 | 15 | 2 | 8 | 15 |
| 5 | 4 | 3 | 9 | 16 | 3 | 9 | 16 |
| 6 | 5 | 4 | 10 | 17 | 4 | 10 | 17 |
| 7 | 6 | 5 | 11 | | 5 | 11 | |
| 8 | 7 | | | | | | |
| 9 | 8 | | | | | | |
| 10 | 9 | | | | | | |
| 11 | 10 | | | | | | |
| 0 | 11 | | | | | | |

$\triangle_{shift}^{PUCCH} \in \{\{1,2,3\} \text{ for normal cyclic prefix}, \{1,2,3\} \text{ for extended cyclic prefix}\}$ $\delta_{offset}^{PUCCH} \in \{0,1,...,\triangle_{shift}^{PUCCH} - 1\}$ Cell specific cyclic shift offset $n_{OC}$ — Orthogonal sequence index for ACK/NACK
$\bar{n}_{OC}$ — Orthogonal sequence index for RS
$n_{CS}$ — Cyclic shift value of a CAZAC sequence
n' — ACK/NACK resource index used for the channelization in a RB Cell-specific Cyclic shift value of CAZAC sequence Reuse of LTE PUCCH format 2 structure (normal CP case)

Reuse of LTE PUCCH format 2 structure (extended CP case)

FIG. 35A

Orthogonal code index

| Subcarrier index | 0 | 1 | 2 | 3 |
|---|---|---|---|---|
| 0 | 0 | 1 | 2 | 3 |
| 1 | 0 | 1 | 2 | 3 |
| 2 | 0 | 1 | 2 | 3 |
| 3 | 0 | 1 | 2 | 3 |
| 4 | 0 | 1 | 2 | 3 |
| 5 | 0 | 1 | 2 | 3 |
| 6 | 0 | 1 | 2 | 3 |
| 7 | 0 | 1 | 2 | 3 |
| 8 | 0 | 1 | 2 | 3 |
| 9 | 0 | 1 | 2 | 3 |
| 10 | 0 | 1 | 2 | 3 |
| 11 | 0 | 1 | 2 | 3 |

When frequency factor = 1

FIG. 35B

Orthogonal code index

May not be able to be used due to the limitation from RS multiplexing

| Subcarrier index | 0 | 1 | 2 | 3 |
|---|---|---|---|---|
| 0 | 0 | 1 | 2 | 3 |
| 1 | 0 | 1 | 2 | 3 |
| 2 | 0 | 1 | 2 | 3 |
| 3 | 0 | 1 | 2 | 3 |
| 4 | 0 | 1 | 2 | 3 |
| 5 | 0 | 1 | 2 | 3 |
| 6 | 0 | 1 | 2 | 3 |
| 7 | 0 | 1 | 2 | 3 |
| 8 | 0 | 1 | 2 | 3 |
| 9 | 0 | 1 | 2 | 3 |
| 10 | 0 | 1 | 2 | 3 |
| 11 | 0 | 1 | 2 | 3 |

When frequency factor = 1

FIG. 36A

Orthogonal code index

| Subcarrier index | 0 | 1 | 2 | 3 |
|---|---|---|---|---|
| 0 | 0 | 2 | 4 | 6 |
| 1 | 1 | 3 | 5 | 7 |
| 2 | 0 | 2 | 4 | 6 |
| 3 | 1 | 3 | 5 | 7 |
| 4 | 0 | 2 | 4 | 6 |
| 5 | 1 | 3 | 5 | 7 |
| 6 | 0 | 2 | 4 | 6 |
| 7 | 1 | 3 | 5 | 7 |
| 8 | 0 | 2 | 4 | 6 |
| 9 | 1 | 3 | 5 | 7 |
| 10 | 0 | 2 | 4 | 6 |
| 11 | 1 | 3 | 5 | 7 |

When frequency factor = 2

FIG. 36B

May not be able to be used due to the limitation from RS multiplexing

Orthogonal code index

| Subcarrier index | 0 | 1 | 2 | 3 |
|---|---|---|---|---|
| 0 | 0 | 2 | 4 | 6 |
| 1 | 1 | 3 | 5 | 7 |
| 2 | 0 | 2 | 4 | 6 |
| 3 | 1 | 3 | 5 | 7 |
| 4 | 0 | 2 | 4 | 6 |
| 5 | 1 | 3 | 5 | 7 |
| 6 | 0 | 2 | 4 | 6 |
| 7 | 1 | 3 | 5 | 7 |
| 8 | 0 | 2 | 4 | 6 |
| 9 | 1 | 3 | 5 | 7 |
| 10 | 0 | 2 | 4 | 6 |
| 11 | 1 | 3 | 5 | 7 |

When frequency factor = 2

FIG. 37A

Orthogonal code index

| Subcarrier index | 0 | 1 | 2 | 3 |
|---|---|---|---|---|
| 0 | 0 | 3 | 6 | 9 |
| 1 | 1 | 4 | 7 | 10 |
| 2 | 2 | 5 | 8 | 11 |
| 3 | 0 | 3 | 6 | 9 |
| 4 | 1 | 4 | 7 | 10 |
| 5 | 2 | 5 | 8 | 11 |
| 6 | 0 | 3 | 6 | 9 |
| 7 | 1 | 4 | 7 | 10 |
| 8 | 2 | 5 | 8 | 11 |
| 9 | 0 | 3 | 6 | 9 |
| 10 | 1 | 4 | 7 | 10 |
| 11 | 2 | 5 | 8 | 11 |

When frequency factor = 3

FIG. 37B

May not be able to be used due to the limitation from RS multiplexing

Orthogonal code index

| Subcarrier index | 0 | 1 | 2 | 3 |
|---|---|---|---|---|
| 0 | 0 | 3 | 6 | 9 |
| 1 | 1 | 4 | 7 | 10 |
| 2 | 2 | 5 | 8 | 11 |
| 3 | 0 | 3 | 6 | 9 |
| 4 | 1 | 4 | 7 | 10 |
| 5 | 2 | 5 | 8 | 11 |
| 6 | 0 | 3 | 6 | 9 |
| 7 | 1 | 4 | 7 | 10 |
| 8 | 2 | 5 | 8 | 11 |
| 9 | 0 | 3 | 6 | 9 |
| 10 | 1 | 4 | 7 | 10 |
| 11 | 2 | 5 | 8 | 11 |

When frequency factor = 3

FIG. 38A

Orthogonal code index

| Subcarrier index | 0 | 1 | 2 | 3 |
|---|---|---|---|---|
| 0 | 0 | 4 | 8 | 12 |
| 1 | 1 | 5 | 9 | 13 |
| 2 | 2 | 6 | 10 | 14 |
| 3 | 3 | 7 | 11 | 15 |
| 4 | 0 | 4 | 8 | 12 |
| 5 | 1 | 5 | 9 | 13 |
| 6 | 2 | 6 | 10 | 14 |
| 7 | 3 | 7 | 11 | 15 |
| 8 | 0 | 4 | 8 | 12 |
| 9 | 1 | 5 | 9 | 13 |
| 10 | 2 | 6 | 10 | 14 |
| 11 | 3 | 7 | 11 | 15 |

When frequency factor = 4

FIG. 38B

May not be able to be used due to the limitation from RS multiplexing

Orthogonal code index

| Subcarrier index | 0 | 1 | 2 | 3 |
|---|---|---|---|---|
| 0 | 0 | 4 | 8 | 12 |
| 1 | 1 | 5 | 9 | 13 |
| 2 | 2 | 6 | 10 | 14 |
| 3 | 3 | 7 | 11 | 15 |
| 4 | 0 | 4 | 8 | 12 |
| 5 | 1 | 5 | 9 | 13 |
| 6 | 2 | 6 | 10 | 14 |
| 7 | 3 | 7 | 11 | 15 |
| 8 | 0 | 4 | 8 | 12 |
| 9 | 1 | 5 | 9 | 13 |
| 10 | 2 | 6 | 10 | 14 |
| 11 | 3 | 7 | 11 | 15 |

When frequency factor = 4

FIG. 39A

Orthogonal code index

| Subcarrier index | 0 | 1 | 2 | 3 |
|---|---|---|---|---|
| 0 | 0 | 6 | 12 | 18 |
| 1 | 1 | 7 | 13 | 19 |
| 2 | 2 | 8 | 14 | 20 |
| 3 | 3 | 9 | 15 | 21 |
| 4 | 4 | 10 | 16 | 22 |
| 5 | 5 | 11 | 17 | 23 |
| 6 | 0 | 6 | 12 | 18 |
| 7 | 1 | 7 | 13 | 19 |
| 8 | 2 | 8 | 14 | 20 |
| 9 | 3 | 9 | 15 | 21 |
| 10 | 4 | 10 | 16 | 22 |
| 11 | 5 | 11 | 17 | 23 |

When frequency factor = 6

FIG. 39B

May not be able to be used due to the limitation from RS multiplexing

Orthogonal code index

| Subcarrier index | 0 | 1 | 2 | 3 |
|---|---|---|---|---|
| 0 | 0 | 6 | 12 | 18 |
| 1 | 1 | 7 | 13 | 19 |
| 2 | 2 | 8 | 14 | 20 |
| 3 | 3 | 9 | 15 | 21 |
| 4 | 4 | 10 | 16 | 22 |
| 5 | 5 | 11 | 17 | 23 |
| 6 | 0 | 6 | 12 | 18 |
| 7 | 1 | 7 | 13 | 19 |
| 8 | 2 | 8 | 14 | 20 |
| 9 | 3 | 9 | 15 | 21 |
| 10 | 4 | 10 | 16 | 22 |
| 11 | 5 | 11 | 17 | 23 |

When frequency factor = 6

FIG. 40A

Orthogonal code index

| Subcarrier index | 0 | 1 | 2 | 3 |
|---|---|---|---|---|
| 0 | 0 | 12 | 24 | 36 |
| 1 | 1 | 13 | 25 | 37 |
| 2 | 2 | 14 | 26 | 38 |
| 3 | 3 | 15 | 27 | 39 |
| 4 | 4 | 16 | 28 | 40 |
| 5 | 5 | 17 | 29 | 41 |
| 6 | 6 | 18 | 30 | 42 |
| 7 | 7 | 19 | 31 | 43 |
| 8 | 8 | 20 | 32 | 44 |
| 9 | 9 | 21 | 33 | 45 |
| 10 | 10 | 22 | 34 | 46 |
| 11 | 11 | 23 | 35 | 47 |

When frequency factor = 12

FIG. 40B

Orthogonal code index (column 3: May not be able to be used due to the limitation from RS multiplexing)

| Subcarrier index | 0 | 1 | 2 | 3 |
|---|---|---|---|---|
| 0 | 0 | 12 | 24 | 36 |
| 1 | 1 | 13 | 25 | 37 |
| 2 | 2 | 14 | 26 | 38 |
| 3 | 3 | 15 | 27 | 39 |
| 4 | 4 | 16 | 28 | 40 |
| 5 | 5 | 17 | 29 | 41 |
| 6 | 6 | 18 | 30 | 42 |
| 7 | 7 | 19 | 31 | 43 |
| 8 | 8 | 20 | 32 | 44 |
| 9 | 9 | 21 | 33 | 45 |
| 10 | 10 | 22 | 34 | 46 |
| 11 | 11 | 23 | 35 | 47 |

When frequency factor = 12

FIG. 41

Orthogonal code index

| Subcarrier index | 0 | 1 | 2 | 3 |
|---|---|---|---|---|
| 0 | 0 | 5 | 7 | 9 |
| 1 | 1 | 3 | 8 | 10 |
| 2 | 2 | 4 | 6 | 11 |
| 3 | 0 | 5 | 7 | 9 |
| 4 | 1 | 3 | 8 | 10 |
| 5 | 2 | 4 | 6 | 11 |
| 6 | 0 | 5 | 7 | 9 |
| 7 | 1 | 3 | 8 | 10 |
| 8 | 2 | 4 | 6 | 11 |
| 9 | 0 | 5 | 7 | 9 |
| 10 | 1 | 3 | 8 | 10 |
| 11 | 2 | 4 | 6 | 11 |

When frequency factor = 3

FIG. 42A

Orthogonal code index

| Subcarrier index | 0 | 1 | 2 |
|---|---|---|---|
| 0 | 0 | 12 | 24 |
| 1 | 1 | 13 | 25 |
| 2 | 2 | 14 | 26 |
| 3 | 3 | 15 | 27 |
| 4 | 4 | 16 | 28 |
| 5 | 5 | 17 | 29 |
| 6 | 6 | 18 | 30 |
| 7 | 7 | 19 | 31 |
| 8 | 8 | 20 | 32 |
| 9 | 9 | 21 | 33 |
| 10 | 10 | 22 | 34 |
| 11 | 11 | 23 | 35 | when $\Delta_{shift}^{PUCCH}=1$

FIG. 42B

Orthogonal code index

| Subcarrier index | 0 | 1 | 2 |
|---|---|---|---|
| 0 | 0 |  | 12 |
| 1 |  | 6 |  |
| 2 | 1 |  | 13 |
| 3 |  | 7 |  |
| 4 | 2 |  | 14 |
| 5 |  | 8 |  |
| 6 | 3 |  | 15 |
| 7 |  | 9 |  |
| 8 | 4 |  | 16 |
| 9 |  | 10 |  |
| 10 | 5 |  | 17 |
| 11 |  | 11 |  | when $\Delta_{shift}^{PUCCH}=2$

FIG. 42C when $\Delta_{shift}^{PUCCH} = 3$

FIG. 42D when $\Delta_{shift}^{PUCCH} = 4$

FIG. 42E

Orthogonal code index

| Subcarrier index | 0 | 1 | 2 |
|---|---|---|---|
| 0 | 0 | | |
| 1 | | 2 | |
| 2 | | | 4 |
| 3 | | | |
| 4 | | | |
| 5 | | | |
| 6 | 1 | | |
| 7 | | 3 | |
| 8 | | | 5 |
| 9 | | | |
| 10 | | | |
| 11 | | | | when $\Delta_{shift}^{PUCCH} = 6$

FIG. 42DF

Orthogonal code index

| Subcarrier index | 0 | 1 | 2 |
|---|---|---|---|
| 0 | 0 | | |
| 1 | | 1 | |
| 2 | | | 2 |
| 3 | | | |
| 4 | | | |
| 5 | | | |
| 6 | | | |
| 7 | | | |
| 8 | | | |
| 9 | | | |
| 10 | | | |
| 11 | | | | when $\Delta_{shift}^{PUCCH} = 12$

METHOD AND APPARATUS FOR TRANSMITTING CONTROL INFORMATION IN WIRELESS COMMUNICATION SYSTEM

This application is a continuation of U.S. application Ser. No. 14/459,048 filed Aug. 13, 2014, which is a continuation of U.S. application Ser. No. 13/575,939 filed Jul. 27, 2012 (now issued as U.S. Pat. No. 8,837,414), which is a National Stage International Application of PCT/KR2011/000718, filed Feb. 1, 2011, and claims the benefit of U.S. Provisional Nos. 61/301,160, filed Feb. 3, 2010, 61/311,740, filed Mar. 8, 2010, 61/315,024, filed Mar. 18, 2010, 61/320,759, filed Apr. 4, 2010, 61/321,771, filed Apr. 7, 2010, 61/356,643, filed Jun. 20, 2010, 61/412,362, filed Nov. 10, 2010, 61/412,769, Nov. 11, 2010, 61/412,405, Nov. 11, 2010, 61/412,392, Nov. 11, 2010, 61/412,794, Nov. 12, 2010, and Korean Patent Application No. 10-2011-0007794, filed on Jan. 26, 2011, all of which are hereby incorporated by reference for all purposes as if fully set forth herein.

TECHNICAL FIELD

The present invention relates to a wireless communication system and, more particularly, to a method and apparatus for transmitting control information. The wireless communication system can support carrier aggregation (CA).

BACKGROUND ART

Extensive research has been conducted to provide various types of communication services including voice and data services in wireless communication systems. In general, a wireless communication system is a multiple access system that supports communication with multiple users by sharing available system resources (e.g. bandwidth, transmission power, etc.) among the multiple users. The multiple access system may adopt a multiple access scheme such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc.

DISCLOSURE

Technical Problem

An object of the present invention is to provide a method and apparatus for efficiently transmitting control information in a wireless communication system. Another object of the present invention is to provide a channel format, signal processing method and apparatus for efficiently transmitting control information. Another object of the present invention is to provide a method and apparatus for efficiently allocating resources for transmitting control information.

It will be appreciated by persons skilled in the art that the objects that could be achieved with the present invention are not limited to what has been particularly described hereinabove and the above and other objects that the present invention could achieve will be more clearly understood from the following detailed description taken in conjunction with the accompanying drawings.

Technical Solution

In another aspect of the present invention, there is provided a method for, at a user equipment (UE), transmitting ACK/NACK (Acknowledgement/Negative ACK) in a wireless communication system where carrier aggregation is configured, the method including: receiving one or more physical downlink shared channels (PDSCHs); and transmitting ACK/NACK for the one or more PDSCHs via a physical uplink control channel (PUCCH), wherein the PUCCH format for ACK/NACK transmission is selected in consideration of the type of a carrier in which the one or more PDSCHs are received.

The PUCCH format for ACK/NACK transmission may be selected in further consideration of the number of the one or more PDSCHs.

If the number of the PDSCHs is 1 and the PDSCH is received through a primary carrier, the ACK/NACK may be transmitted using a first PUCCH format, and if the number of the PDSCHs is 2 or greater or the PDSCHs are received through a secondary carrier, the ACK/NACK may be transmitted using a second PUCCH format.

If the ACK/NACK may be transmitted using the first PUCCH format, a sequence generated by a root sequence and a cyclic shift is used, and if the ACK/NACK is transmitted using the second PUCCH format, a discrete Fourier transform (DFT) is used.

The method may further include receiving one or more physical downlink control channels (PDCCHs) which indicate the one or more PDSCHs, wherein the ACK/NACK is transmitted using a first PUCCH format if the number of the PDCCH is 1 and both the PDCCH and a PDSCH corresponding to the PDCCH are received through a primary carrier, wherein the ACK/NACK is transmitted using a second PUCCH format if the number of PDCCHs is 2 or greater and the PDCCHs are received through a secondary carrier, or if the PDCCHs and the PDSCHs corresponding to the PDCCHs are received through different carriers.

In another aspect of the present invention, there is provided a UE configured to transmit ACK/NACK in a wireless communication system where carrier aggregation is configured, the UE including: a radio frequency (RF) unit; and a processor, wherein the processor is configured to receive one or more PDSCHs and to transmit ACK/NACK for the one or more PDSCHs via a PUCCH, wherein the PUCCH format for ACK/NACK transmission is selected in consideration of the type of a carrier in which the one or more PDSCHs are received.

The PUCCH format for ACK/NACK transmission may be selected in further consideration of the number of the one or more PDSCHs.

If the number of PDSCHs is 1 and the PDSCH is received through a primary carrier, the ACK/NACK may be transmitted using a first PUCCH format, and if the number of PDSCHs are 2 or greater or the PDSCHs are received through a secondary carrier, the ACK/NACK may be transmitted using a second PUCCH format.

If the ACK/NACK may be transmitted using the first PUCCH format, a sequence generated by a root sequence and a cyclic shift is used, and if the ACK/NACK is transmitted using the second PUCCH format, a discrete Fourier transform (DFT) is used.

The processor may be further configured to receive one or more PDCCHs which indicate the one or more PDSCHs, wherein the ACK/NACK is transmitted using a first PUCCH format if the number of the PDCCHs is 1 and both the PDCCH and the PDSCH corresponding to the PDCCH are received through a primary carrier, wherein the ACK/NACK is transmitted using a second PUCCH format if the number of the PDCCHs is 2 or greater and the PDCCHs are received through a secondary carrier, or if the PDCCHs and PDSCHs corresponding to the PDCCHs are received through different carriers.

Advantageous Effects

According to embodiments of the present invention, control information can be efficiently transmitted in a wireless communication system. Furthermore, a channel format and a signal processing method for efficiently transmitting control information can be provided. In addition, resources for control information transmission can be efficiently allocated.

It will be appreciated by persons skilled in the art that that the effects that could be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 17 illustrates ACK/NACK channelization for PUCCH formats 1a and 1b;

FIGS. 35A-B, 36A-B, 37A-B, 38A-B, 39A-B, 40A-B, 41 and 42A-F illustrate PUCCH resources according to an embodiment of the present invention;

BEST MODE

Embodiments of the present invention are applicable to a variety of wireless access technologies such as Code Division Multiple Access (CDMA), Frequency Division Multiple Access (FDMA), Time Division Multiple Access (TDMA), Orthogonal Frequency Division Multiple Access (OFDMA), Single Carrier Frequency Division Multiple Access (SC-FDMA), etc. CDMA can be implemented as a wireless technology such as Universal Terrestrial Radio Access (UTRA) or CDMA2000. TDMA can be implemented as a wireless technology such as Global System for Mobile communications (GSM)/General Packet Radio Service (GPRS)/Enhanced Data Rates for GSM Evolution (EDGE). OFDMA can be implemented as a wireless technology such as Institute of Electrical and Electronics Engineers (IEEE) 802.11 (Wireless Fidelity (Wi-Fi)), IEEE 802.16 (Worldwide interoperability for Microwave Access (WiMAX)), IEEE 802.20, Evolved UTRA (E-UTRA). UTRA is a part of Universal Mobile Telecommunications System (UMTS). 3$^{rd}$ Generation Partnership Project (3GPP) Long Term Evolution (LTE) is a part of Evolved UMTS (E-UMTS) using E-UTRA. LTE-Advanced (LTE-A) is an evolution of 3GPP LTE. While the following description is given, centering on 3GPP LTE/LTE-A for clarity of description, this is purely exemplary and thus should not be construed as limiting the present invention.

In a wireless communication system, a UE receives information from a BS through downlink and transmits information to the BS through uplink. Information transmitted and received between the BS and the UE includes data and various types of control information. Various physical channels are present according to type/usage of information transmitted and received between the BS and the UE.

Figure 1:
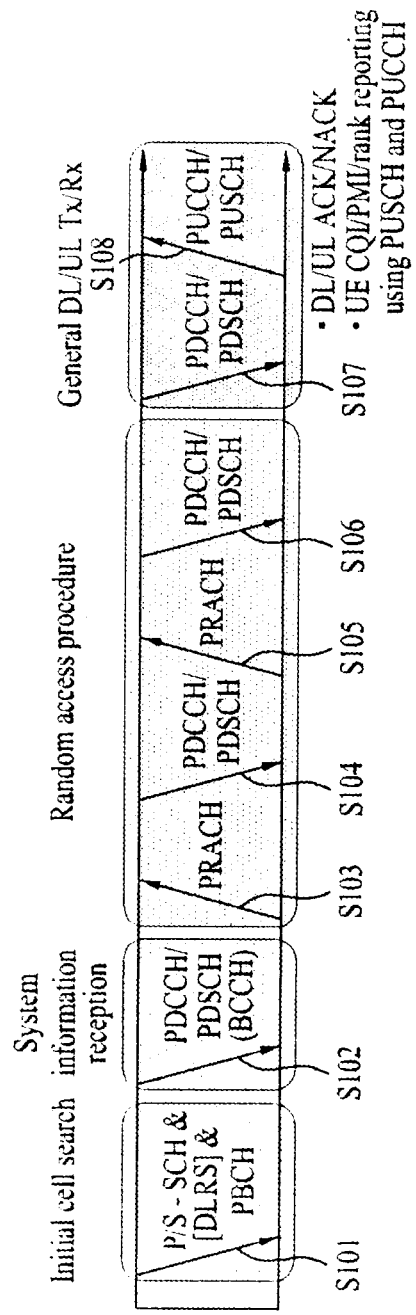
FIG. 1 illustrates physical channels used in a 3GPP LTE system and a signal transmission method using the same.

FIG. 1 illustrates physical channels used in a 3GPP LTE system and a signal transmission method using the same.

When powered on or when a UE initially enters a cell, the UE performs initial cell search involving synchronization with a BS in step S101. For initial cell search, the UE may be synchronized with the BS and acquire information such as a cell Identifier (ID) by receiving a Primary Synchronization Channel (P-SCH) and a Secondary Synchronization Channel (S-SCH) from the BS. Then the UE may receive broadcast information from the cell on a Physical Broadcast Channel (PBCH). In the mean time, the UE may determine a downlink channel status by receiving a Downlink Reference Signal (DL RS) during initial cell search.

After initial cell search, the UE may acquire more specific system information by receiving a Physical Downlink Control Channel (PDCCH) and receiving a Physical Downlink Shared Channel (PDSCH) based on information of the PDCCH in step S102.

The UE may perform a random access procedure to access the BS in steps S103 to S106. For random access, the UE may transmit a preamble to the BS on a Physical Random Access Channel (PRACH) (S103) and receive a response message for preamble on a PDCCH and a PDSCH corresponding to the PDCCH (S104). In the case of contention-based random access, the UE may perform a contention resolution procedure by further transmitting the PRACH (S105) and receiving a PDCCH and a PDSCH corresponding to the PDCCH (S106).

After the foregoing procedure, the UE may receive a PDCCH/PDSCH (S107) and transmit a Physical Uplink Shared Channel (PUSCH)/Physical Uplink Control Channel (PUCCH) (S108), as a general downlink/uplink signal transmission procedure. Here, control information transmitted from the UE to the BS is called uplink control information (UCI). The UCI may include a Hybrid Automatic Repeat and request Acknowledgement/Negative-ACK (HARQ ACK/NACK) signal, scheduling request (SR), a Channel Quality Indicator (CQI), a Precoding Matrix Index (PMI), a Rank Indication (RI), etc. While the UCI is transmitted through a PUCCH in general, it may be transmitted through a PUSCH when control information and traffic data need to be simultaneously transmitted. The UCI may be aperiodically transmitted through a PUSCH at the request/instruction of a network.

Figure 2:
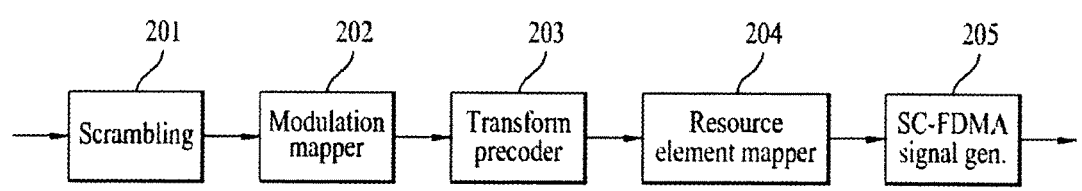
FIG. 2 illustrates an uplink signal processing procedure.

FIG. 2 illustrates a signal processing procedure through which a UE transmits an uplink signal.

To transmit the uplink signal, a scrambling module 210 of the UE may scramble the uplink signal using a UE-specific scramble signal. The scrambled signal is input to a modulation mapper 220 in which the scrambled signal is modulated into complex symbols using Binary Phase Shift Keying (BPSK), Quadrature Phase Shift Keying (QPSK) or 16-Quadrature amplitude Modulation (QAM)/64-QAM according to signal type and/or channel status. The modulated complex symbols are processed by a transform precoder 230, and then applied to a resource element mapper 240. The resource element mapper 240 may map the complex symbols to time-frequency resource elements. The signal processed in this manner may be subjected to an SC-FDMA signal generator 250 and transmitted to a BS through an antenna.

Figure 3:
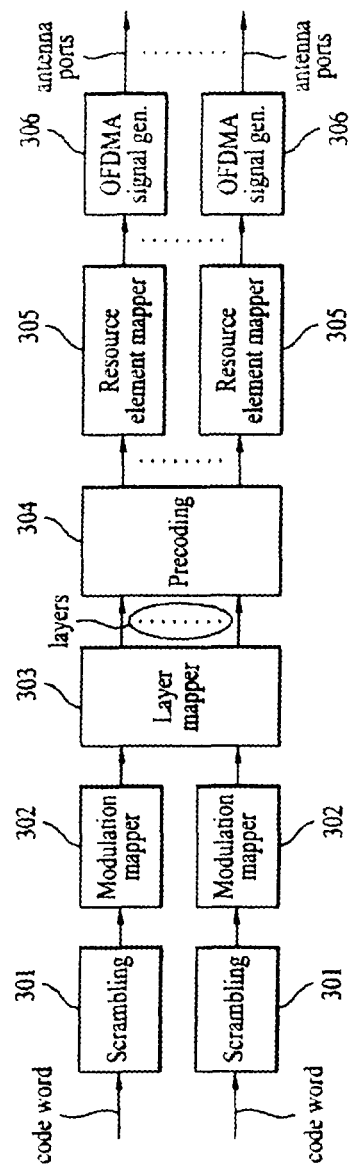
FIG. 3 illustrates a downlink signal processing procedure.

FIG. 3 illustrates a signal processing procedure through which the BS transmits a downlink signal.

In a 3GPP LTE system, the BS may transmit one or more codewords on downlink. The codewords may be processed into complex symbols through a scrambling module 301 and a modulation mapper 302 as in the uplink shown in FIG. 2. Then, the complex symbols are mapped to a plurality of layers by a layer mapper 303. The layers may be multiplied by a precoding matrix in a precoding module 304 and allocated to transport antennas. The processed signals for the respective antennas may be mapped to time-frequency resource elements by a resource element mapper 305 and subjected to an OFDM signal generator 306 to be transmitted through the antennas.

When the UE transmits an uplink signal in a wireless communication system, a peak-to-average ratio (PAPR) becomes a problem, as compared to a case in which the BS transmits a downlink signal. Accordingly, uplink signal transmission uses SC-FDMA while downlink signal transmission uses OFDMA, as described above with reference to FIGS. 2 and 3.

Figure 4:
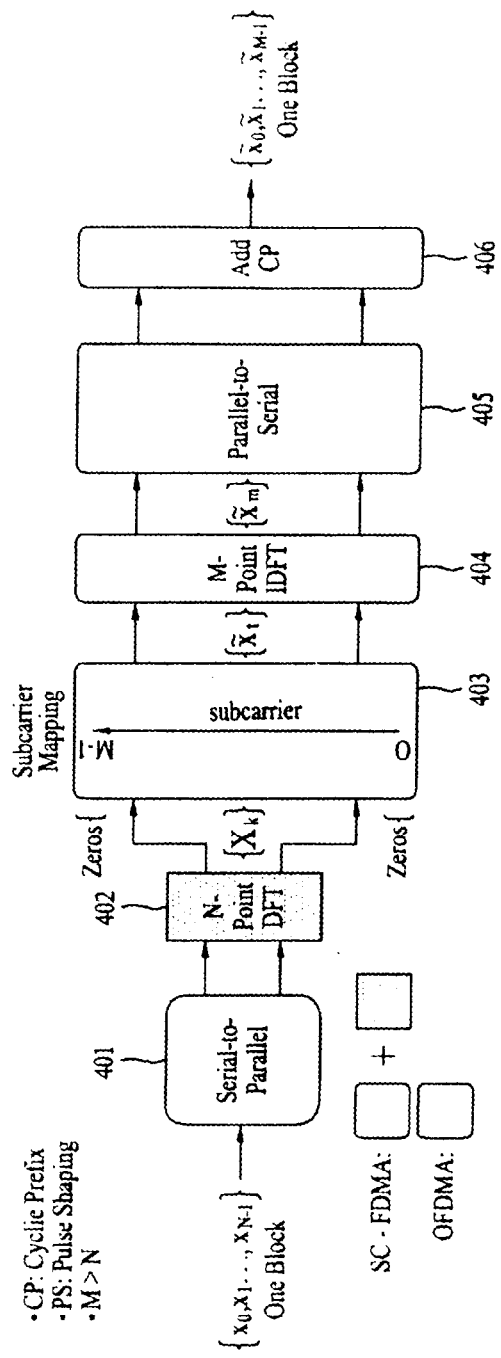
FIG. 4 illustrates SC-FDMA and OFDMA schemes.

FIG. 4 illustrates SC-FDMA and OFDMA schemes. The 3GPP system employs OFDMA in downlink and uses SC-FDMA in uplink.

Referring to FIG. 4, both a UE for transmitting an uplink signal and a BS for transmitting a downlink signal include a serial-to-parallel converter 401, a subcarrier mapper 403, an M-point IDFT module 404, and a cyclic prefix (CP) adder 406. The UE for transmitting a signal according to SC-FDMA additionally includes an N-point DFT module 402.

Figure 5A:
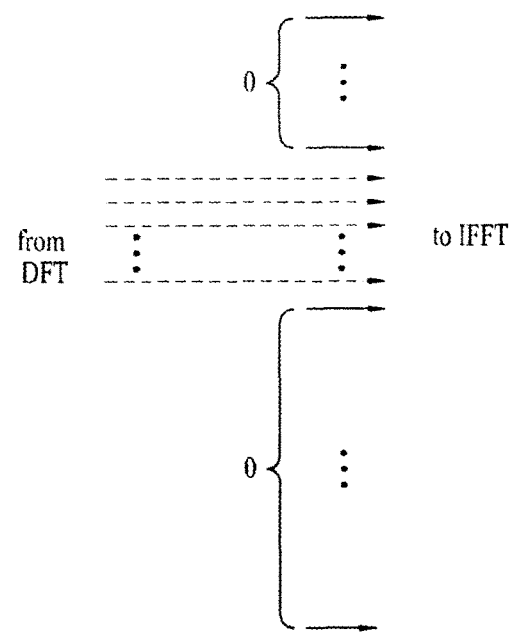
FIGS. 5A-B illustrate a signal mapping schemes in a frequency domain, which satisfies single carrier property.
Figure 5B:
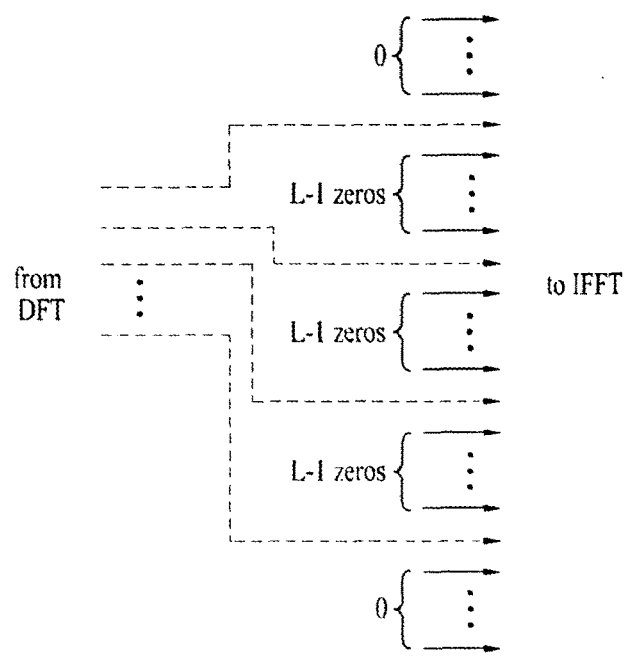

FIG. 5 illustrates a signal mapping scheme in a frequency domain, which satisfies single carrier property. FIG. 5(a) illustrates a localized mapping scheme and FIG. 5B illustrates a distributed mapping scheme.

Clustered SC-FDMA, which is a modified version of SC-FDMA, will now be described. Clustered SC-FDMA divides DFT process output samples into sub-groups in a subcarrier mapping process and discretely maps the sub-groups to the frequency domain (or subcarrier domain).

Figure 6:
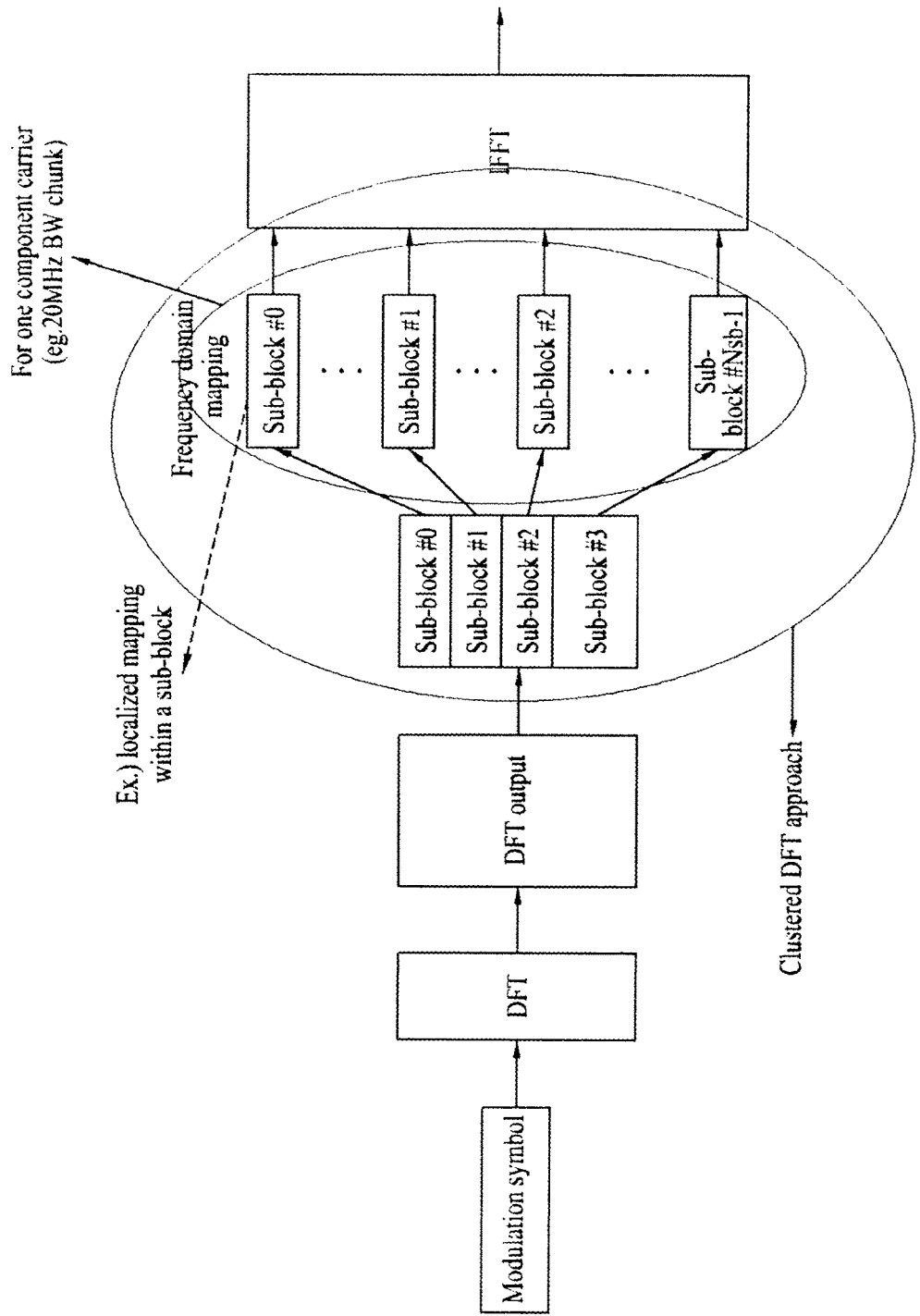
FIG. 6 illustrates a signal processing procedure of mapping DFT process output samples to a single carrier in clustered SC-FDMA.
Figure 7:
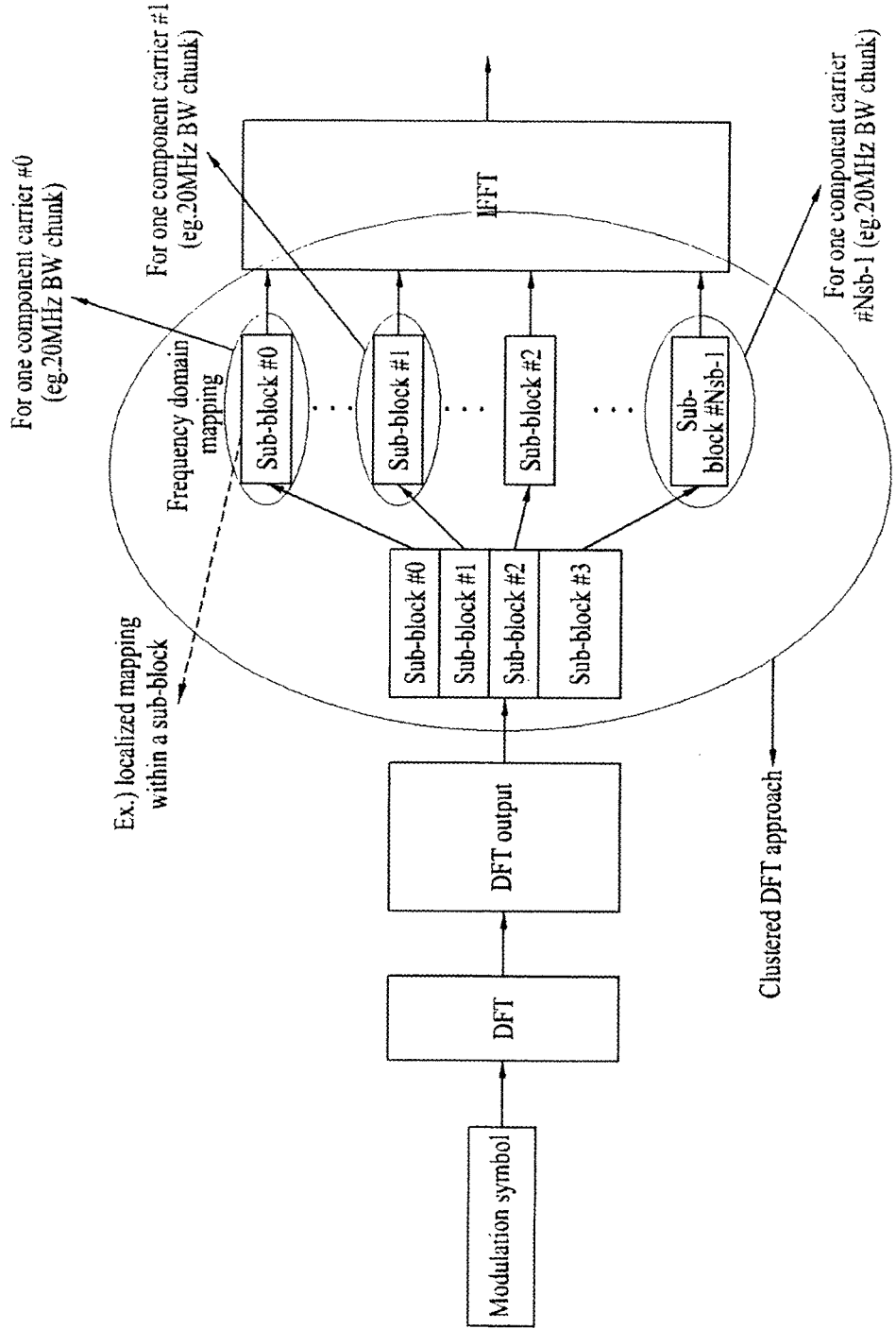
FIGS. 7 and 8 illustrate a signal processing procedure of mapping DFT process output samples to multiple carriers in clustered SC-FDMA.
Figure 8:
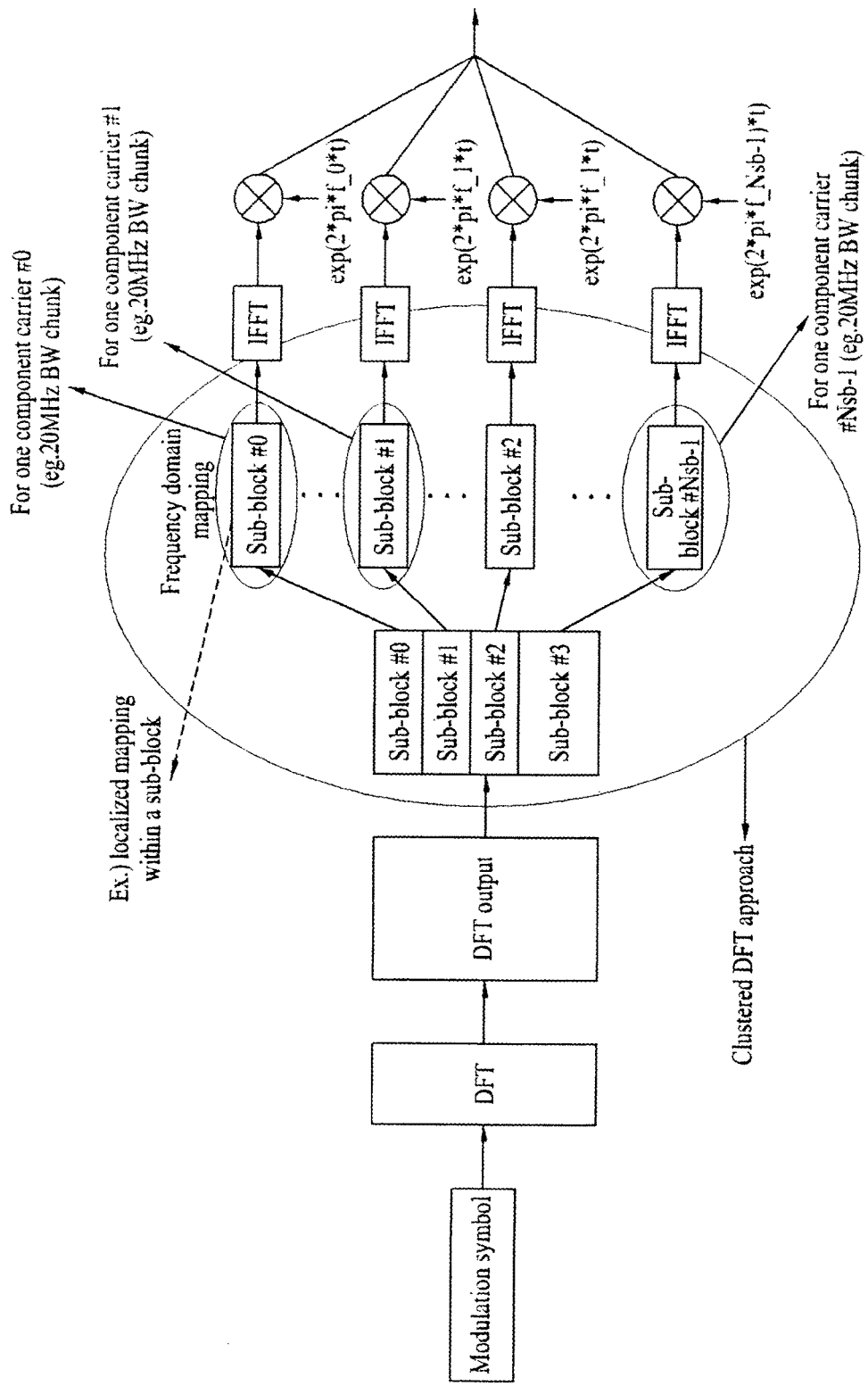

FIG. 6 illustrates a signal processing procedure for mapping DFT process output samples to a single carrier in clustered SC-FDMA. FIGS. 7 and 8 illustrate a signal processing procedure for mapping DFT process output samples to multiple carriers in clustered SC-FDMA. FIG. 6 shows an example of application of intra-carrier clustered SC-FDMA while FIGS. 7 and 8 show examples of application of inter-carrier clustered SC-FDMA. FIG. 7 illustrates a case in which a signal is generated through a single IFFT block when subcarrier spacing between neighboring component carriers is set while component carriers are contiguously allocated in the frequency domain. FIG. 8 shows a case in which a signal is generated through a plurality of IFFT blocks when component carriers are non-contiguously allocated in the frequency domain.

Figure 9:
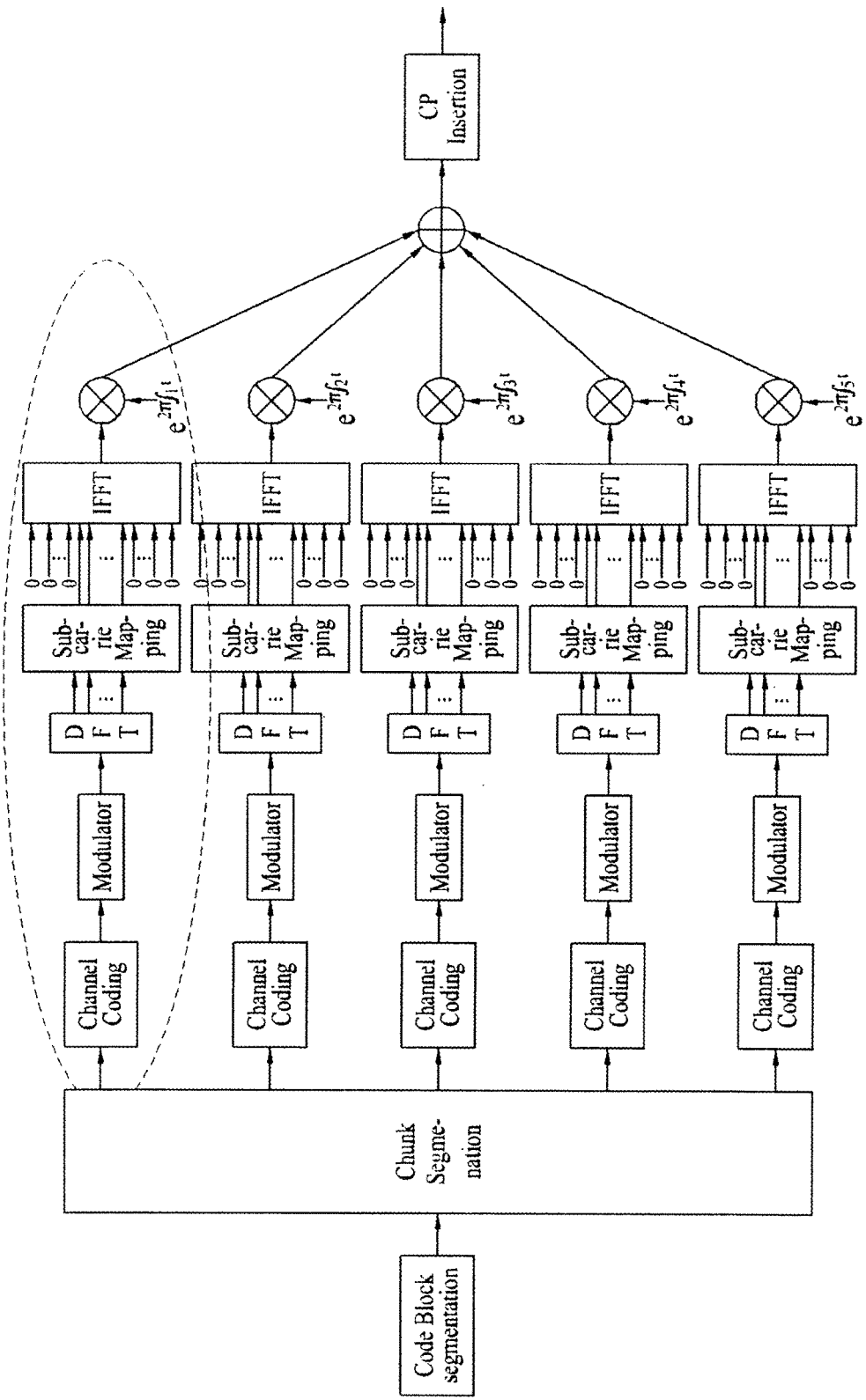
FIG. 9 illustrates a signal processing procedure in segmented SC-FDMA.

FIG. 9 illustrates a signal processing procedure in segmented SC-FDMA.

Segmented SC-FDMA is a simple extension of the DFT spreading and IFFT subcarrier mapping structure of the conventional SC-FDMA, when the number of DFT blocks is equal to the number of IFFT blocks and thus the DFT blocks and the IFFT blocks are in one-to-one correspondence. While the term 'segmented SC-FDMA' is adopted herein, it may also be called NxSC-FDMA or NxDFT spread OFDMA (NxDFT-s-OFDMA). Referring to FIG. 9, the segmented SC-FDMA is characterized in that total time-domain modulated symbols are divided into N groups (N is an integer larger than 1) and a DFT process is performed on a group-by-group basis to relieve the single carrier property constraint.

Figure 10:
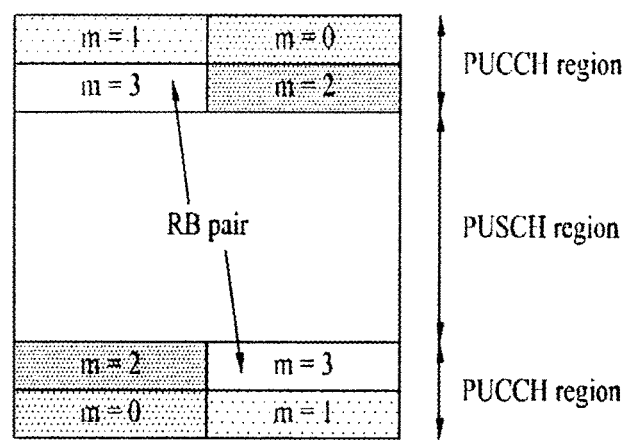
FIG. 10 illustrates an uplink subframe structure.

FIG. 10 illustrates an uplink subframe structure.

Referring to FIG. 10, an uplink subframe includes a plurality of slots (e.g. two slots). The slots may include different numbers of SC-FDMA symbols according to CP length. For example, the slot can include 7 SC-FDMA symbols in case of normal CP. The uplink subframe is divided into a data region and a control region. The data region includes a PUSCH and is used to transmit a data signal such as audio data. The control region includes a PUCCH and is used to transmit UCI. The PUCCH includes RB pairs (e.g. 7 RB pairs in frequency mirrored positions, and m=0, 1, 2, 3, 4) located on both ends of the data region in the frequency domain and is hopped based on slots. The UCI includes HARQ ACK/NACK, CQI, PMI, RI, etc.

Figure 11:
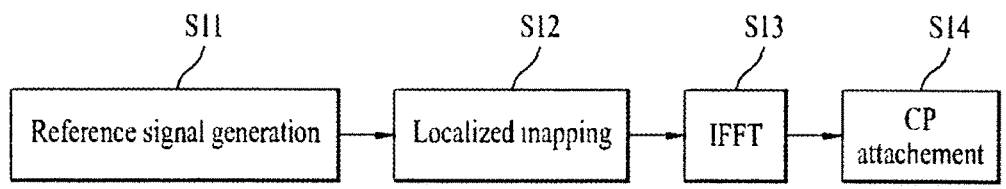
FIG. 11 illustrates a signal processing procedure for transmitting a reference signal on uplink.

FIG. 11 illustrates a signal processing procedure for transmitting a reference signal (RS) on uplink. While data is converted into a frequency domain signal through a DFT precoder, frequency-mapped, and then transmitted through IFFT, an RS does not passes the DFT precoder. Specifically, an RS sequence generated in the frequency domain (S11) is sequentially subjected to localization mapping (S12), IFFT (S13) and CP addition (S14) to be transmitted.

RS sequence $r_{u,v}^{(\alpha)}(n)$ is defined by cyclic shift $\alpha$ of a base sequence and may be represented by Equation 1.

$$r_{u,v}^{(\alpha)}(n) = e^{j\alpha n}\bar{r}_{u,v}(n), \ 0 \le n < M_{sc}^{RS} \quad [\text{Equation 1}]$$

Here, $M_{sc}^{RS} = mN_{sc}^{RB}$ denotes the length of the RS sequence, $N_{sc}^{RB}$ denotes a resource block size on a subcarrier basis, $1 \le m \le N_{RB}^{max,\ UL}$, and $N_{RB}^{max,\ UL}$ represents a maximum uplink transmission bandwidth.

Base sequence $\bar{r}_{u,v}(n)$ is divided into several groups. $u \in \{0, 1, \ldots, 29\}$ denotes a group number and v corresponds to a base sequence number in a corresponding group. Each group includes one base sequence (v=0) having a length of $M_{sc}^{RS} = mN_{sc}^{RB}$ ($1 \le m \le 5$) and two base sequences (v=0, 1) having a length of $M_{sc}^{RS} = mN_{sc}^{RB}$ ($6 \le m \le N_{RB}^{max,\ UL}$). The sequence group number u and base sequence number V in the corresponding group may vary with time. Base sequence $\bar{r}_{u,v}(0), \ldots, \bar{r}_{u,v}(M_{sc}^{RS}-1)$ is defined according to sequence length $M_{sc}^{RS}$.

A base sequence having a length of longer than $3N_{sc}^{RB}$ can be defined as follows.

For $M_{sc}^{RS} \ge 3N_{sc}^{RB}$, base sequence $\bar{r}_{u,v}(0), \ldots, \bar{r}_{u,v}(M_{sc}^{RS}-1)$ is given by the following Equation 2.

$$\bar{r}_{u,v}(n) = x_q(n \bmod N_{ZC}^{RS}), \ 0 \le n \le M_{sc}^{RS} \quad [\text{Equation 2}]$$

Here, the q-th root Zadoff-Chu sequence can be defined by the following Equation 3.

$$x_q(m) = e^{-j\frac{\pi q m(m+1)}{N_{ZC}^{RS}}}, \ 0 \le m \le N_{ZC}^{RS} - 1 \quad [\text{Equation 3}]$$

Here, q satisfies the following Equation 4.

$$q = \lfloor \bar{q} + 1/2 \rfloor + v \cdot (-1)^{\lfloor 2\bar{q} \rfloor}$$

$$\bar{q} = N_{ZC}^{RS} \cdot (u+1)/31 \quad [\text{Equation 4}]$$

The length $N_{ZC}^{RS}$ of the Zadoff-Chue sequence is given by the largest prime number, and thus $N_{ZC}^{RS} < M_{sc}^{RS}$ is satisfied.

A base sequence having a length of less than $3N_{sc}^{RB}$ can be defined as follows. The base sequence is given by the following Equation 5 for $M_{sc}^{RS} = N_{sc}^{RB}$ and $M_{sc}^{RS} = 2N_{sc}^{RB}$.

$$\bar{r}_{u,v}(n) = e^{j\varphi(n)\pi/4}, \ 0 \le n \le M_{sc}^{RS}-1 \quad [\text{Equation 5}]$$

Here, for $M_{sc}^{RS} = N_{sc}^{RB}$ and $M_{sc}^{RS} = 2N_{sc}^{RB}$, $\varphi(n)$ is given as shown in Tables 1 and 2, respectively.

TABLE 1

| u | $\varphi(0), \ldots, \varphi(11)$ |
|---|---|
| 0  | -1  1  3 -3  3  3  1  1  3  1 -3  3 |
| 1  |  1  1  3  3  3 -1  1 -3 -3  1 -3  3 |
| 2  |  1  1 -3 -3 -3 -1 -3 -3  1 -3  1 -1 |
| 3  | -1  1  1  1  1 -1 -3 -3  1 -3  3 -1 |
| 4  | -1  3  1 -1  1 -1 -3 -1  1 -1  1  3 |
| 5  |  1 -3  3 -1 -1  1  1 -1 -1  3 -3  1 |
| 6  | -1  3 -3 -3 -3  3  1 -1  3  3 -3  1 |
| 7  | -3 -1 -1 -1  1 -3  3 -1  1 -3  3  1 |
| 8  |  1 -3  3  1 -1 -1 -1  1  1  3 -1  1 |
| 9  |  1 -3 -1  3  3 -1 -3  1  1  1  1  1 |
| 10 | -1  3 -1  1  1 -3 -3 -1 -3  3  3 -1 |
| 11 |  3  1 -1 -1  3 -3 -1  3  1  3  3 |
| 12 |  1 -3  1  1 -3  1  1  1 -3 -3 -3  1 |
| 13 |  3  3 -3  3 -3  1  1  3 -1 -3  3  3 |
| 14 | -3  1 -1 -3 -1  3  1  3  3  3 -1  1 |
| 15 |  3 -1  1 -3 -1 -1  1  1  3  1 -1 -3 |
| 16 |  1  3  1 -1  1  3  3  3 -1 -1  3 -1 |
| 17 | -3  1  1  3 -3  3 -3 -3  3  1  3 -1 |
| 18 | -3  3  1  1 -3  1 -3 -3 -1 -1  1 -3 |
| 19 | -1  3  1  3  1 -1 -1  3 -3 -1 -3 -1 |
| 20 | -1 -3  1  1  1  1  3  1 -1  1 -3 -1 |
| 21 | -1  3 -1  1 -3 -3 -3 -3 -3  1 -1 -3 |
| 22 |  1  1 -3 -3 -3 -3 -1  3 -3  1 -3  3 |
| 23 |  1  1 -1 -3 -1 -3  1 -1  1  3 -1  1 |
| 24 |  1  1  3  1  3  3 -1  1 -1 -3 -3  1 |
| 25 |  1 -3  3  3  1  3  3  1 -3 -1 -1  3 |
| 26 |  1  3 -3 -3  3 -3  1 -1 -1  3 -1 -3 |
| 27 | -3 -1 -3 -1 -3  3  1 -1  1  3 -3 -3 |
| 28 | -1  3 -3  3 -1  3  3 -3  3  3 -1 -1 |
| 29 |  3 -3 -3 -1 -1 -3 -1  3 -3  3  1 -1 |

TABLE 2

| u | $\varphi(0), \ldots, \varphi(23)$ |
|---|---|
| 0  | -1  3  1 -3  3 -1  1  3 -3  3  1  3 -3  3  1  1 -1  1  3 -3  3 -3 -1 -3 |
| 1  | -3  3 -3 -3 -3  1 -3 -3  3 -1  1  1  1  3  1 -1  3 -3 -3  1  3  1  1 -3 |
| 2  |  3 -1  3  3  1  1 -3  3  3  3  3  1 -1  3 -1  1  1 -1 -3 -1 -1  1  3  3 |
| 3  | -1 -3  1  1  3 -3  1  1 -3 -1 -1  1  3  1  3  1 -1  3  1  1 -3 -1 -3 -1 |
| 4  | -1 -1 -1 -3 -3 -1  1  1  3  3 -1  3 -1  1 -1 -3  1 -1 -3 -3  1 -3 -1 -1 |
| 5  | -3  1  1  3 -1  1  3  1 -3  1 -3  1  1 -1 -1  3 -1 -3  3 -3 -3 -3  1  1 |
| 6  |  1  1 -1 -1  3 -3 -3  3 -3  1 -1 -1  1 -1  1  1 -1 -3 -1  1 -1  3 -1 -3 |
| 7  | -3  3  3 -1 -1 -3 -1  3  1  3  1  3  1  1 -1  3  1 -1  1  3 -3 -1 -1  1 |
| 8  | -3  1  3 -3  1 -1 -3  3 -3  3 -1 -1 -1 -1  1 -3 -3 -3  1 -3 -3 -3  1 -3 |
| 9  |  1  1 -3  3  3 -1 -3 -1  3 -3  3  3  3 -1  1  1 -3  1 -1  1  1 -3  1  1 |
| 10 | -1  1 -3 -3  3 -1  3 -1 -1 -3 -3 -3 -1 -3 -3  1 -1  1  3  3 -1  1 -1  3 |

TABLE 2-continued

| u | φ(0), . . . , φ(23) | | | | | | | | | | | | | | | | | | | | | | | |
|---|---|---|---|---|---|---|---|---|---|---|---|---|---|---|---|---|---|---|---|---|---|---|---|---|
| 11 | 1 | 3 | 3 | -3 | -3 | 1 | 3 | 1 | -1 | -3 | -3 | -3 | 3 | 3 | -3 | 3 | 3 | -1 | -3 | 3 | -1 | 1 | -3 | 1 |
| 12 | 1 | 3 | 3 | 1 | 1 | 1 | -1 | -1 | 1 | -3 | 3 | -1 | 1 | 1 | 3 | 3 | 3 | -1 | 3 | 3 | -3 | -1 | -3 | -1 |
| 13 | 3 | -1 | -1 | -1 | -1 | -3 | -1 | 3 | 3 | 1 | -1 | 1 | 3 | 3 | 3 | -1 | 1 | 1 | -3 | 1 | 3 | -1 | -3 | 3 |
| 14 | -3 | -3 | 3 | 1 | 3 | 1 | -3 | 3 | 1 | 3 | 1 | 1 | 3 | 3 | -1 | -1 | -3 | 1 | -3 | -1 | 3 | 1 | 1 | 3 |
| 15 | -1 | -1 | 1 | -3 | 1 | 3 | -3 | 1 | -1 | -3 | -1 | 3 | 1 | 3 | 1 | -1 | -3 | -3 | -1 | -1 | -3 | -3 | -3 | -1 |
| 16 | -1 | -3 | 3 | -1 | -1 | -1 | -1 | 1 | 1 | -3 | 3 | 1 | 3 | -1 | 1 | -3 | 1 | -3 | 1 | 1 | -3 | -1 | 1 | -3 |
| 17 | 1 | 3 | -1 | 3 | 3 | -1 | -3 | 1 | -1 | -3 | 3 | 3 | 3 | -1 | 1 | 1 | 3 | -1 | -3 | -1 | 3 | -1 | -1 | -1 |
| 18 | 1 | 1 | 1 | 1 | 1 | -1 | 3 | -1 | -3 | 1 | 1 | 3 | -3 | 1 | -3 | -1 | 1 | 1 | -3 | -3 | 3 | 1 | 1 | -3 |
| 19 | 1 | 3 | 3 | 1 | -1 | -3 | 3 | -1 | 3 | 3 | 3 | -3 | 1 | -1 | 1 | -1 | -3 | -1 | 1 | 3 | -1 | 3 | -3 | -3 |
| 20 | -1 | -3 | 3 | -3 | -3 | -3 | -1 | -1 | -3 | -1 | -3 | 3 | 1 | 3 | -3 | -1 | 3 | -1 | 1 | -1 | 3 | -3 | 1 | -1 |
| 21 | -3 | -3 | 1 | 1 | -1 | 1 | -1 | 1 | -1 | 3 | 1 | -3 | -1 | 1 | -1 | 1 | -1 | -1 | 3 | 3 | -3 | -1 | 1 | -3 |
| 22 | -3 | -1 | -3 | 3 | 1 | -1 | -3 | -1 | -3 | -3 | 3 | -3 | 3 | -3 | -1 | 1 | 3 | 1 | -3 | 1 | 3 | 3 | -1 | -3 |
| 23 | -1 | -1 | -1 | -1 | 3 | 3 | 3 | 1 | 3 | 3 | -3 | 1 | 3 | -1 | 3 | -1 | 3 | 3 | -3 | 3 | 1 | -1 | 3 | 3 |
| 24 | 1 | -1 | 3 | 3 | -1 | -3 | 3 | -3 | -1 | -1 | 3 | -1 | 3 | -1 | -1 | 1 | 1 | 1 | 1 | -1 | -1 | -3 | -1 | 3 |
| 25 | 1 | -1 | 1 | -1 | 3 | -1 | 3 | 1 | 1 | -1 | -1 | -3 | 1 | 1 | -3 | 1 | 3 | -3 | 1 | 1 | -3 | -3 | -1 | -1 |
| 26 | -3 | -1 | 1 | 3 | 1 | 1 | -3 | -1 | -1 | -3 | 3 | -3 | 3 | 1 | -3 | 3 | -3 | 1 | -1 | 1 | -3 | 1 | 1 | 1 |
| 27 | -1 | -3 | 3 | 3 | 1 | 1 | 3 | -1 | -3 | -1 | -1 | -1 | 3 | 1 | -3 | -3 | -1 | 3 | -3 | -1 | -3 | -1 | -3 | -1 |
| 28 | -1 | -3 | -1 | -1 | 1 | -3 | -1 | -1 | 1 | -1 | -3 | 1 | 1 | -3 | 1 | -3 | -3 | 3 | 1 | 1 | -1 | 3 | -1 | -1 |
| 29 | 1 | 1 | -1 | -1 | -3 | -1 | 3 | -1 | 3 | -1 | 1 | 3 | 1 | -1 | 3 | 1 | 3 | -3 | -3 | 1 | -1 | -1 | 1 | 3 |

RS hopping will now be described.

The sequence group number u in slot $n_s$ can be defined by group hopping pattern $f_{gh}(n_s)$ and a sequence-shift pattern $f_{ss}$ according to Equation 6.

$$u = (f_{gh}(n_s) + f_{ss}) \mod 30 \quad \text{[Equation 6]}$$

Here, mod denotes a modulo operation.

There are 17 different hopping patterns and 30 different sequence-shift patterns. Sequence group hopping may be enabled or disabled by means of a parameter that enables group hopping and is provided by higher layers.

PUCCH and PUSCH have the same hopping pattern but may have different sequence-shift patterns.

The group hopping pattern $f_{gh}(n_s)$ is the same for PUSCH and PUCCH and given by the following Equation 7.

$$f_{gh}(n_s) = \begin{cases} 0 & \text{if group hopping is disabled} \\ \left(\sum_{i=0}^{7} c(8n_s + i) \cdot 2^i\right) \mod 30 & \text{if group hopping is enabled} \end{cases} \quad \text{[Equation 7]}$$

Here, c(i) corresponds to a pseudo-random sequence and the pseudo-random sequence generator may be initialized with $$c_{init} = \left\lfloor \frac{N_{ID}^{cell}}{30} \right\rfloor$$

at the beginning of each radio frame.

Sequence-shift pattern $f_{ss}$ differs between PUCCH and PUSCH.

For PUCCH, sequence-shift pattern $f_{ss}^{PUCCH}$ is given by $f_{ss}^{PUCCH} = N_{ID}^{cell} \mod 30$. For PUSCH, sequence shift pattern $f_{ss}^{PUSCH}$ is given by $f_{ss}^{PUSCH} = (f_{ss}^{PUCCH} + \Delta_{ss}) \mod 30$. $\Delta_{ss} \in \{0, 1, \ldots, 29\}$ is configured by higher layers.

Sequence hopping will now be described.

Sequence hopping only applies for reference signals of length $M_{sc}^{RS} \geq 6 N_{sc}^{RB}$.

For reference signals of length $M_{sc}^{RS} < 6 N_{sc}^{RB}$, the base sequence number V within the base sequence group is given by v=0.

For reference signals of length $M_{sc}^{RS} \geq 6 N_{sc}^{RB}$, the base sequence number V within the base sequence group in slot $n_s$ is given by the following Equation 8.

$$v = \begin{cases} c(n_s) & \text{if group hopping is disabled and sequence hopping is enabled} \\ 0 & \text{otherwise} \end{cases} \quad \text{[Equation 8]}$$

Here, c(i) corresponds to the pseudo-random sequence and a parameter that is provided by higher layers and enables sequence hopping determines if sequence hopping is enabled or not. The pseudo-random sequence generator may be initialized with $$c_{init} = \left\lfloor \frac{N_{ID}^{cell}}{30} \right\rfloor \cdot 2^5 + f_{ss}^{PUSCH}$$

with at the beginning of each radio frame.

A reference signal for PUSCH is determined as follows.

Reference signal sequence for $r^{PUSCH}(.)$ for PUSCH is defined by $r^{PUSCH}(m \cdot M_{sc}^{RS} + n) = r_{u,v}^{(\alpha)}(n)$ where $$m = 0, 1$$
$$n = 0, \ldots, M_{sc}^{RS} - 1$$

and $M_{sc}^{RS} = M_{sc}^{PUSCH}$.

A cyclic shift is given by $\alpha = 2 \pi n_{cs}/12$ and $n_{cs} = (n_{DMRS}^{(1)} + n_{DMRS}^{(2)} + n_{PRS}(n_s)) \mod 12$ in one slot.

Here, $n_{DMRS}^{(1)}$ is a broadcast value, $n_{DMRS}^{(2)}$ is given by uplink scheduling allocation, and $n_{PRS}(n_s)$ is a cell-specific cyclic shift value. $n_{PRS}(n_s)$ varies with slot number $n_s$ and is given by $n_{PRS}(n_s) = \sum_{i=0}^{7} c(8 \cdot n_s + i) \cdot 2^i$.

Here, c(i) denotes the pseudo-random sequence and is a cell-specific value. The pseudo-random sequence generator may be initialized with $$c_{init} = \left\lfloor \frac{N_{ID}^{cell}}{30} \right\rfloor \cdot 2^5 + f_{ss}^{PUSCH}$$

at the beginning of each radio frame.

Table 3 shows a cyclic shift field and $n_{DMRS}^{(2)}$ in downlink control information (DCI) format 0.

TABLE 3

| Cyclic shift field in DCI format 0 | $n_{DMRS}^{(2)}$ |
|---|---|
| 000 | 0 |
| 001 | 2 |
| 010 | 3 |
| 011 | 4 |
| 100 | 6 |
| 101 | 8 |
| 110 | 9 |
| 111 | 10 |

A physical mapping method for an uplink RS in a PUSCH will now be described.

The sequence is multiplied with the amplitude scaling factor $\beta_{PUSCH}$ and mapped to the same set of a physical resource block (PRB) used for the corresponding PUSCH in a sequence starting with $r^{PUSCH}(0)$. Mapping to resource elements (k,l), with l=3 for normal CP and l=2 for extended CP, in the subframe will be in increasing order of first k, then the slot number.

In summary, a ZC sequence is used with cyclic extension for length $3N_{sc}^{RB}$ or larger, whereas a computer generated sequence is used for length less than $3N_{sc}^{RB}$. A cyclic shift is determined according to cell-specific cyclic shift, UE-specific cyclic shift and hopping pattern.

Figure 12A:
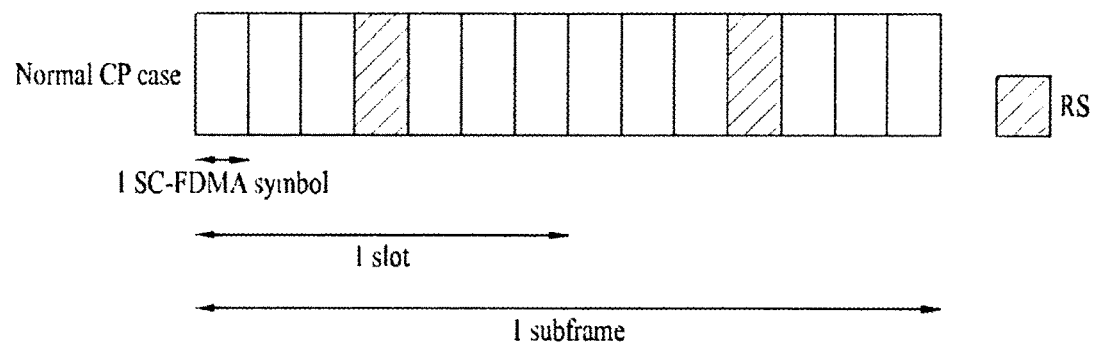
FIGS. 12A-B illustrate DMRS structures for a PUSCH in the case of normal CP and in the case of extended CP.
Figure 12B:
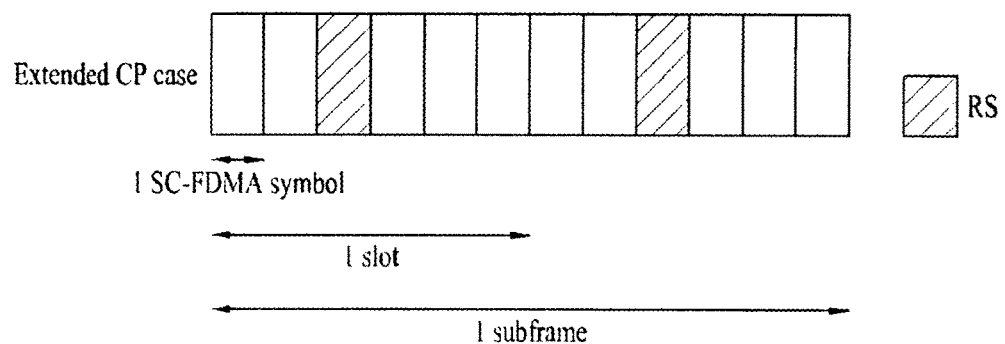

FIG. 12a shows a DMRS structure for PUSCH in case of normal CP and FIG. 12b shows a DMRS structure for PUSCH in case of extended CP. A DMRS is transmitted through the fourth and eleventh SC-FDMA symbols in FIG. 12a and transmitted through the third and ninth SC-FDMA symbols in FIG. 12b.

FIGS. 13 to 16 illustrate slot level structures of PUCCH formats. A PUCCH has the following formats in order to transmit control information.

(1) Format 1: on-off keying (OOK) modulation, used for scheduling request (SR).

(2) Formats 1a and 1b: used for ACK/NACK transmission.

(1) Format 1a: BPSK ACK/NACK for one codeword (2) Format 1b: QPSK ACK/NACK for two codewords (3) Format 2: QPSK modulation, used for CQI transmission.

(4) Formats 2a and 2b: used for simultaneous transmission of CQI and ACK/NACK

Table 4 shows modulation schemes according to PUCCH format and the number of bits per subframe. Table 5 shows the number of RSs per slot according to PUCCH format and Table 6 shows SC-FDMA symbol position in an RS according to PUCCH format. In Table 4, PUCCH formats 2a and 2b correspond to normal CP.

TABLE 4

| PUCCH format | Modulation scheme | Number of bits per subframe ($M_{bit}$) |
|---|---|---|
| 1 | N/A | N/A |
| 1a | BPSK | 1 |
| 1b | QPSK | 2 |
| 2 | QPSK | 20 |
| 2a | QPSK + BPSK | 21 |
| 2b | QPSK + BPSK | 22 |

TABLE 5

| PUCCH format | Normal CP | Extended CP |
|---|---|---|
| 1, 1a, 1b | 3 | 2 |
| 2 | 2 | 1 |
| 2a, 2b | 2 | N/A |

TABLE 6

| | SC-FDMA symbol position in RS | |
|---|---|---|
| PUCCH format | Normal CP | Extended CP |
| 1, 1a, 1b | 2, 3, 4 | 2, 3 |
| 2, 2a, 2b | 1, 5 | 3 |

Figure 13:
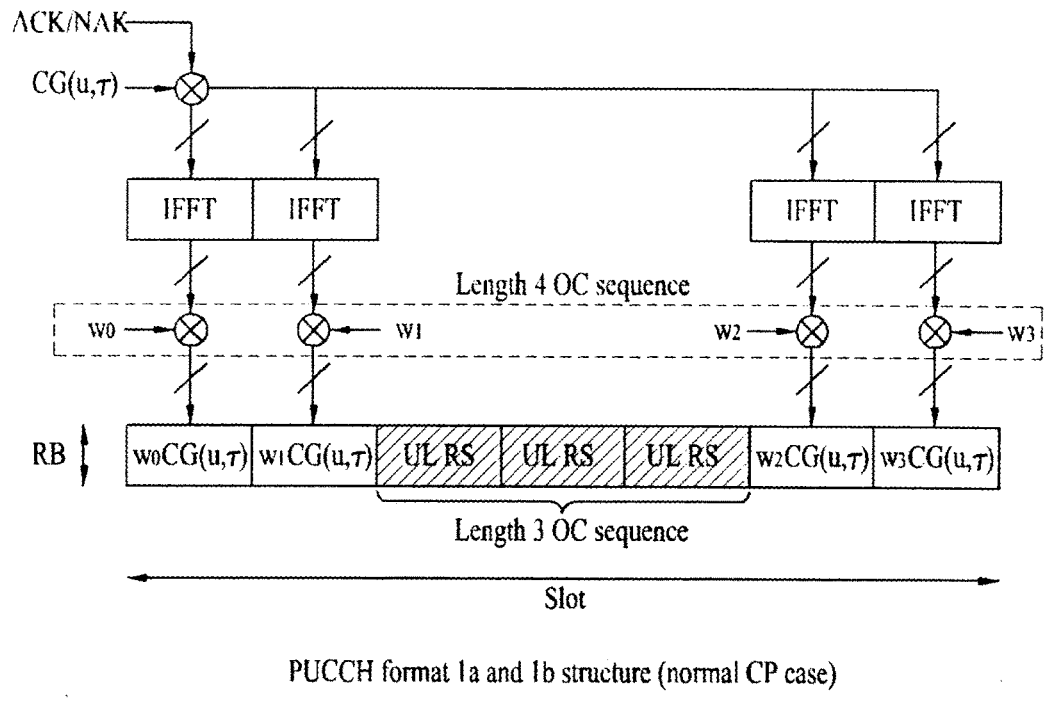
FIG. 13 illustrates PUCCH formats 1a and 1b in the case of normal CP.
Figure 14:
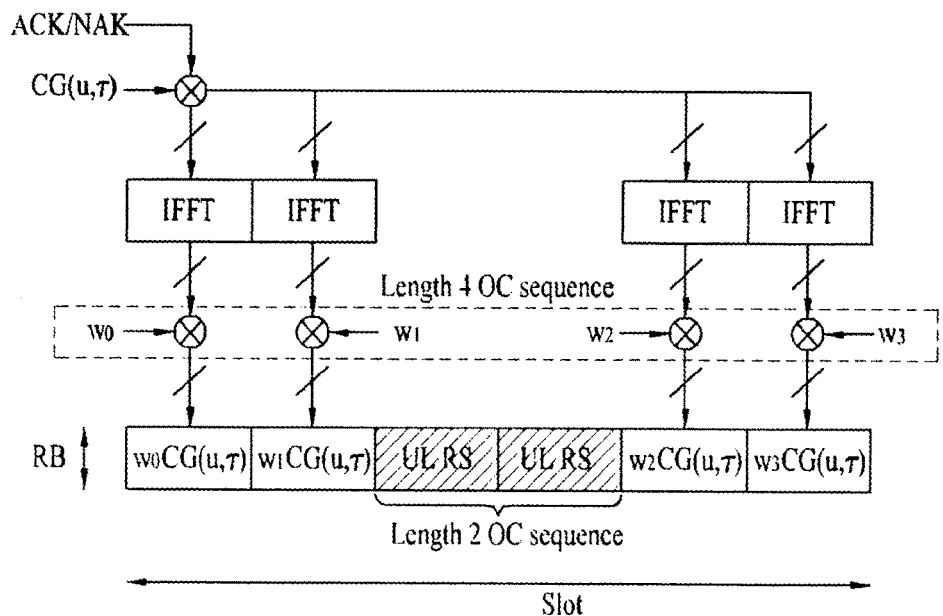
FIG. 14 illustrates PUCCH formats 1a and 1b in the case of extended CP.

FIG. 13 illustrates PUCCH formats 1a and 1b in case of normal CP and FIG. 14 illustrates PUCCH formats 1a and 1b in case of extended CP. In PUCCH formats 1a and 1b, the same control information is repeated in a subframe on a slot-by-slot basis. ACK/NACK signals are respectively transmitted from UEs through different resources configured by different cyclic shifts (CSs) (frequency domain codes) and orthogonal cover codes (OCs or OCCs) (time domain spreading codes) of a computer-generated constant amplitude zero auto correlation (CG-CAZAC) sequence. An OC includes a Walsh/DFT orthogonal code, for example. If the number of CSs is 6 and the number of OCs is 3, a total of 18 UEs can be multiplexed in the same physical resource block (PRB) on a single antenna basis. Orthogonal sequences w0, w1, w2, w3 may be applied in the arbitrary time domain (after FFT modulation) or in the arbitrary frequency domain (prior to FFT modulation).

An ACK/NACK resource composed of CS, OC and PRB may be given to a UE through radio resource control (RRC) for SR and persistent scheduling. The ACK/NACK resource may be implicitly provided to the UE by the lowest CCE index of a PUCCH corresponding to a PDSCH for dynamic ACK/NACK and non-persistent scheduling.

Figure 15:
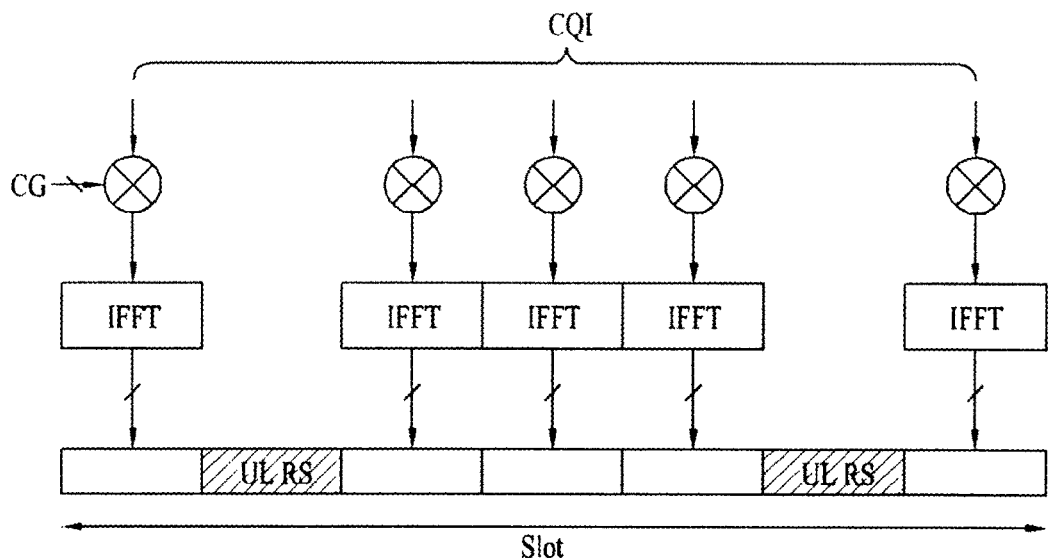
FIG. 15 illustrates PUCCH format 2/2a/2b in the case of normal CP.
Figure 16:
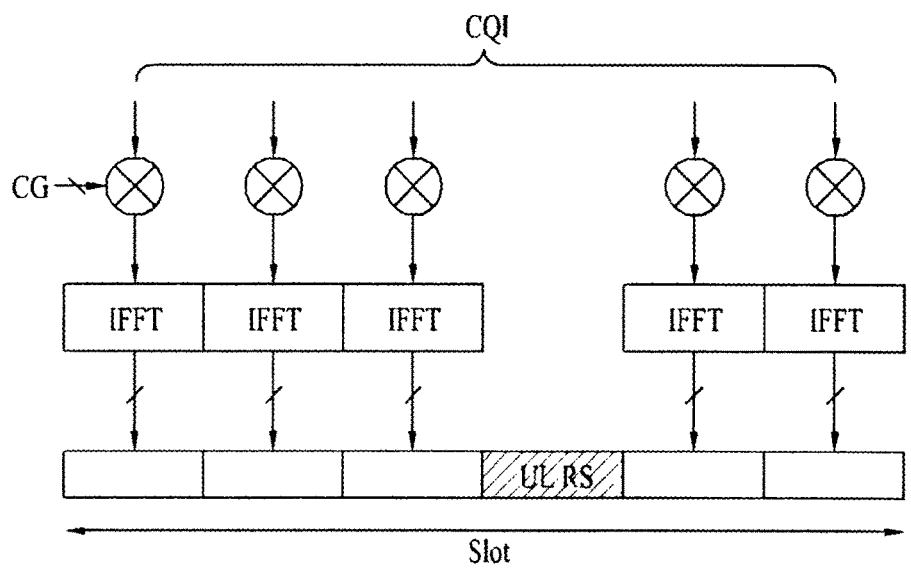
FIG. 16 illustrates PUCCH format 2/2a/2b in the case of extended CP.

FIG. 15 illustrates PUCCH formats 2/2a/2b in case of normal CP and FIG. 16 illustrates PUCCH formats 2/2a/2b in case of extended CP. Referring to FIGS. 15 and 16, one subframe includes 10 QPSK data symbols in addition to RS symbols in case of normal CP. Each of the QPSK symbols is spread in the frequency domain by CS and then mapped to the corresponding SC-FDMA symbol. SC-FDMA symbol level CS hopping may be applied to randomize inter-cell interference. An RS may be multiplexed by CDM using CSs. For example, if the number of available CSs is 12 or 6, 12 or 6 UEs can be multiplexed in the same PRB. That is, a plurality of UEs can be multiplexed by CS+OC+PRB and CS+PRB in PUCCH formats 1/1a/1b and 2/2a/2b respectively.

Orthogonal sequences with length-4 and length-3 for PUCCH formats 1/1a/1b are shown in Table 7 and Table 8.

TABLE 7

Length-4 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [+1 +1 +1 +1] |
| 1 | [+1 −1 +1 −1] |
| 2 | [+1 −1 −1 +1] |

TABLE 8

Length-3 orthogonal sequences for PUCCH formats 1/1a/1b

| Sequence index $n_{oc}(n_s)$ | Orthogonal sequences $[w(0) \ldots w(N_{SF}^{PUCCH} - 1)]$ |
|---|---|
| 0 | [1 1 1] |
| 1 | [1 $e^{j2\pi/3}$ $e^{j4\pi/3}$] |
| 2 | [1 $e^{j4\pi/3}$ $e^{j2\pi/3}$] |

Orthogonal sequences for RS in PUCCH formats 1/1a/1b are shown in Table 9.

TABLE 9

| | 1a and 1b | |
|---|---|---|
| Sequence index $\bar{n}_{oc}(n_s)$ | Normal cyclic prefix | Extended cyclic prefix |
| 0 | [1 1 1] | [1 1] |
| 1 | [1 $e^{j2\pi/3}$ $e^{j4\pi/3}$] | [1 −1] |
| 2 | [1 $e^{j4\pi/3}$ $e^{j2\pi/3}$] | N/A |

(2) Slot-based access for mapping between ACK/NACK channels and resources (k)

Resource $n_r$ for PUCCH formats 1/1a/1b includes the following combination.

(1) CS (corresponding to a DFT orthogonal code at a symbol level) $n_{cs}$ (2) OC (orthogonal code at a slot level) $n_{oc}$ (3) Frequency resource block (RB) $n_{rb}$ A representative index $n_r$ includes $n_{cs}$, $n_{oc}$ and $n_{rb}$, where indexes indicating CS, OC and RB are $n_{cs}$, $n_{oc}$, and $n_{rb}$, respectively. Here, $n_r$ satisfies $n_r=(n_{cs}, n_{oc}, n_{rb})$.

CQI, PMI, RI and a combination of CQI and ACK/NACK may be transmitted through PUCCH formats 2/2a/2b. In this case, Reed-Muller (RM) channel coding is applicable.

For example, channel coding for a UL CQI in an LTE system is described as follows. Bit stream is $a_0$, $a_1$, $a_2$, $a_3$, ..., $a_{A-1}$ is channel-coded using RM code (20,A). Table 10 shows a base sequence for code (20,A). Here, $a_0$ and $a_{A-1}$ denote the most significant bit (MSB) and the least significant bit (LSB). In the case of extended CP, a maximum number of information bits is 11 in cases other than a case in which CQI and ACK/NACK are simultaneously transmitted. The UL CQI may be subjected to QPSK modulation after being coded into 20 bits using the RM code. The coded bits may be scrambled before being subjected to QPSK modulation.

TABLE 10

| I | $M_{i,0}$ | $M_{i,1}$ | $M_{i,2}$ | $M_{i,3}$ | $M_{i,4}$ | $M_{i,5}$ | $M_{i,6}$ | $M_{i,7}$ | $M_{i,8}$ | $M_{i,9}$ | $M_{i,10}$ | $M_{i,11}$ | $M_{i,12}$ |
|---|---|---|---|---|---|---|---|---|---|---|---|---|---|
| 0 | 1 | 1 | 0 | 0 | 0 | 0 | 0 | 0 | 0 | 0 | 1 | 1 | 0 |
| 1 | 1 | 1 | 1 | 0 | 0 | 0 | 0 | 0 | 0 | 1 | 1 | 1 | 0 |
| 2 | 1 | 0 | 0 | 1 | 0 | 0 | 1 | 0 | 1 | 1 | 1 | 1 | 1 |
| 3 | 1 | 0 | 1 | 1 | 0 | 0 | 0 | 1 | 0 | 1 | 1 | 1 | 1 |
| 4 | 1 | 1 | 1 | 1 | 0 | 0 | 0 | 1 | 0 | 0 | 1 | 1 | 1 |
| 5 | 1 | 1 | 0 | 0 | 1 | 0 | 1 | 1 | 1 | 0 | 1 | 1 | 1 |
| 6 | 1 | 0 | 1 | 0 | 1 | 0 | 1 | 0 | 1 | 1 | 1 | 1 | 1 |
| 7 | 1 | 0 | 0 | 1 | 1 | 0 | 0 | 1 | 1 | 0 | 1 | 1 | 1 |
| 8 | 1 | 1 | 0 | 1 | 1 | 0 | 0 | 1 | 0 | 1 | 1 | 1 | 1 |
| 9 | 1 | 0 | 1 | 1 | 1 | 0 | 1 | 0 | 0 | 1 | 1 | 1 | 1 |
| 10 | 1 | 0 | 1 | 0 | 0 | 1 | 1 | 1 | 0 | 1 | 1 | 1 | 1 |
| 11 | 1 | 1 | 1 | 0 | 0 | 1 | 1 | 0 | 1 | 0 | 1 | 1 | 1 |
| 12 | 1 | 0 | 0 | 1 | 0 | 1 | 0 | 1 | 1 | 1 | 1 | 1 | 1 |
| 13 | 1 | 1 | 0 | 1 | 0 | 1 | 0 | 1 | 0 | 1 | 1 | 1 | 1 |
| 14 | 1 | 0 | 0 | 0 | 1 | 1 | 0 | 1 | 0 | 0 | 1 | 0 | 1 |
| 15 | 1 | 1 | 0 | 0 | 1 | 1 | 1 | 1 | 0 | 1 | 1 | 0 | 1 |
| 16 | 1 | 1 | 1 | 0 | 1 | 1 | 1 | 0 | 0 | 1 | 0 | 1 | 1 |
| 17 | 1 | 0 | 0 | 1 | 1 | 1 | 0 | 0 | 1 | 0 | 0 | 1 | 1 |
| 18 | 1 | 1 | 0 | 1 | 1 | 1 | 1 | 1 | 0 | 0 | 0 | 0 | 0 |
| 19 | 1 | 0 | 0 | 0 | 0 | 1 | 1 | 0 | 0 | 0 | 0 | 0 | 0 |

FIG. 17 illustrates ACK/NACK channelization for PUCCH formats 1a and 1b. FIG. 17 corresponds to a case of $\Delta_{shift}^{PUCCH}=2$.

Figure 18:
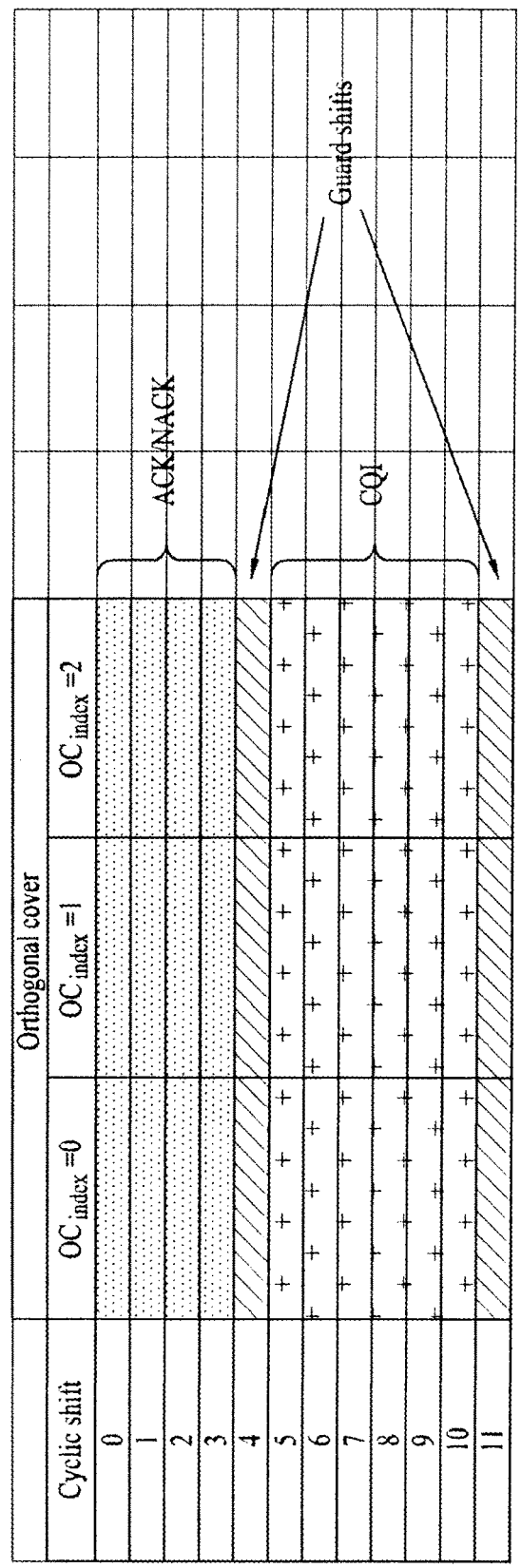
FIG. 18 illustrates channelization for a hybrid structure of PUCCH formats 1/1a/1b and 2/2a/2b in the same PRB.

FIG. 18 illustrates channelization for a hybrid structure of PUCCH formats 1/1a/1b and 2/2a/2b in the same PRB.

CS hopping and OC remapping may be applied as follows.

(1) Symbol-based cell-specific CS hopping for randomization of inter-cell interference (2) Slot level CS/OC remapping (1) For inter-cell interference randomization Channel-coded bits $b_0$, $b_1$, $b_2$, $b_3$, ..., $b_{B-1}$ may be generated according to Equation 9.

$$b_i = \sum_{n=0}^{A-1} (a_n \cdot M_{i,n}) \bmod 2 \quad \text{[Equation 9]}$$

Here, i=0, 1, 2, ..., B−1.

Table 11 shows an uplink control information (UCI) field for wideband (single antenna port, transmit diversity or open loop spatial multiplexing PDSCH) CQI feedback.

TABLE 11

| Field | Band |
| --- | --- |
| Wideband CQI | 4 |

Table 12 shows a UCI field for wideband CQI and PMI feedback. This field reports closed loop spatial multiplexing PDSCH transmission.

TABLE 12

| | Band | | | |
| --- | --- | --- | --- | --- |
| | 2 antenna ports | | 4 antenna ports | |
| Field | Rank = 1 | Rank = 2 | Rank = 1 | Rank > 1 |
| Wideband CQI | 4 | 4 | 4 | 4 |
| Spatial differential CQI | 0 | 3 | 0 | 3 |
| PMI(Precoding Matrix Index) | 2 | 1 | 4 | 4 |

Table 13 shows a UCI field for RI feedback for wideband report.

TABLE 13

| | Bit widths | | |
| --- | --- | --- | --- |
| | | 4 antenna ports | |
| Field | 2 antenna ports | Maximum 2 layers | Maximum 4 layers |
| RI(Rank Indication) | 1 | 1 | 2 |

Figure 19:
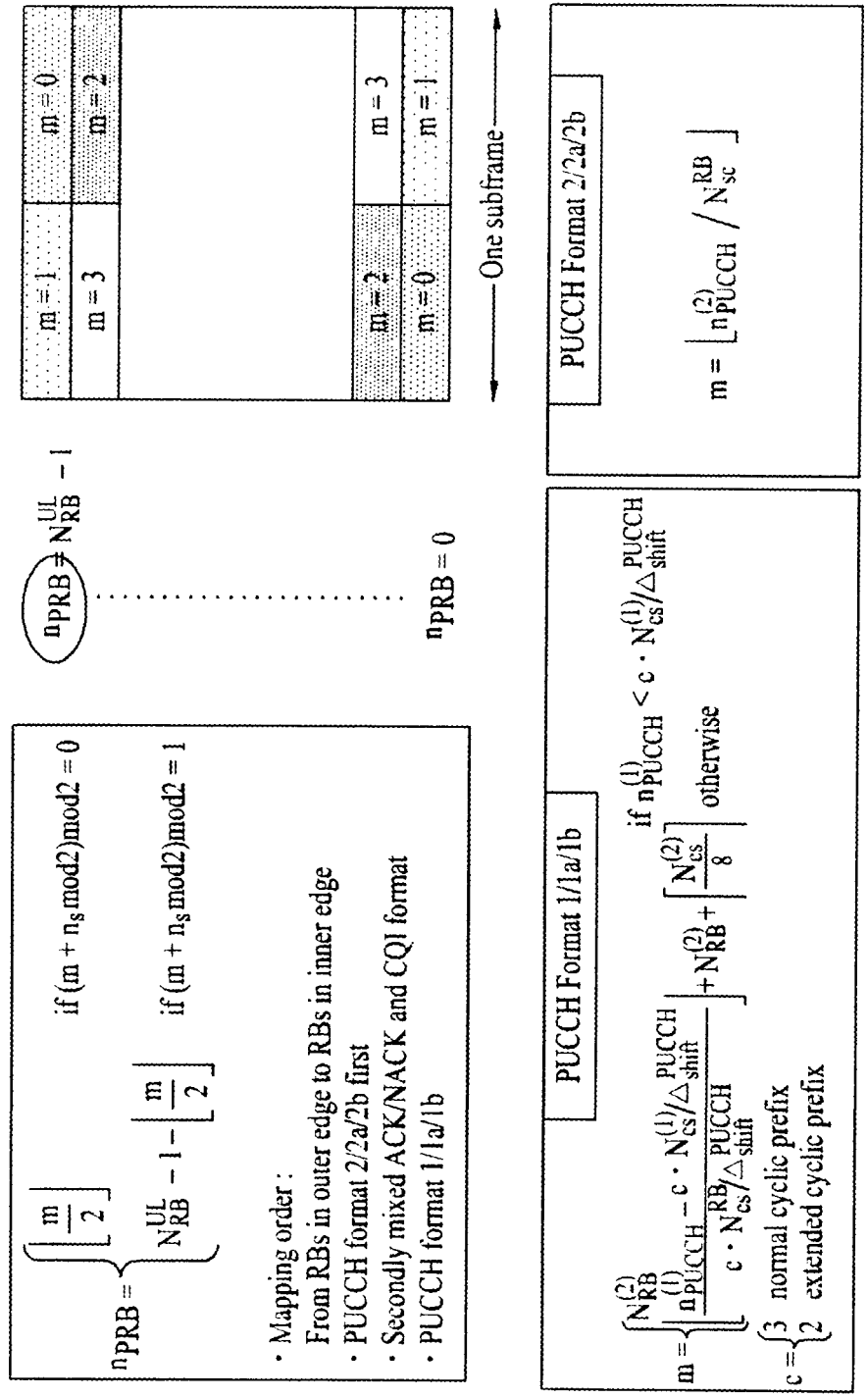
FIG. 19 illustrates PRB allocation for PUCCH transmission.

FIG. 19 illustrates PRB allocation. As shown in FIG. 19, a PRB may be used for PUCCH transmission in slot $n_s$.

A multi-carrier system or a carrier aggregation system means a system using aggregation of a plurality of carriers having a bandwidth narrower than a target bandwidth for supporting wideband. When the plurality of carriers having a bandwidth narrower than the target bandwidth are aggregated, the bandwidth of the aggregated carriers may be limited to the bandwidths used in existing systems for backward compatibility with the existing systems. For example, an LTE system supports bandwidths of 1.4 MHz, 3 MHz, 5 MHz, 10 MHz, 15 MHz and 20 MHz and an LTE-A system evolved from the LTE system can support bandwidths wider than 20 MHz by using bandwidths supported by the LTE system. Alternatively, a new bandwidth may be defined to support carrier aggregation irrespective of the bandwidths used in existing systems. The term 'multi-carrier' can be used with carrier aggregation and bandwidth aggregation. Carrier aggregation collectively refers to both contiguous carrier aggregation and non-contiguous carrier aggregation.

Figure 20:
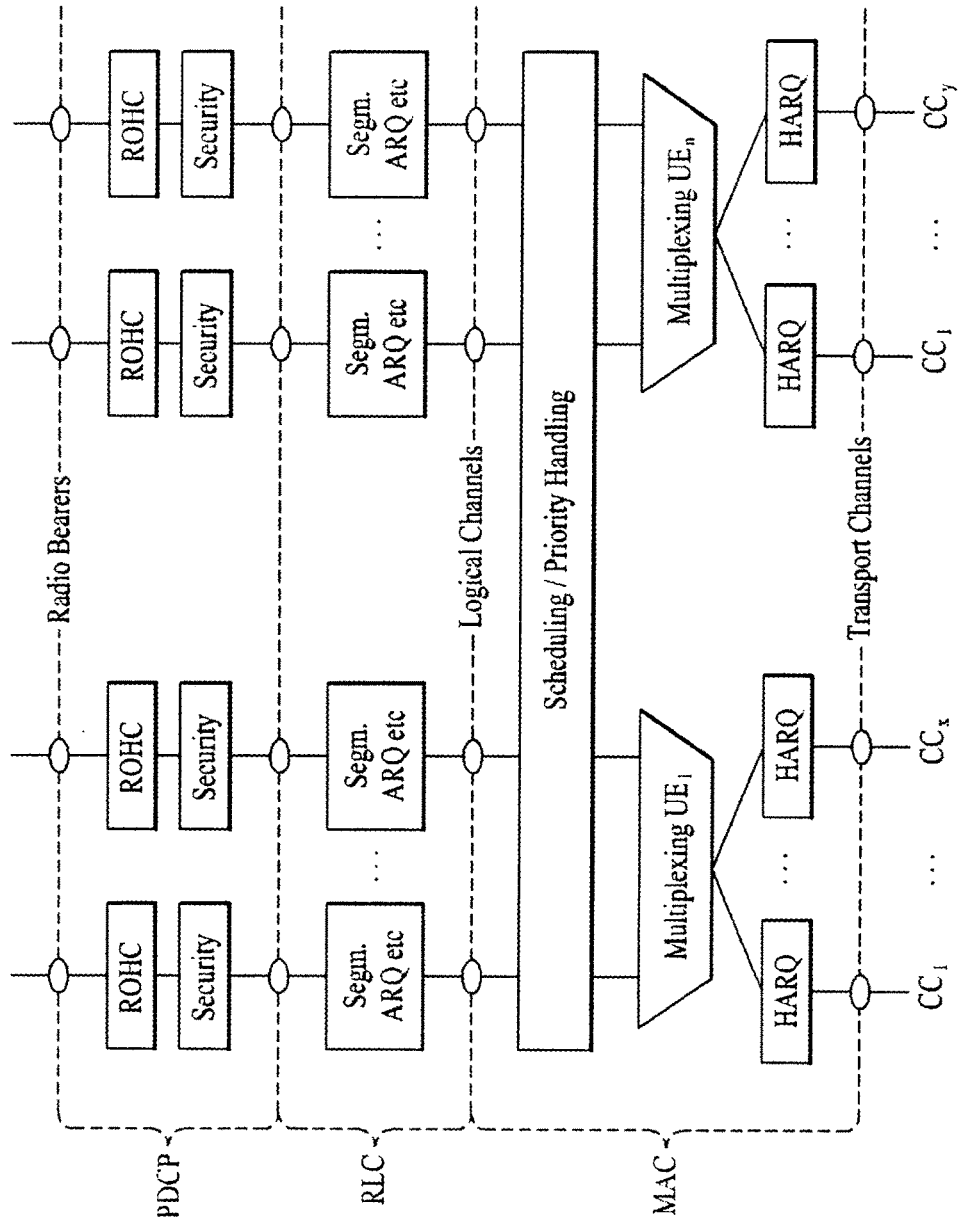
FIG. 20 illustrates a concept of management of downlink component carriers in a base station (BS)
Figure 21:
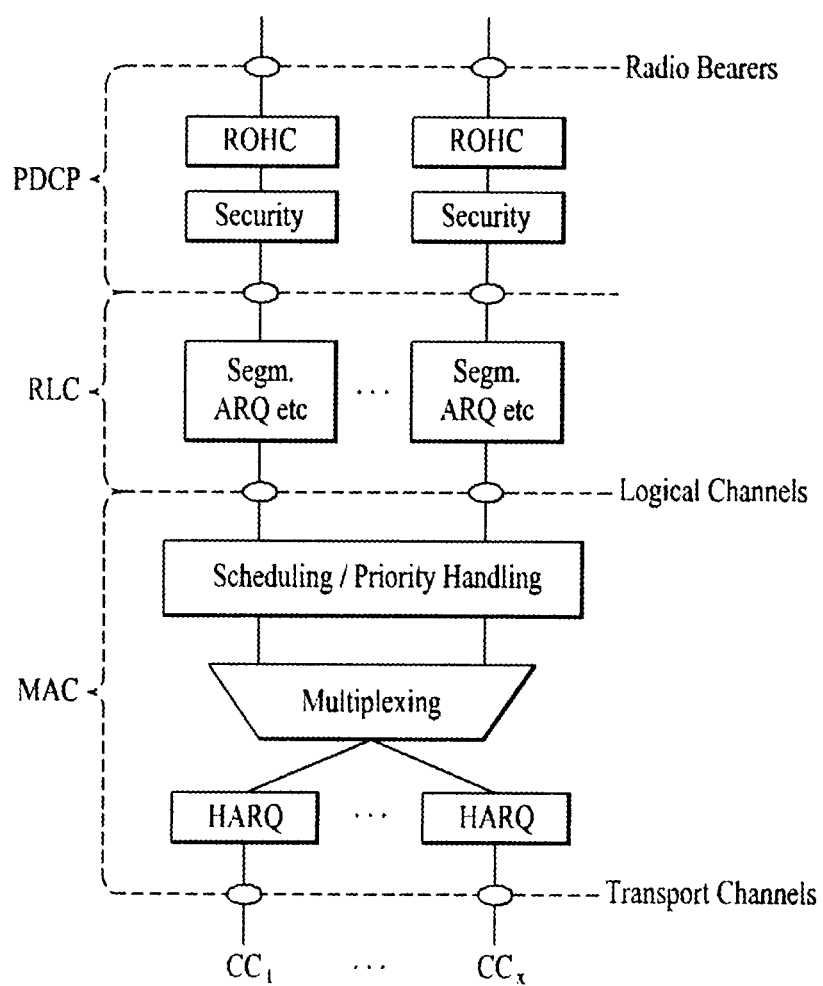
FIG. 21 illustrates a concept of management of uplink component carriers in a user equipment (UE)

FIG. 20 illustrates a concept of management of downlink component carriers in a BS and FIG. 21 illustrates a concept of management of uplink component carriers in a UE. For convenience of description, higher layers are simply referred to as a MAC layer in the following description.

Figure 22:
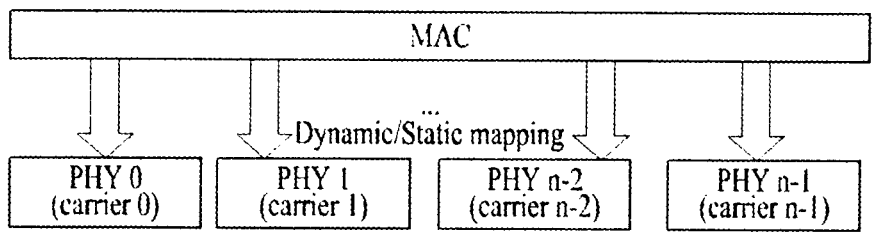
FIG. 22 illustrates a concept of management of multiple carriers by one MAC layer in a BS.
Figure 23:
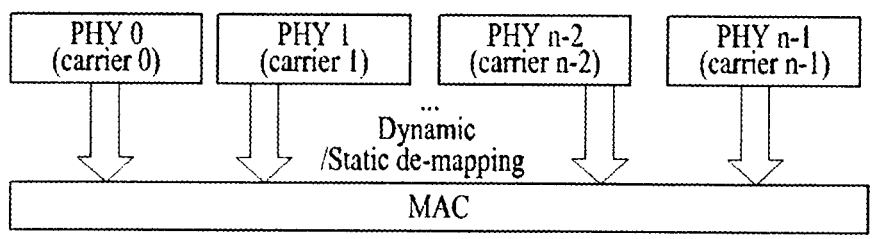
FIG. 23 illustrates a concept of management of multiple carriers by one MAC layer in a UE.

FIG. 22 illustrates a concept of management of multiple carriers by one MAC layer in a BS and FIG. 23 illustrates a concept of management of multiple carriers by MAC layer in a UE.

Referring to FIGS. 22 and 23, one MAC layer manages and operates one or more frequency carriers for transmission and reception. In this case, resource management is flexible because frequency carriers managed by one MAC layer need not be contiguous. In FIGS. 22 and 23, one PHY layer corresponds to one component carrier. Here, one PHY layer does not necessarily mean an independent radio frequency (RF) device. While one independent RF device means one PHY layer in general, one RF device is not limited thereto and may include multiple PHY layers.

Figure 24:
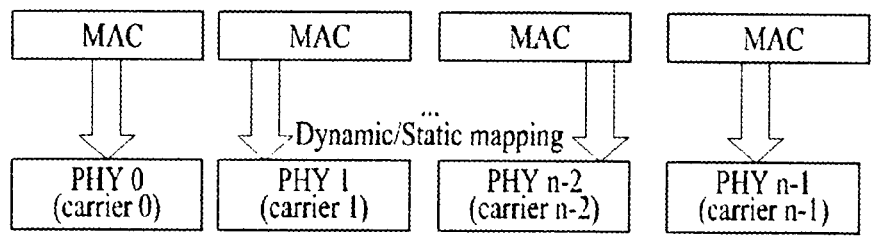
FIG. 24 illustrates a concept of management of multiple carriers by multiple MAC layers in a BS.
Figure 25:
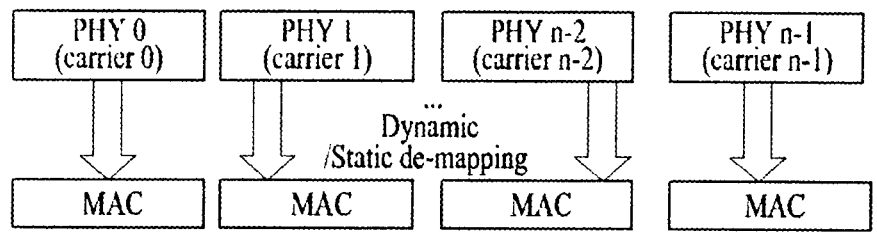
FIG. 25 illustrates a concept of management of multiple carriers by multiple MAC layers in a UE.
Figure 26:
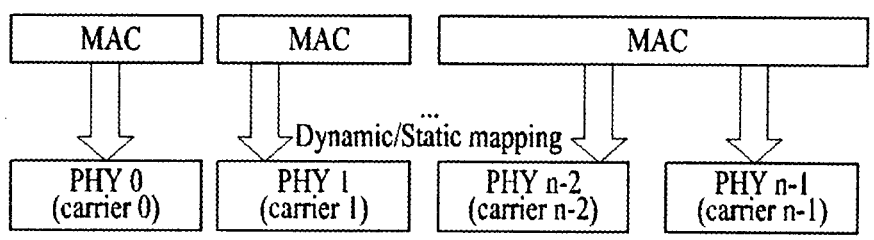
FIG. 26 illustrates a concept of management of multiple carriers by multiple MAC layers in a BS.
Figure 27:
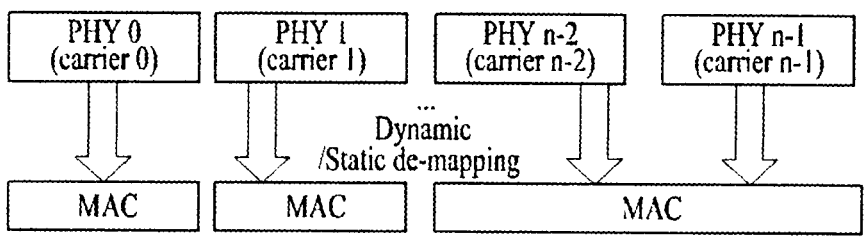
FIG. 27 illustrates a concept of management of multiple carriers by one or more MAC layers in a UE.

FIG. 24 illustrates a concept of management of multiple carriers by multiple MAC layers in a BS and FIG. 25 illustrates a concept of management of multiple carriers by multiple MAC layers in a UE. FIG. 26 illustrates a concept of management of multiple carriers by multiple MAC layers in a BS and FIG. 27 illustrates a concept of management of multiple carriers by one or more MAC layers in a UE.

Distinguished from the structures shown in FIGS. 22 and 23, multiple carriers may be controlled by multiple MAC layers as shown in FIGS. 24 to 27.

Multiple MAC layers may control one-to-one multiple carriers as shown in FIGS. 24 and 25. Referring to FIGS. 26 and 27, MAC layers may control one-to-one some carriers and one MAC layer may control other carriers.

The above-described system includes one to N carriers which are contiguous or non-contiguous. This can be applied in both uplink and downlink. A TDD system is configured such that N carriers for downlink transmission and uplink transmission are operated and an FDD system is configured such that multiple carriers are respectively used for uplink and downlink. The FDD system may support asymmetrical carrier aggregation in which the numbers of aggregated carriers and/or carrier bandwidths are different between uplink and downlink.

When the number of aggregated component carriers in uplink equals that of downlink, it is possible to configure all component carriers such that they are compatible with the existing systems. However, the configurations of component carriers that are not considered to be compatible with the existing systems are not excluded from the present invention.

While the following description is made on the assumption that, when a PDCCH is transmitted using downlink component carrier #0, a PDSCH corresponding to the PDCCH is transmitted through downlink component carrier #0, it is apparent that the PDSCH can be transmitted through a different downlink component carrier using cross-carrier scheduling. The term 'component carrier' can be replaced with an equivalent term (e.g. cell).

Figure 28:
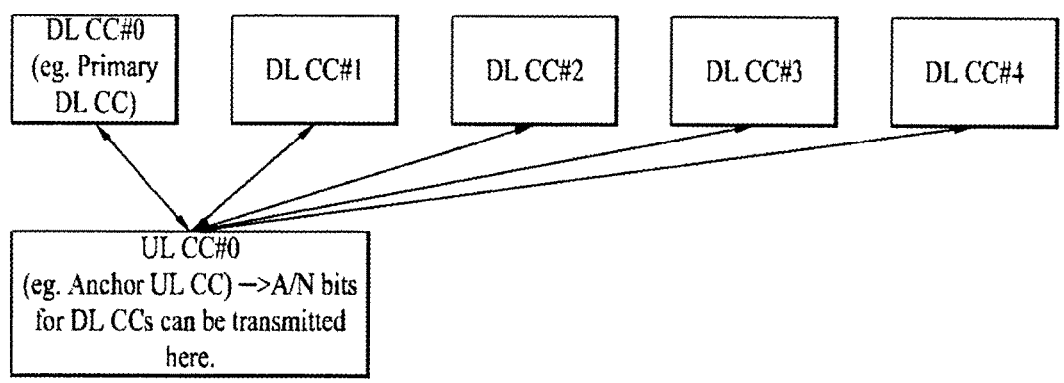
FIG. 28 illustrates asymmetrical carrier aggregation in which a plurality of DL CCs is linked to one UL CC.

FIG. 28 illustrates a scenario of transmitting UCI in a wireless communication system that supports carrier aggregation. This scenario is based on the assumption that UCI is ACK/NACK information. However, this is exemplary and UCI can include control information such as channel status information (e.g. CQI, PMI, RI, etc.) and scheduling request information (e.g. SR).

FIG. 28 illustrates asymmetrical carrier aggregation in which 5 DL CCs are linked to one UL CC. This asymmetrical carrier aggregation may be set from the viewpoint of UCI transmission. That is, DL CC-UL CC linkage for the UCI and DL CC-UL CC linkage for data may be different from each other. When it is assumed that one DL CC can transmit a maximum of two codewords, at least two UL ACK/NACK bits are needed. In this case, at least 10 ACK/NACK bits are necessary to transmit ACK/NACK information for data, received through 5 DL CCs, using one UL CC. If DTX status is also supported for each DL CC, at least 12 bits ($=5^5=3125=11.6$ bits) are needed for ACK/NACK transmission. The conventional PUCCH formats 1a/1b can transmit ACK/NACK information having a maximum of 2 bits, and thus it cannot transmit ACK/NACK information having an increased number of bits. While it has been described that carrier aggregation increases the quantity of UCI, an increase in the number of antennas, presence of a backhaul subframe in a TDD system and a relay system, etc. may cause an increase in the quantity of UCI. Similarly to ACK/NACK information, when control information related to a plurality of DL CCs is transmitted through one UL CC, the quantity of the control information increases. For example, when CQI/PMI/RI related to a plurality of DL CCs is transmitted through, a UCI payload may increase. A DL CC and a UL CC may also be respectively called a DL cell and a UL cell and an anchor DL CC and an anchor UL CC may be respectively called a DL primary cell (PCell) and a UL PCell.

The DL primary CC may be defined as a DL CC linked with the UL primary CC. Here, linkage includes both implicit linkage and explicit linkage. In LTE, one DL CC and one UL CC are uniquely paired. For example, a DL CC linked with the UL primary CC according to LTE paring can be called the DL primary CC. This can be regarded as implicit linkage. Explicit linkage means that a network configures a linkage in advance and it may be signaled through RRC. In explicit linkage, a DL CC paired with the UL primary CC may be called the DL primary CC. Here, the UL primary (anchor) CC may be a UL CC that carries a PUCCH. Otherwise, the UL primary CC may be a UL CC that carries UCI over a PUCCH or a PUSCH. The DL primary CC can be configured through higher layer signaling. The DL primary CC may be a DL CC through which a UE performs initial access. DL CCs other than the DL primary CC can be called DL secondary CCs. Similarly, UL CCs other than the UL primary CC can be called UL secondary CCs.

DL-UL pairing may correspond to FDD only. DL-UL pairing may not be additionally defined for TDD because TDD uses the same frequency. DL-UL linkage may be determined from UL linkage through UL EARFCN information of SIB2. For example, DL-UL linkage can be obtained through SIB2 decoding in the event of initial access and acquired through RRC signaling in other cases. Accordingly, only SIB2 linkage is present and other DL-UL pairing may not be explicitly defined. For example, in a 5DL:1UL structure shown in FIG. 28, DL CC#0 and UL CC#0 is in a SIB2 linkage relationship and other DL CCs may be in the SIB2 linkage relationship with other UL CCs that are not set to the corresponding UE.

Although embodiments of the present invention are herein focused on asymmetric carrier aggregation, it is merely for illustrative purpose and the present invention can be applied to various carrier aggregation scenarios including symmetric carrier aggregation.

A scheme for efficiently transmitting an increased quantity of UCI will now be described. Specifically, a new PUCCH format/signal processing procedure/resource allocation method for transmitting an increased quantity of UCI are proposed. In the following description, the PUCCH format proposed by the present invention is referred to as a new PUCCH format, LTE-A PUCCH format, or PUCCH format 3 in view of the fact that up to PUCCH format 2 has been defined in LTE. The technical spirit of the PUCCH format proposed by the present invention can be easily applied to an arbitrary physical channel (e.g. PUSCH) capable of transmitting UCI using the same or similar scheme. For example, an embodiment of the present invention can be applied to a periodic PUSCH structure that periodically transmits control information or an aperiodic PUSCH structure that aperiodically transmits control information.

In the following description, the UCI/RS symbol structure of the existing PUCCH format 1 (normal CP) of LTE is used as a subframe/slot level UCI/RS symbol structure applied to PUCCH format 3 according to an embodiment of the present invention. However, the subframe/slot level UCI/RS symbol structure is exemplary and the present invention is not limited to a specific UCI/RS symbol structure. In the PUCCH format 3 according to the present invention, the number of UCI/RS symbols, positions of the UCI/RS symbols, etc. may be freely changed according to system designs. For example, the PUCCH format 3 according to the present invention can be defined using the RS symbol structures of the existing PUCCH format 2/2a/2b of LTE.

The PUCCH format 3 according to embodiments of the present invention can be used to transmit arbitrary types/sizes of UCI. For example, the PUCCH format 3 can transmit information such as ACK/NACK, CQI, PMI, RS, SR, etc. or a combination thereof. This information may have a payload of an arbitrary size. Description of the following embodiments and drawings are focused on a case in which the PUCCH format 3 according to the present invention transmits ACK/NACK information.

Example 1

FIGS. 29a to 29f illustrate PUCCH format structures and signal processing procedures for the same according to an embodiment of the present invention.

Figure 29A:
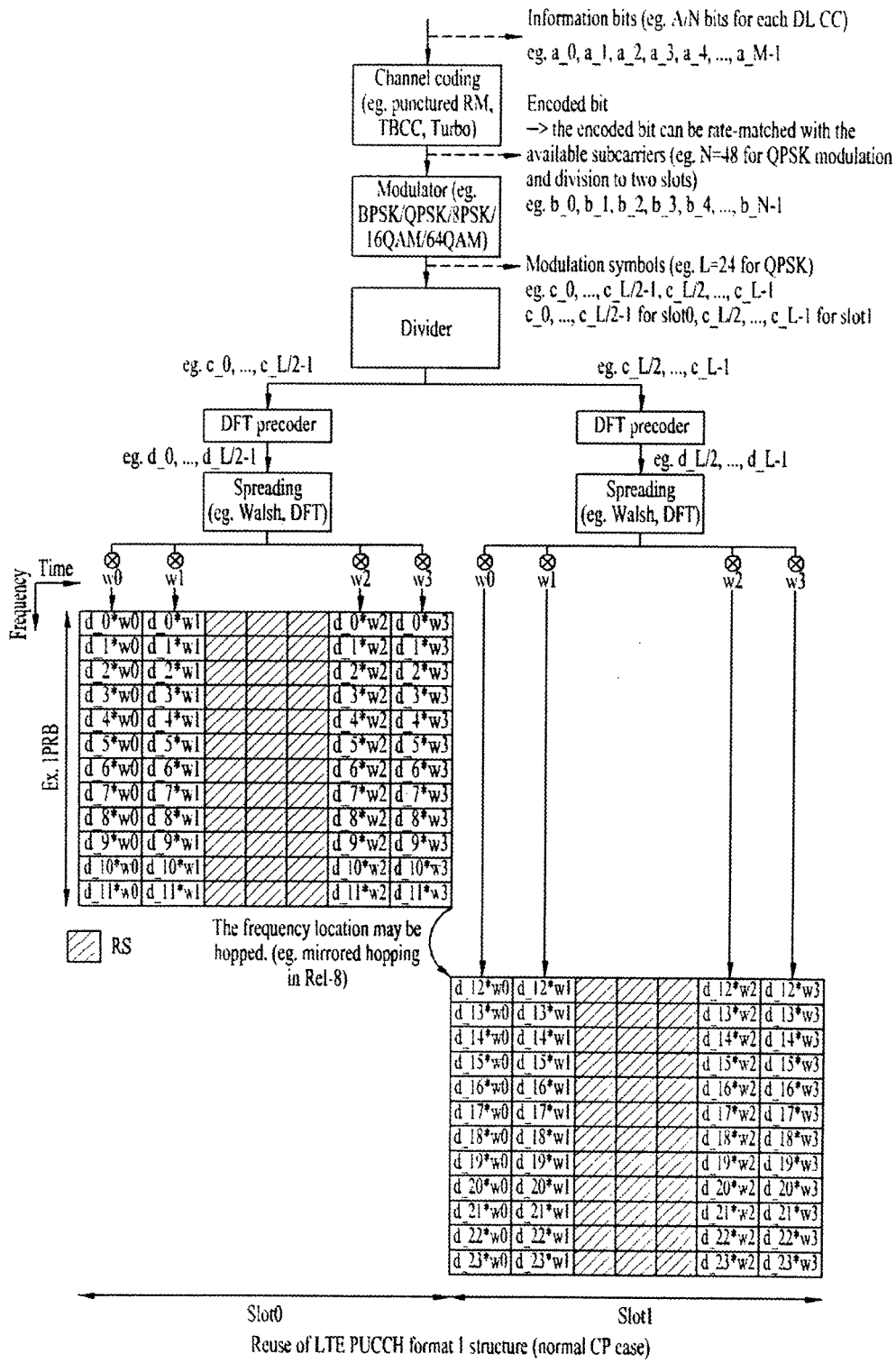
FIGS. 29A-F and 30 illustrate a PUCCH format and a signal processing procedure for the same according to an embodiment of the present invention.

FIG. 29a illustrates a case in which the PUCCH format according to the present invention is applied to PUCCH format 1 (normal CP). Referring to FIG. 29a, a channel coding block channel-codes information bits $a\_0, a\_1, \ldots, a\_M-1$ (e.g. multiple ACK/NACK bits) to generate encoded bits (coded bits or coding bits) (or a codeword) $b\_0, b\_1, \ldots, b\_N-1$. Here, M denotes an information bit size and N denotes an encoded bit size. The information bits include multiple ACK/NACK bits for a plurality of data (or PDSCH) received through a plurality of DL CCs, for example. The information bits $a\_0, a\_1, \ldots, a\_M-1$ are joint-coded regardless of the type/number/size of UCI that forms the information bits. For example, when the information bits include multiple ACK/NACK bits for a plurality of DL CCs, channel coding is performed for all information bits instead of each DL CC and each ACK/NACK bit to generate a single codeword. Channel coding is not limited thereto and includes simplex repetition, simplex coding, RM coding, punctured RM coding, Tail-biting convolutional coding (TBCC), low-density parity-check (LDPC) or turbo-coding. The encoded bits can be rate-matched in consideration of a modulation order and resource quantity, which is not shown in the figure. The rate matching function may be included in the channel coding block or may be executed through a separate functional block. For example, the channel coding block can perform (32,0) RM coding on multiple pieces of control information to generate a single codeword and carry out circular buffer rate-matching on the codeword.

A modulator modulates the encoded bits $b\_0, b\_1, \ldots, b\_N-1$ to generate modulation symbols $c\_0, c\_1, \ldots, c\_L-1$ where L denotes the size of the modulation symbols. A modulation method is performed by modifying the size and phase of a transmission signal. For example, the modulation method includes n-PSK (Phase Shift Keying) and n-QAM (Quadrature Amplitude Modulation) (n being an integer of 2 or greater). Specifically, the modulation method may include BPSK (Binary PSK), QPSK (Quadrature PSK), 8-PSK, QAM, 16-QAM, 64-QAM, etc.

A divider divides the modulation symbols $c\_0, c\_1, \ldots, c\_L-1$ into slots. The order/pattern/scheme of dividing the modulation symbols into slots are not particularly limited. For example, the divider can sequentially divide the modulation symbols into the slots (localized scheme). In this case, modulation symbols $c\_0, c\_1, \ldots, c\_L/2-1$ can be divided into slot 0 and modulation symbols $c\_L/2, c\_L/2+1, \ldots, c\_L-1$ can be divided into slot 1, as shown in FIG. 29a. Furthermore, the modulation symbols may be interleaved (or permuted) when divided into the slots. For example, even-numbered modulation symbols can be divided into slot 0 and odd-numbered modulation symbols can be divided into slot 1. The order of the modulation operation and division operation may be changed.

A DFT precoder performs DFT precoding (e.g. 12-point DFT) for the modulation symbols divided into each slot in order to generate a single carrier waveform. Referring to FIG. 29a, the modulation symbols $c\_0, c\_1, \ldots, c\_L/2-1$ divided into slot 0 can be DFT-precoded into DFT symbols $d\_0, d\_1, \ldots, d\_L/2-1$ and the modulation symbols $c\_L/2, c\_L/2+1, \ldots, c\_L-1$ divided into slot 1 can be DFT-precoded into DFT symbols $d\_L/2, d\_L/2+1, \ldots, d\_L-1$. DFT precoding can be replaced by other corresponding linear operations (e.g. Walsh precoding).

A spreading block spreads the DFT precoded signal at an SC-FDMA symbol level (time domain). Time domain spreading at an SC-FDMA symbol level is performed using a spreading code (sequence). The spreading code includes a quasi-orthogonal code and an orthogonal code. The quasi-orthogonal code includes a pseudo noise (PN) code. However, the quasi-orthogonal code is not limited thereto. The orthogonal code includes a Walsh code and a DFT code. However, the orthogonal code is not limited thereto. In the following description, the orthogonal code is used as the spreading code for ease of description. However, the orthogonal code is exemplary and can be replaced by the quasi-orthogonal code. The maximum value of spreading code size (or spreading factor SF) is limited by the number of SC-FDMA symbols used for control information transmission. For example, when 4 SC-FDMA symbols are used for control information transmission in one slot, a (quasi) orthogonal code w0, w1, w2, w3 having a length of 4 can be used for each slot. The SF means a spreading degree of control information and may be related to a UE multiplexing order or an antenna multiplexing order. The SF can be changed to 1, 2, 3, 4, ... according to system requirements, and pre-defined between a BS and a UE or signaled to the UE through DCI or RRC signaling. For example, when one of SC-FDMA symbols for control information is punctured in order to transmit an SRS, a spreading code with a reduced SF (e.g. SF=3 instead of SF=4) can be applied to control information of the corresponding slot.

The signal generated through the above-mentioned procedure is mapped to subcarriers in a PRB and then subjected to IFFT to be transformed into a time domain signal. A cyclic prefix is added to the time domain signal to generate SC-FDMA symbols which are then transmitted through an RF unit.

The above-mentioned procedure will now be described in more detail on the assumption that ACK/NACK bits for 5 DL CCs are transmitted. When each DL CC can transmit 2 PDSCHs, ACK/NACK bits for the DL CC may be 12 bits if a DTX status is included. A coding block size (after rate matching) may be 48 bits on the assumption that QPSK and SF=4 time spreading are used. Encoded bits are modulated into 24 QPSK symbols and 12 QPSK symbols are divided into each slot. In each slot, 12 QPSK symbols are converted to 12 DFT symbols through 12-point DFT. In each slot, 12 DFT symbols are spread and mapped to 4 SC-FDMA symbols using a spreading code with SF=4 in the time domain. Since 12 bits are transmitted through [2 bits×12 subcarriers×8 SC-FDMA symbols], the coding rate is 0.0625 (=12/192). In the case of SF=4, a maximum of 4 UEs can be multiplexed per PRB.

The signal mapped to the PRB in the procedure shown in FIG. 29a may be obtained through various equivalent signal processing procedures. Signal processing procedures equivalent to the signal processing procedure of FIG. 29a will now be described with reference to FIGS. 29b to 29g.

Figure 29B:
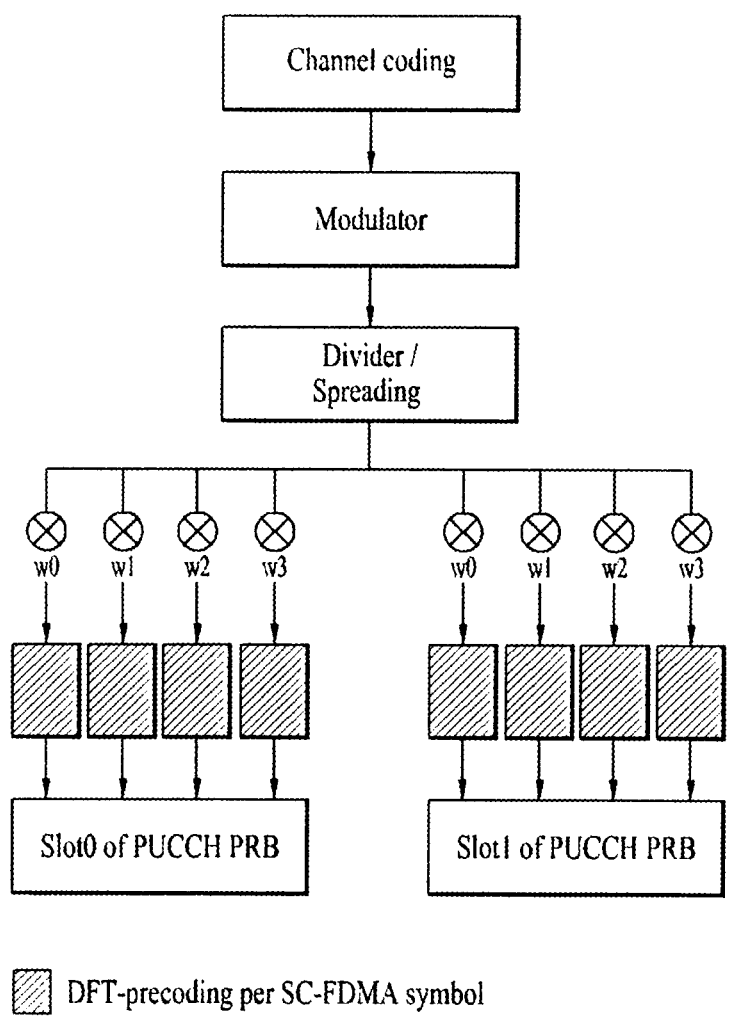

FIG. 29b shows a case in which the order of operations of the DFT precoder and the spreading block of FIG. 29a is changed. The function of the spreading block corresponds to operation of multiplying a DFT symbol sequence output from the DFT precoder by a specific constant at the SC-FMDA symbol level, and thus the same signal value is mapped to SC-FDMA symbols even though the order of operations of the DFT precoder and the spreading block is changed. Accordingly, the signal processing procedure for the PUCCH format 3 can be performed in the order of channel coding, modulation, division, spreading and DFT precoding. In this case, the division and spreading may be performed by one functional block. For example, modulation symbols can be alternately divided into slots and, simultaneously, spread at the SC-FDMA symbol level. Alternatively, the modulation symbols can be copied such that they correspond to the size of a spreading code when divided into the slots, and the copied modulation symbols can be multiplied one-to-one by respective elements of the spreading code. Accordingly, a modulation symbol sequence generated for each slot is spread to a plurality of SC-FDMA symbols. Then, a complex symbol sequence corresponding to the SC-FDMA symbols is DFT-precoded for each SC-FDMA symbol.

Figure 29C:
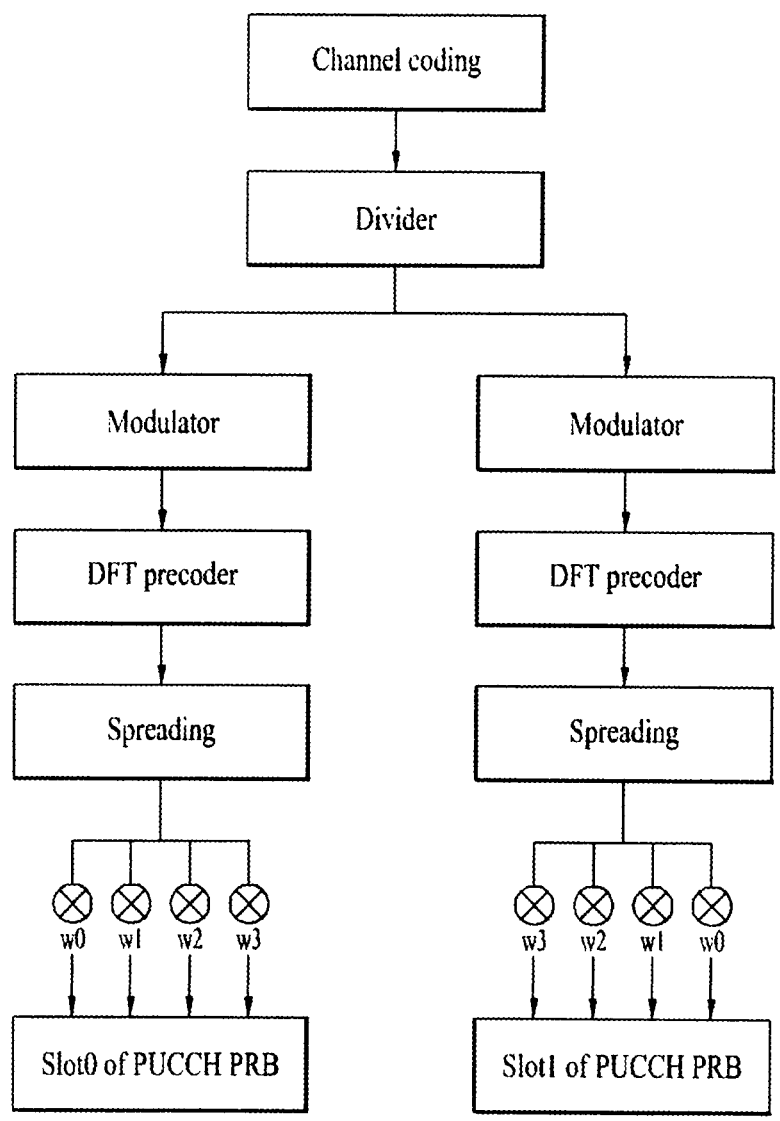

FIG. 29c shows a case in which the order of operations of the modulator and the divider of FIG. 29a is changed. In this case, in the signal processing procedure for PUCCH format 3, joint channel coding and division are performed at the subframe level, and modulation, DFT precoding and spreading are sequentially performed at the slot level.

Figure 29D:
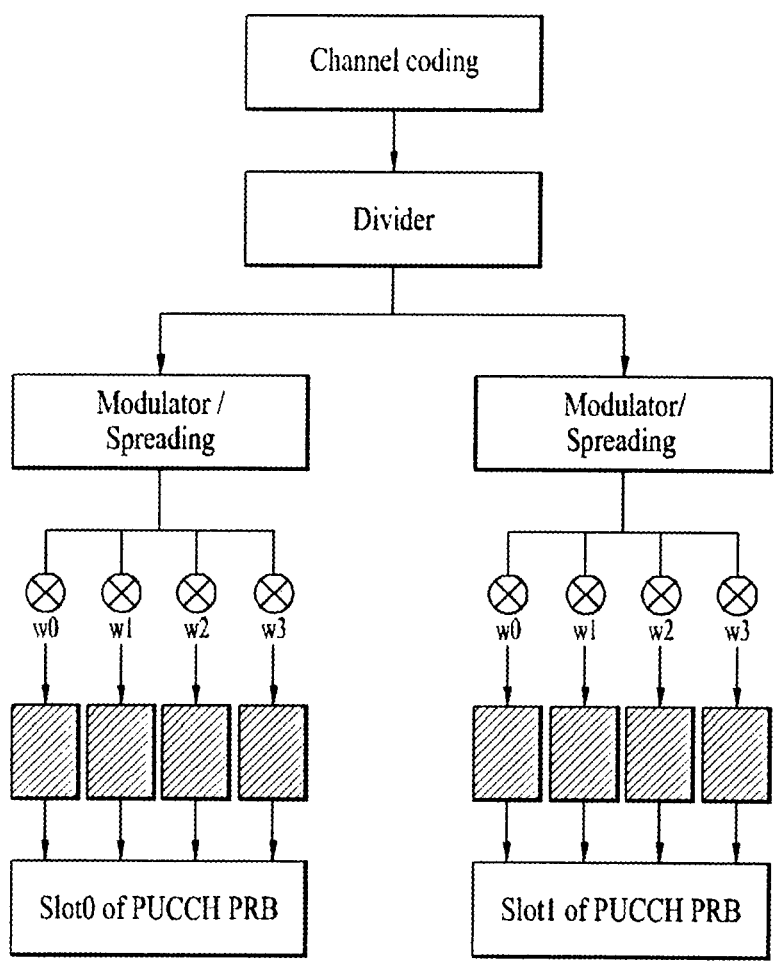

FIG. 29d shows a case in which the order of operations of the DFT precoder and the spreading block of FIG. 29c is changed. As described above, since the function of the spreading block corresponds to operation of multiplying a DFT symbol sequence output from the DFT precoder by a specific constant at the SC-FMDA symbol level, the same signal value is mapped to SC-FDMA symbols even though the order of operations of the DFT precoder and the spreading block is changed. Accordingly, in the signal processing procedure for PUCCH format 3, joint channel coding and division are performed at the subframe level, and modulation is carried out at the slot level. The modulation symbol sequence generated for each slot is spread to a plurality of SC-FDMA symbols and DFT-precoded for each SC-FDMA symbol. In this case, the modulation and spreading operations can be performed by one functional block. For example, the generated modulation symbols can be directly spread at the SC-FDMA symbol level during modulation of the encoded bits. Alternatively, during modulation of the encoded bits, the generated modulation symbols can be copied such that they correspond to the size of the spreading code and multiplied one-to-one by respective elements of the spreading code.

Figure 29E:
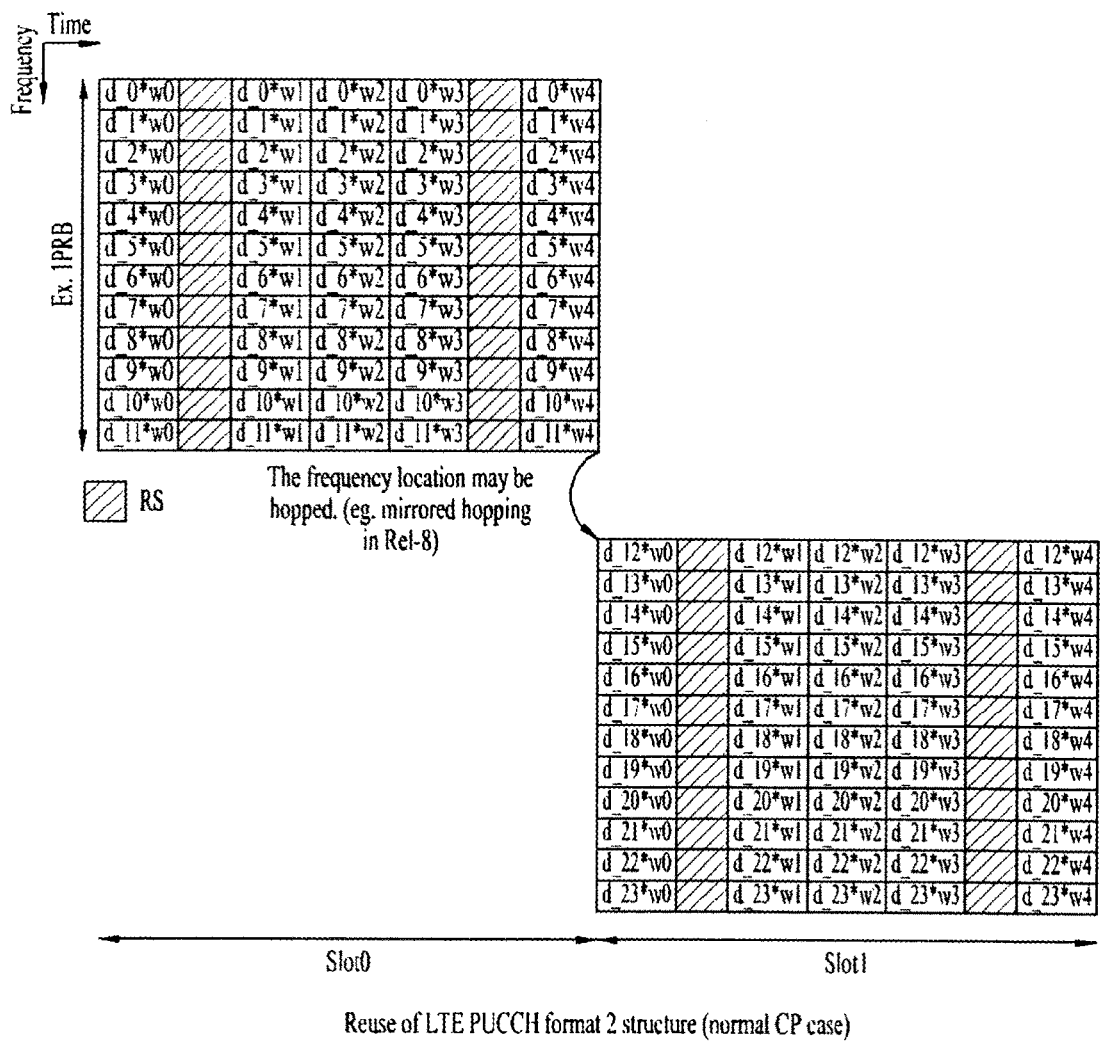
Figure 29F:
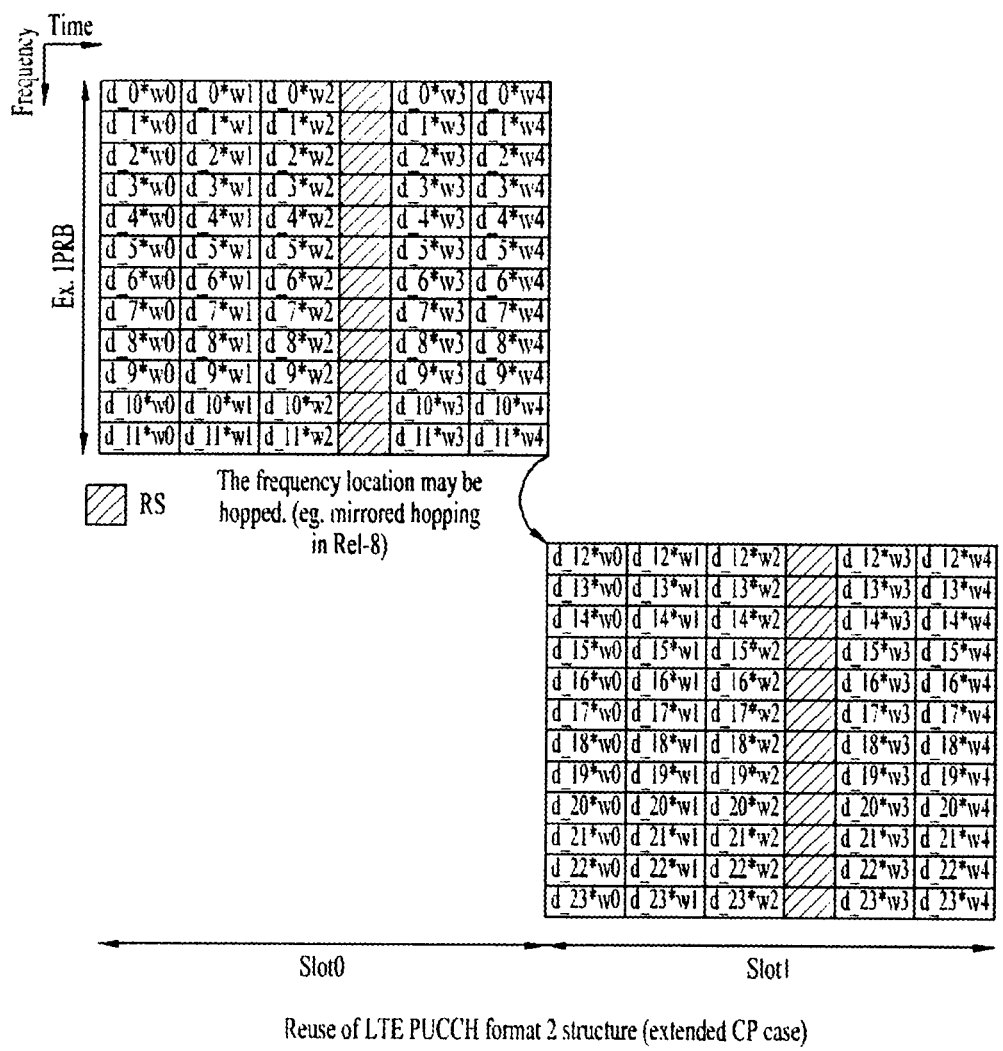

FIG. 29e shows a case in which PUCCH format 3 according to the present embodiment is applied to PUCCH format 2 (normal CP) and FIG. 29f shows a case in which PUCCH format 3 according to the present embodiment is applied to PUCCH format 2 (extended CP). While a basic signal processing procedure is the same as the procedures described with reference to FIGS. 29a to 29d, the numbers/positions of UCI SC-FDMA symbols and RS SC-FDMA symbols are different from those of FIG. 29a since PUCCH format 2 of LTE is reused.

Table 14 shows RS SC-FDMA symbol position in the PUCCH format 3. It is assumed that the number of SC-FDMA symbols in a slot is 7 (indexes: 0 to 6) in case of normal CP and 6 (indexes: 0 to 5) in case of extended CP.

TABLE 14

| | RS SC-FDMA symbol position | | |
|---|---|---|---|
| | Normal CP | Extended CP | Note |
| PUCCH format 3 | 2, 3, 4 1, 5 | 2, 3 3 | Reuse PUCCH format 1 Reuse PUCCH format 2 |

Tables 15 and 16 show exemplary spreading codes according to SF value. Table 15 shows DFT codes with SF=5 and SF=3 and Table 16 shows Walsh codes with SF=4 and SF=2. A DFT code is an orthogonal code represented by $\overline{w}_m = [w_0 \, w_1 \, \ldots \, w_{k-1}]$, where $w_k = \exp(j2\pi km/SF)$ where k denotes a DFT code size or SF value and m is 0, 1, ..., SF−1. Tables 15 and 16 show a case in which m is used as an index for orthogonal codes.

TABLE 15

| | Orthogonal code $\overline{w}_m = [w_0 \, w_1 \, \ldots \, w_{k-1}]$ | |
|---|---|---|
| Index m | SF = 5 | SF = 3 |
| 0 | [1 1 1 1 1] | [1 1 1] |
| 1 | [1 $e^{j2\pi/5}$ $e^{j4\pi/5}$ $e^{j6\pi/5}$ $e^{j8\pi/5}$] | [1 $e^{j2\pi/3}$ $e^{j4\pi/3}$] |
| 2 | [1 $e^{j4\pi/5}$ $e^{j8\pi/5}$ $e^{j2\pi/5}$ $e^{j6\pi/5}$] | [1 $e^{j4\pi/3}$ $e^{j2\pi/3}$] |
| 3 | [1 $e^{j6\pi/5}$ $e^{j2\pi/5}$ $e^{j8\pi/5}$ $e^{j4\pi/5}$] | |
| 4 | [1 $e^{j8\pi/5}$ $e^{j6\pi/5}$ $e^{j4\pi/5}$ $e^{j2\pi/5}$] | |

TABLE 16

| | Orthogonal code | |
|---|---|---|
| Index m | SF = 4 | SF = 2 |
| 0 | [+1 +1 +1 +1] | [+1 +1] |
| 1 | [+1 −1 +1 −1] | [+1 −1] |
| 2 | [+1 +1 −1 −1] | |
| 3 | [+1 −1 −1 +1] | |

Code index m may be designated in advance or signaled from the BS. For example, the code index m can be implicitly linked with a CCE index (e.g. the lowest CCE index) constituting a PDCCH. The code index m may be explicitly designated through a PDCCH or RRC signaling. Furthermore, the code index m may be derived from a value designated through the PDCCH or RRC signaling. The code index m may be independently given for each subframe, each slot, and multiple SC-FDMA symbols. Preferably, the code index m can be changed for each subframe, each slot and multiple SC-FDMA symbols. That is, the code index m can be hopped at a predetermined interval.

Cell-specific scrambling using a scrambling code (e.g. a PN code such as a Gold code) corresponding to a physical cell ID (PCI) or UE-specific scrambling using a scrambling code corresponding to a UE ID (e.g. RNTI) can be additionally applied for inter-cell interference randomization, which is not shown in the figure. Scrambling may be performed for the entire information, performed in SC-FDMA symbols, carried out between SC-FDMA symbols, or carried out for both the entire information and SC-FDMA symbols. Scrambling the entire information can be achieved by performing scrambling on the information bits, encoded bits and modulation symbols prior to division. Intra-SC-FMDA symbol scrambling may be implemented by performing scrambling on the modulation symbols or DFT symbols after division. Inter-SC-FDMA symbol scrambling may be achieved by carrying out scrambling on the SC-FDMA symbols in the time domain after spreading.

UE multiplexing can be achieved by applying CDM before being subjected to the DFT precoder. For example, the signal before being subjected to the DFT precoder is a time domain signal, and thus CDM can be implemented through circular shift (or cyclic shift) or Walsh (or DFT) spreading. CDM can be performed at the information bit level, encoded bit level and modulation symbol level. Specifically, a case of multiplexing 2 UEs to one SC-FDMA symbol using a Walsh code with SF=2 is exemplified. When QPSK is performed on 12 encoded bits, a complex signal of $a_0 \, a_1 \, a_2 \, a_3 \, a_4 \, a_5$ is generated. An example of spreading control information of each UE using Walsh code [+1 +1] [+1 −1] is as follows.

UE#0: [+1 +1] is applied. $a_0 \, a_1 \, a_2 \, a_3 \, a_4 \, a_5 \, a_0 \, a_1 \, a_2 \, a_3 \, a_4 \, a_5$ are transmitted.

UE#1: [+1 −1] is applied. $a_0 \, a_1 \, a_2 \, a_3 \, a_4 \, a_5 \, -a_0 \, -a_1 \, -a_2 \, -a_3 \, -a_4 \, -a_5$ are transmitted.

In this case, interleaving may be additionally performed. The interleaving may be applied before or after spreading. An example of applying both the spreading and interleaving is as follows.

UE#0: [+1 +1] is applied. $a_0 \, a_0 \, a_1 \, a_1 \, a_2 \, a_2 \, a_3 \, a_3 \, a_4 \, a_4 \, a_5 \, a_5$ are transmitted.

UE#1: [+1 −1] is applied. $a_0, -a_0, a_1, -a_1, a_2, -a_2, a_3, -a_3, a_4, -a_4, a_5, -a_5$ are transmitted.

A signal generated from spreading and/or interleaving in a stage prior to the DFT precoder is subjected to DFT precoding (and additionally subjected to time spreading at the SC-FDMA symbol level as necessary) and mapped to subcarriers of the corresponding SC-FDMA symbols.

Figure 30:
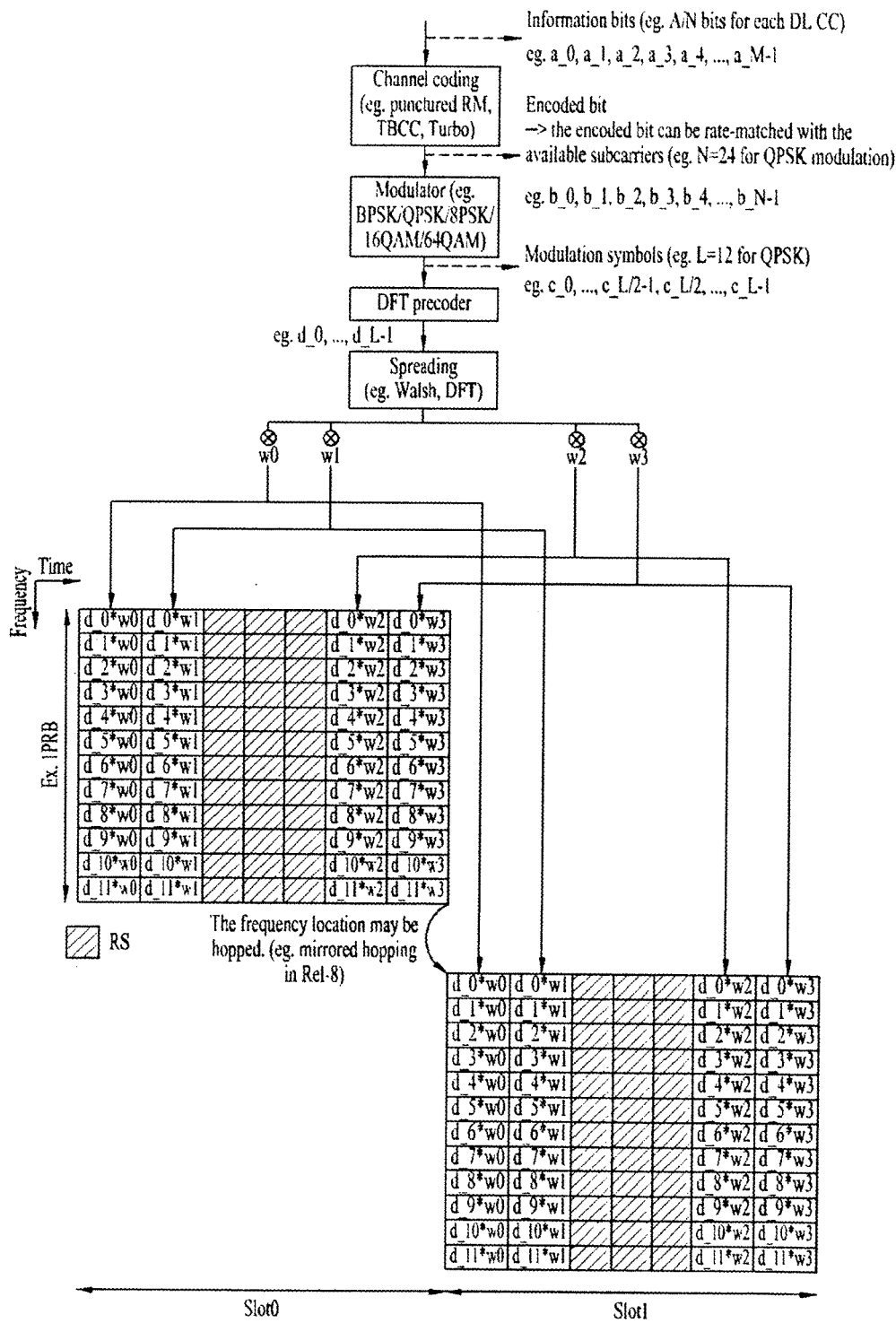

FIG. 30 illustrates another exemplary PUCCH format according to the present embodiment of the invention. While the PUCCH format shown in FIG. 30 has the same basic structure as that of the PUCCH format shown in FIG. 29, the PUCCH format of FIG. 30 is different from the PUCCH format of FIG. 29 in that the same encoded bits are repeated on a slot-by-slot basis. Accordingly, a signal processing block shown in FIG. 30 does not include a divider.

A description will be given of methods of allocating a PUCCH resource to a UE on the assumption that multiple ACK/NACK bits are transmitted for data received through a plurality of DL CCs. For convenience of description, the PUCCH resource includes a resource for control information transmission and/or a resource for RS transmission and it is assumed that a (quasi) orthogonal resource for control information transmission is referred to as resource A and a (quasi) orthogonal resource for RS transmission is referred to as resource B. Resource A includes at least one of a PRB index and a spreading code (e.g. Walsh code) index. One representative logical index may be given for resource A and the PRB index and spreading code index may be derived from the representative logical index. Resource B includes at least one of a PRB index, a circular shift index and an orthogonal cover index. One representative logical index may be given for resource B, and the PRB index, circular shift index and orthogonal cover index may be inferred from the representative logical index. The logical indexes of resource A and resource B may be linked with each other. Furthermore, indexes of resources constituting resource A and resource B may be linked with each other. Alternatively, a separate (representative) PUCCH resource index may be defined and linked with resource A and/or resource B. That is, resource A and/or resource B may be inferred from the separate PUCCH resource index.

A first resource allocation method signals both resource A and resource B. For example, both resource A and resource B can be signaled through physical control channel (e.g. PUCCH) or RRC signaling. In this case, the resource A index for control information transmission and the resource B index for RS transmission may be respectively signaled or only one thereof may be signaled. For example, if RS format and indexing conform to LTE, only resource B index for RS transmission can be signaled. Because it is preferable to transmit control information in the same PRB as that of the RS, the PRB index for the control information may be derived from the resource B index for the RS, and the control information may be transmitted through a PRB corresponding to the PRB index. The orthogonal code index used for the control information may be derived from the orthogonal cover index or circular shift index used for the RS. Alternatively, it is possible to signal an additional PUCCH resource index and infer resource A and/or resource B from the additional PUCCH resource index. That is, when the additional PUCCH resource index is given, the PRB and/or the orthogonal cover index for the control information and the PRB, orthogonal cover index and/or circular shift index for the RS can be inferred from the additional PUCCH resource index.

To reduce signaling overhead and efficiently use resources, a plurality of candidate PUCCH resources (indexes) can be signaled to a UE or a UE group through higher layer signaling (e.g. RRC signaling) and a specific PUCCH resource (index) can be indicated through a physical control channel (e.g. PDCCH). As described above, a PUCCH resource (index) can be given as [resource A index and resource B index], [resource A index or resource B index] or [separate PUCCH resource index]. Specifically, the PUCCH resource index can be signaled through a PDCCH of a DL secondary CC. When carrier aggregation is applied, transmit power control (TPC) of a DL secondary CC need not be used because a PUCCH is transmitted through the UL primary CC only. Accordingly, the PUCCH resource (index) can be signaled through a TPC field of a PDCCH transmitted through a DL secondary CC.

A second resource allocation method reuses the implicit method of LTE in case of dynamic ACK/NACK resource allocation. For example, a resource index that corresponds to the lowest CCE index of a PDCCH corresponding to a DL grant of a specific DL CC (e.g. primary DL CC) and conforms to LTE rule ($n_r = n_{cce} + N\_PUCCH^{(1)}$) can be inferred. Here, $n_r$ denotes the resource A (and/or resource B) index, $n_{cce}$ denotes the lowest CCE index constituting the PDCCH, and $N\_PUCCH^{(1)}$ denotes a value configured by a higher layer. For example, the RS can use a resource corresponding to the inferred resource index. In the case of control information, the PRB index can be derived from the inferred resource index and ACK/NACK information for a plurality of DL CCs can be transmitted using a corresponding resource (e.g. spreading code) in the PRB corresponding to the PRB index. When the resource index corresponding to the RS is inferred from the resource index corresponding to the control information, the circular shift index used for the RS cannot be derived from the resource index corresponding to the control information because the resource corresponding to the circular shift index from among RS resources (e.g. a combination of the circular shift, orthogonal cover and PRB index) is not used for the control information.

A scheme of transmitting a PUCCH using a multi-antenna transmission method will now be described. While 2Tx transmit diversity scheme is described in the following embodiment, the embodiment can be equally/similarly applied to an n-Tx transmit diversity scheme. It is assumed that a (quasi) orthogonal resource for control information transmission is referred to as resource A and a (quasi) orthogonal resource for RS transmission is referred to as resource B. Logical indexes of resource A and resource B may be liked with each other. For example, if the logical index of resource B is given, the logical index of resource A can be automatically provided. The logical indexes of resource A and resource B may be configured through different physical configuration methods. The following two cases are present.

(1) Control information can be transmitted through the same PRB at all antennas (ports).

A. The control information can be transmitted through two different resources A (e.g. Walsh or DFT codes with different indexes) selected for each antenna (port).

B. An RS can be transmitted through two different resources B (e.g. a combination of a circular shift and a DFT cover) selected for each antenna (port).

(2) The control information can be transmitted through different PRBs for antennas. For example, the control information can be transmitted through PRB#4 at antenna (port) 0 and transmitted through PRB#6 at antenna (port) 1.

A. Resources for the control information transmitted through different antennas (ports) are not particularly limited (i.e. the resources can be equal to and different from each other).

B. Resources for RSs transmitted through different antennas (ports) are not particularly limited (i.e. the resources can be equal to and different from each other).

In a multi-antenna transmit (e.g. 2Tx transmit) mode, two resources A (e.g. orthogonal codes) for control information transmission and two resources B (e.g. a combination of a circular shift and a DFT cover) for RS transmission can be defined in advance or provided through physical control channel (e.g. PDCCH)/RRC signaling. In this case, signaling for the control information and RS can be individually performed. When resource information for one antenna (port) is signaled, resource information for the other antenna (port) can be inferred from the previously signaled resource information. For example, the spreading code index m for the control information can be designated in advance or signaled from the BS. Otherwise, the spreading code index m can be implicitly linked with a CCE index that configures a PDCCH. Or, the spreading code index m can be explicitly designated through PDCCH or RRC signaling. The spreading code index m can be linked with the orthogonal code index or circular shift index for the RS. The spreading code index m can be changed on a subframe, slot or multi-SC-FDMA symbol basis. That is, the spreading code index m can be hopped in the unit of a specific interval (e.g. slot).

Example 2

Figure 31:
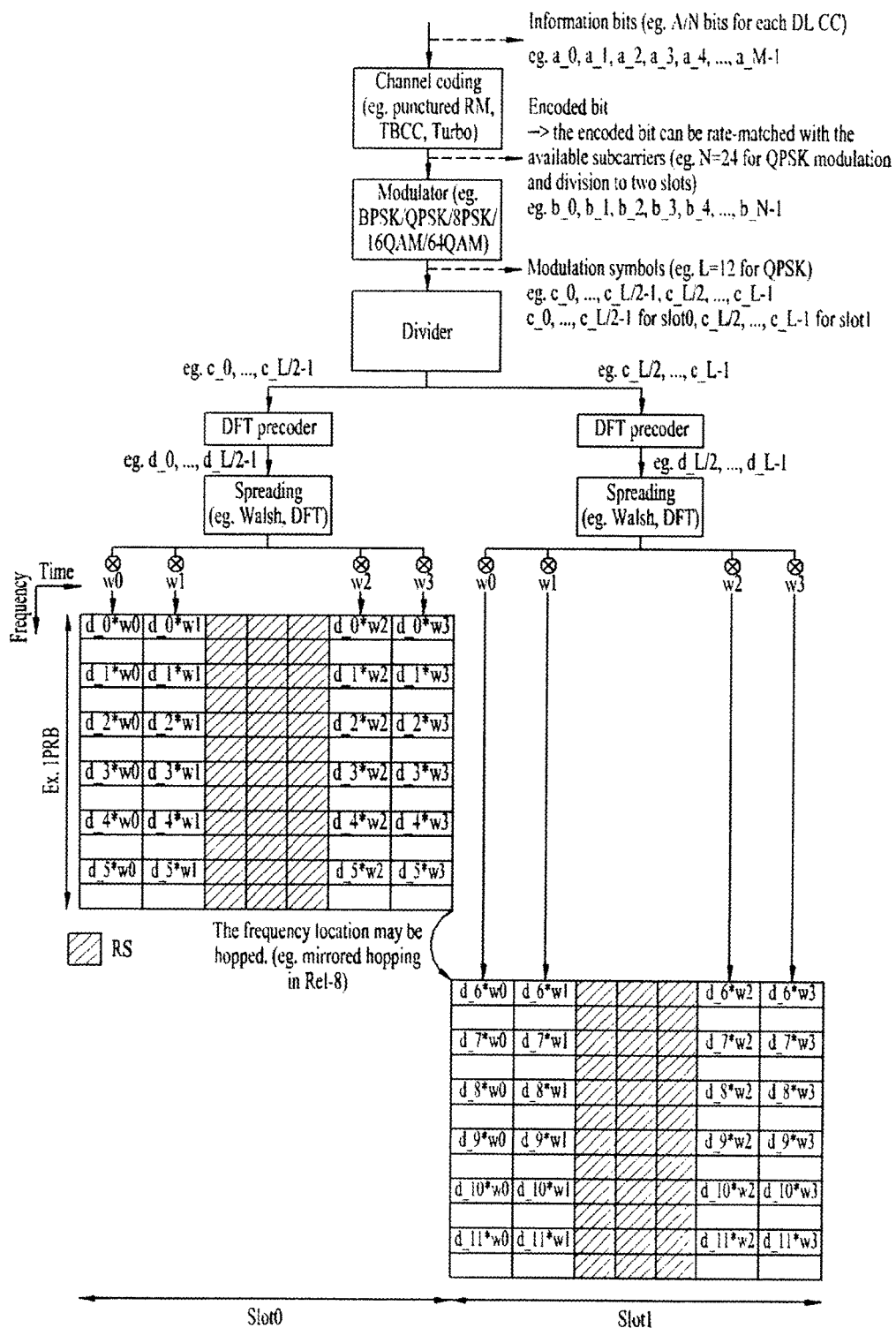
FIGS. 31 to 34 illustrate a PUCCH format and a signal processing procedure for the same according to another embodiment of the present invention.
Figure 32:
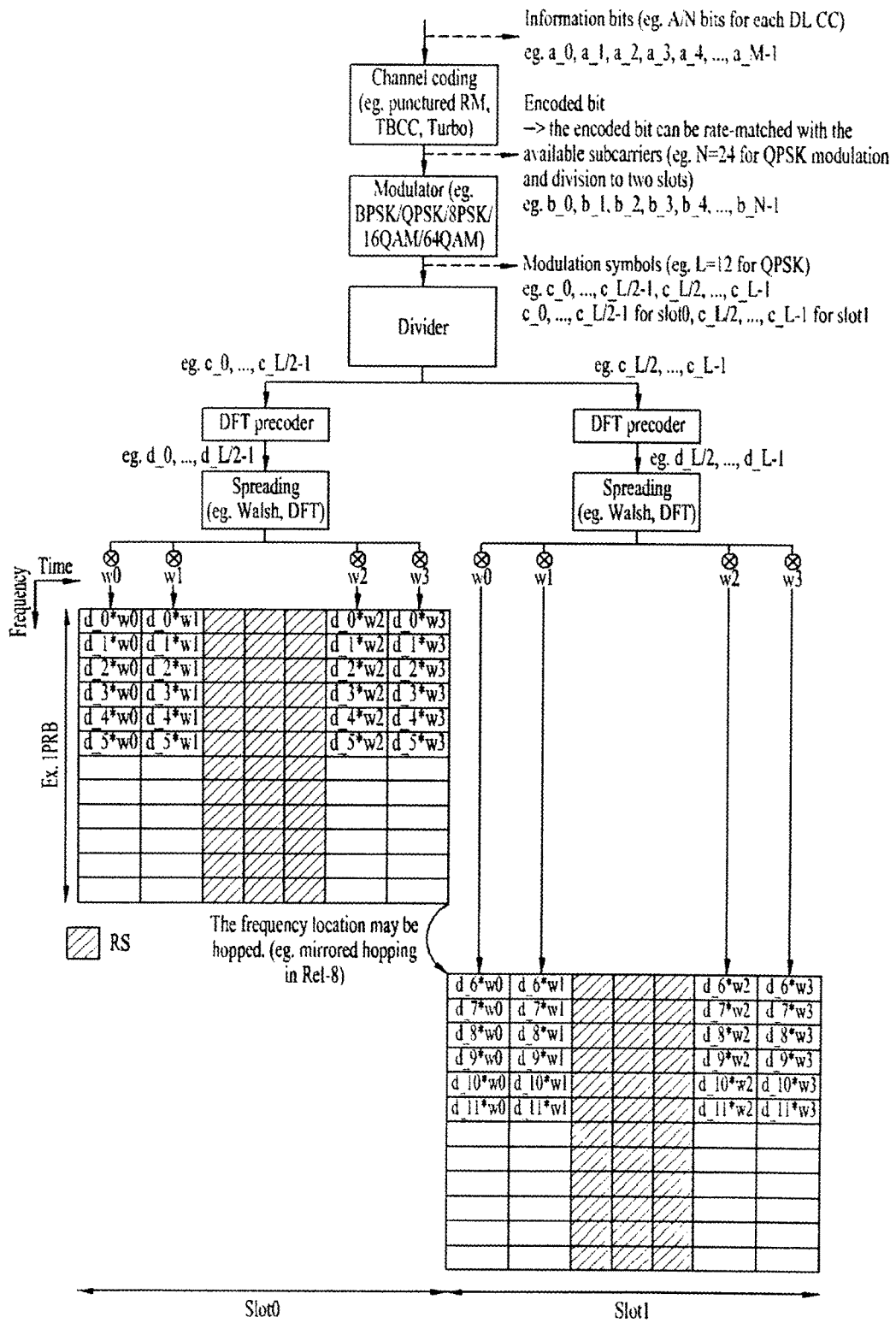

FIGS. 31 and 32 illustrate PUCCH format structures and signal processing procedures for the same according to another embodiment of the present invention. In the present embodiment, control information is FDM-mapped to the frequency domain according to interleaving and local schemes. FDM mapping can be used for UE multiplexing or antenna (port) multiplexing. The present embodiment can be applied to CDM mapping using time/frequency domain cyclic shift.

Referring to FIG. 31, a channel coding block channel-codes information bits $a\_0, a\_1, \ldots, a\_M-1$ (e.g. multiple ACK/NACK bits) to generate encoded bits (coded bits or coding bits) (or a codeword) $b\_0, b\_1, \ldots, b\_N-1$. Here, M denotes an information bit size and N denotes an encoded bit size. The information bits include multiple ACK/NACK bits, for example. The information bits $a\_0, a\_1, \ldots, a\_M-1$ are joint-coded regardless of the type/number/size of UCI that forms the information bits. For example, when the information bits include multiple ACK/NACK bits for a plurality of DL CCs, channel coding is not performed per each DL CC or individual ACK/NACK bit but performed for all information bits, thereby generating a single codeword. Channel coding is not limited thereto and includes simple repetition, simplex coding, RM coding, punctured RM coding, Tail-biting convolutional coding (TBCC), low-density parity-check (LDPC) or turbo-coding. The encoded bits can be rate-matched in consideration of a modulation order and resource quantity, which is not shown in the figure. The rate matching function may be included in the channel coding block or may be executed through a separate functional block.

A modulator modulates the encoded bits $b\_0, b\_1, \ldots, b\_N-1$ to generate modulation symbols $c\_0, c\_1, \ldots, c\_L-1$ where L denotes the size of the modulation symbols. A modulation method is performed by modifying the size and phase of a transmission signal. For example, the modulation method includes n-PSK (Phase Shift Keying) and n-QAM (Quadrature Amplitude Modulation) (n being an integer of 2 or greater). Specifically, the modulation method may include BPSK (Binary PSK), QPSK (Quadrature PSK), 8-PSK, QAM, 16-QAM, 64-QAM, etc.

A divider divides the modulation symbols $c\_0, c\_1, \ldots, c\_L-1$ into slots. The order/pattern/scheme of dividing the modulation symbols into slots are not particularly limited. For example, the divider can sequentially divide the modulation symbols into the slots (localized type). In this case, modulation symbols $c\_0, c\_1, \ldots, c\_L/2-1$ can be divided into slot 0 and modulation symbols $c\_L/2, c\_L/2+1, \ldots, c\_L-1$ can be divided into slot 1, as shown in FIG. 29a. Furthermore, the modulation symbols may be interleaved (or permuted) when divided into the slots. For example, even-numbered modulation symbols can be divided into slot 0 and odd-numbered modulation symbols can be divided into slot 1. The order of the modulation operation and division operation may be changed.

A DFT precoder performs DFT precoding (e.g. 6-point DFT) for the modulation symbols divided into each slot in order to generate a single carrier waveform. Referring to FIG. 29a, the modulation symbols $c\_0, c\_1, \ldots, c\_L/2-1$ divided into slot 0 can be DFT-precoded into DFT symbols $d\_0, d\_1, \ldots, d\_L/2-1$ and the modulation symbols $c\_L/2, c\_L/2+1, \ldots, c\_L-1$ divided into slot 1 can be DFT-precoded into DFT symbols $d\_L/2, d\_L/2+1, \ldots, d\_L-1$. DFT precoding can be replaced by another corresponding linear operation (e.g. Walsh precoding).

A spreading block spreads the DFT precoded signal at an SC-FDMA symbol level (time domain). Time domain spreading at an SC-FDMA symbol level is performed using a spreading code (sequence). The spreading code includes a quasi-orthogonal code and an orthogonal code. The orthogonal code includes a Walsh code and a DFT code. However, the orthogonal code is not limited thereto. The maximum spreading code size (or spreading factor SF) is limited by the number of SC-FDMA symbols used for control information transmission. For example, when 4 SC-FDMA symbols are used for control information transmission in one slot, a (quasi) orthogonal code w0, w1, w2, w3 having a length of 4 can be used for each slot. The SF means a spreading degree of control information and may be related to a UE multiplexing order or an antenna multiplexing order. The SF can be changed to 1, 2, 3, 4, . . . according to system requirements, and pre-defined between a BS and a UE or signaled to the UE through DCI or RRC signaling. For example, when an SC-FDMA symbol for transmitting control information according to an SRS, a spreading code with SF=3 can be applied to control information of the corresponding slot. Examples of the spreading code may refer to Tables 15 and 16.

The signal generated through the above-mentioned procedure is mapped to subcarriers in a PRB. Distinguished from the first embodiment, the spread signal is non-contiguously mapped to the subcarriers in SC-FDMA symbols. FIG. 31 shows a case in which the spread signal is mapped in the SC-FDMA symbols in an interleaving manner and FIG. 32 shows a case in which the spread signal is mapped in the SC-FDMA symbols in a localized manner. The frequency domain signal mapped to the subcarriers is transformed to a time domain signal through IFFT. A CP is added to the time domain signal to generate SC-FDMA symbols which are then transmitted through an RF unit.

The above-mentioned procedure will now be described in more detail on the assumption that ACK/NACK bits for 5 DL CCs are transmitted. When each DL CC can transmit 2 PDSCHs, ACK/NACK bits for the DL CC may be 12 bits when a DTX status is included. A coding block size (after rate matching) may be 24 bits on the assumption that QPSK, SF=4 time spreading and non-contiguous mapping are used. Encoded bits are modulated into 12 QPSK symbols and 6 QPSK symbols are divided into each slot. In each slot, 6 QPSK symbols are converted to 6 DFT symbols through 6-point DFT. In each slot, 6 DFT symbols are spread and mapped to 4 SC-FDMA symbols using a spreading code with SF=4 in the time domain. Since 12 bits are transmitted through [2 bits×6 subcarriers×8 SC-FDMA symbols], the coding rate is 0.125 (=12/96). In the case of SF=4, a maximum of 8 UEs can be multiplexed per PRB.

If a subcarrier spacing is changed from 2 blocks to 3 blocks when the DFT symbols are mapped to the frequency domain, a maximum of 12 UEs can be multiplexed. When the subcarrier interval is configured to 4/6 blocks, a maximum of 16/24 UEs can be multiplexed. Here, the RS can employ the DFT code with SF=3 and circular shift used in LTE. In the case of a Walsh code with SF=4 in LTE, [1 1 −1 −1] is not used because the multiplexing order is limited by SF=3 of the RS. However, the present invention can define [1 1 −1 −1] such that it can be reused.

Cell-specific scrambling using a scrambling code (e.g. a PN code such as a Gold code) corresponding to a physical cell ID (PCI) or UE-specific scrambling using a scrambling code corresponding to a UE ID (e.g. RNTI) can be additionally applied for inter-cell interference randomization, which is not shown in the figure. Scrambling may be performed for the entire information, performed in SC-FDMA symbols, carried out between SC-FDMA symbols, or carried out for both the entire information and SC-FDMA symbols. Scrambling the entire information can be achieved by performing scrambling at the information bit level, encoded bit level or modulation symbol level prior to division. Intra-SC-FMDA symbol scrambling may be implemented by performing scrambling on the modulation symbols or DFT symbols after division. Inter-SC-FDMA symbol scrambling may be achieved by carrying out scrambling on the SC-FDMA symbols in the time domain after spreading.

UE multiplexing can be achieved by applying CDM to a signal before being subjected to the DFT precoder. For example, the signal before being subjected to the DFT precoder is a time domain signal, and thus CDM can be implemented through circular shift (or cyclic shift) or Walsh (or DFT) spreading. CDM multiplexing can be performed for one at the information bit level, encoded bit level and modulation symbol level. Specifically, a case of multiplexing 2 UEs to one SC-FDMA symbol using a Walsh code with SF=2 is exemplified. When QPSK is performed on 6-bit encoded bits, a complex signal of $a_0$, $a_1$, $a_2$ is generated. Control information of each UE is spread using Walsh code [+1 +1] [+1 −1] as follows.

UE#0: [+1 +1] is applied. $a_0$, $a_1$, $a_2$, $a_0$, $a_1$, $a_2$ are transmitted.

UE#1: [+1 −1] is applied. $a_0$, $a_1$, $a_2$, $-a_0$, $-a_1$, $-a_2$ are transmitted.

In this case, interleaving may be additionally performed. The interleaving may be applied before or after spreading. Both the spreading and interleaving are applied as follows.

UE#0: [+1 +1] is applied. $a_0$, $a_0$, $a_1$, $a_1$, $a_2$, $a_2$ are transmitted.

UE#1: [+1 −1] is applied. $a_0$, $-a_0$, $a_1$, $-a_1$, $a_2$, $-a_2$ are transmitted.

Figure 33:
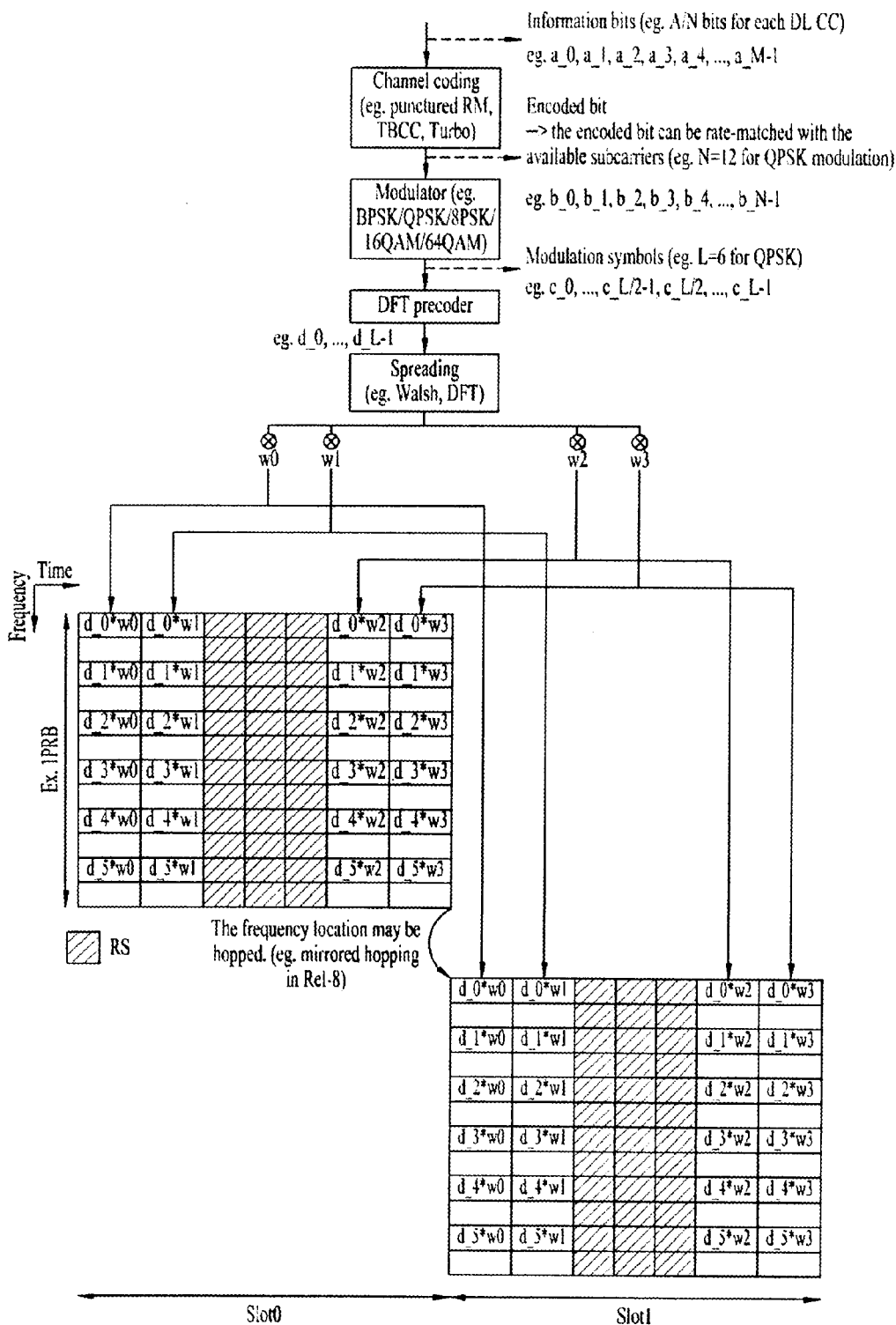
Figure 34:
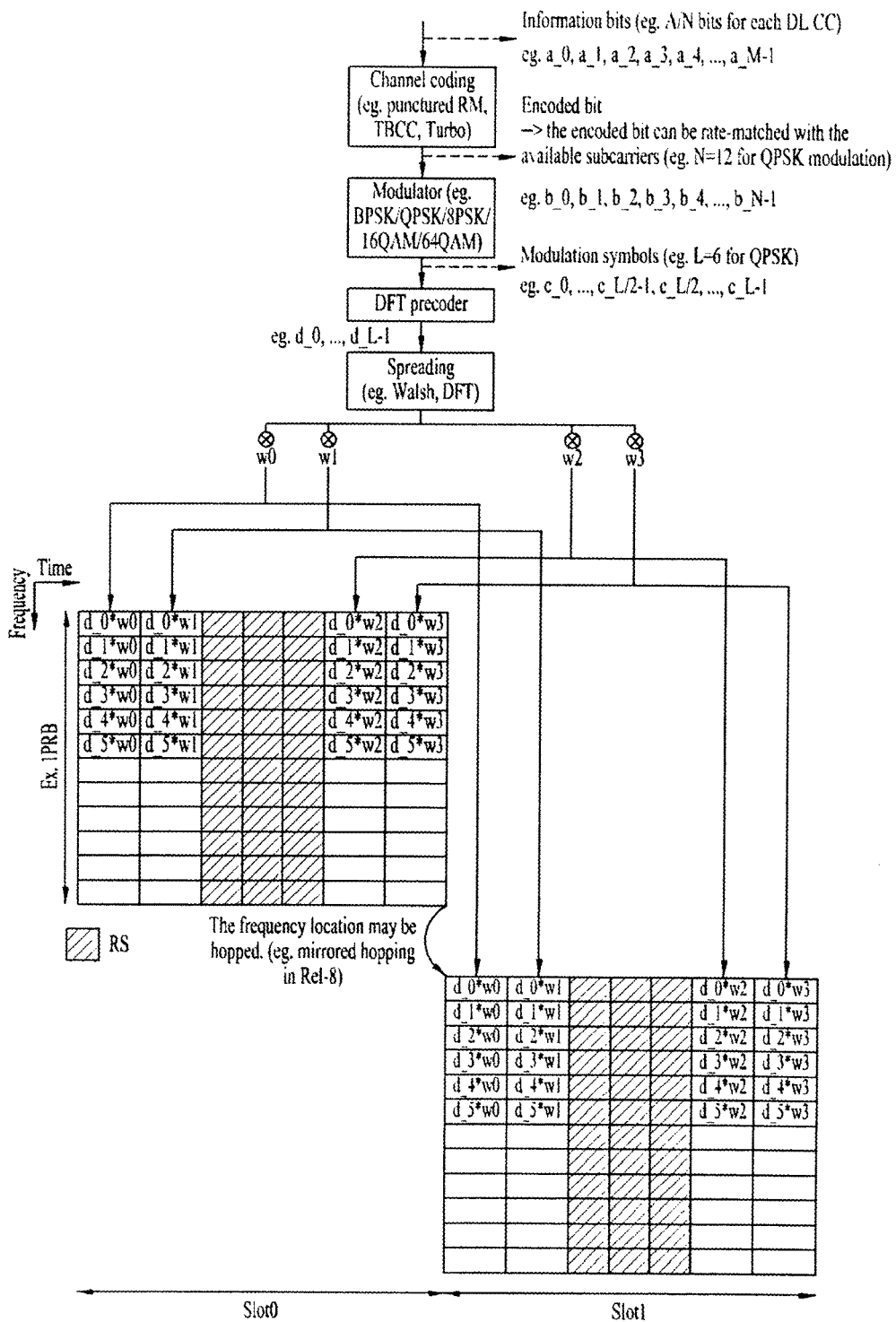

FIGS. 33 and 34 illustrate another exemplary PUCCH format according to the present embodiment of the invention. While the PUCCH format shown in FIGS. 33 and 34 has the same basic structure as that of the PUCCH formats shown in FIGS. 31 and 32, the PUCCH format of FIGS. 33 and 34 is distinguished from the PUCCH format of FIGS. 31 and 32 in that the same encoded bits are repeated on a slot-by-slot basis. Accordingly, a signal processing block shown in FIGS. 33 and 34 does not include a divider.

A description will be given of methods of allocating a PUCCH resource to a UE on the assumption that multiple ACK/NACK bits are transmitted for data received through a plurality of DL CCs. For convenience of description, it is assumed that a (quasi) orthogonal resource for control information transmission is referred to as resource A and a (quasi) orthogonal resource for RS transmission is referred to as resource B. Resource A includes at least one of a PRB index, a spreading code (e.g. Walsh code) index and a subcarrier shift (or offset or index) according to frequency factor. One representative logical index may be given for resource A and the PRB index, spreading code index and a subcarrier shift (or offset or index) according to frequency factor may be derived from the representative logical index. Resource B includes at least one of a PRB index, a circular shift index and an orthogonal cover index. One representative logical index may be given for resource B, and the PRB index, circular shift index and orthogonal cover index may be inferred from the representative logical index. The logical indexes of resource A and resource B may be linked with each other. Furthermore, indexes of resources constituting resource A and resource B may be linked with each other.

A first resource allocation method signals both resource A and resource B. For example, both resource A and resource B can be signaled through physical control channel (e.g. PUCCH) or RRC signaling. In this case, the resource A index for control information transmission and the resource B index for RS transmission may be respectively signaled or only one thereof may be signaled. For example, if RS format and indexing conform to LTE, only resource B index for RS transmission can be signaled. Because it is preferable to transmit control information in the same PRB as that of the RS, the PRB index for the control information may be derived from the resource B index for the RS and the control information may be transmitted through a PRB corresponding to the PRB index. The orthogonal code index used for the control information may be derived from the orthogonal cover index or circular shift index used for the RS. The subcarrier shift (or offset or index) according to frequency factor for resource A may be inferred from the circular shift index used for the RS. Alternatively, the subcarrier shift (or offset or index) according to frequency factor for resource A may be RRC signaled. Here, the frequency factor (or linear operation corresponding thereto, e.g. the reciprocal of the frequency factor) can be RRC signaled or implicitly determined on the basis of the number of DL CCs. That is, the frequency factor can be configured by the system or previously designated.

FDM mapping can also be applied to the RS. The RS can be directly generated in the frequency domain without a DFT precoder (i.e. the DFT precoder can be omitted) because a previously designated low-CM sequence is used whereas a low PAPR/CM signal is generated using DFT precoding in the case of control information. However, it may be technically preferable to apply CDM mapping using circular shift to the RS rather than FDM mapping for the following reason.

Design of sequences with various lengths is required when FDM mapping is used for the RS. That is, a new sequence with a length of 6 is needed when a frequency factor (FF) (or subcarrier interval) is 2 although a minimum sequence length for the RS is 12 in LTE.

When FDM mapping is used for the RS, channel estimation performance may be deteriorated in a high frequency selective channel because a channel of a specific frequency position is estimated and interpolation is performed on other positions. However, the channel estimation performance is not deteriorated because the RS covers all frequency regions in the case of CDM mapping.

A second resource allocation method reuses the implicit method of LTE in case of dynamic ACK/NACK resource allocation. For example, a resource index that corresponds to the lowest CCE index of a PDCCH corresponding to a DL grant of a specific DL CC (e.g. primary DL CC) and conforms to LTE rule ($n_r = n_{cce} + N\_PUCCH^{(1)}$) can be inferred. Here, $n_r$ denotes the resource A (and/or resource B) index, $n_{cce}$ denotes the lowest CCE index constituting the PDCCH, and $N\_PUCCH^{(1)}$ denotes a value configured by higher layers. For example, the RS can use a resource corresponding to the inferred resource index. In the case of control information, the PRB index can be derived from the inferred resource index and ACK/NACK information for a plurality of DL CCs can be transmitted using a corresponding resource (e.g. spreading code and/or subcarrier shift (or offset or index) according to frequency factor) in the PRB corresponding to the PRB index. When the resource index corresponding to the RS is inferred from the resource index corresponding to the control information, the circular shift index used for the RS cannot be derived from the resource index corresponding to the control information because the resource corresponding to the circular shift index from among RS resources (e.g. a combination of the circular shift, orthogonal cover and PRB index) is not used for the control information.

FIGS. 35 to 41 illustrate a method of defining a resource index according to an embodiment of the present invention. FIGS. 35 and 41 show a case in which a resource index (i.e. resource A index) for control information is defined as a combination of a subcarrier mapping pattern/position (e.g. subcarrier index of offset) and a spreading code (e.g. orthogonal code). When a PRB for RS transmission is confirmed, a PRB for control information transmission can be configured as the PRB for RS transmission. Otherwise, the PRB for control information transmission can be signaled through physical control channel (e.g. PDCCH)/RRC signaling. In the present embodiment, a subcarrier shift (or offset or index) according to frequency factor for the control information can be inferred from the circular shift index of the RS. Otherwise, the subcarrier shift (or offset or index) according to frequency factor can be RRC signaled. Here, the frequency factor can be RRC signaled or implicitly determined on the basis of the number of DL CCs. That is, the frequency factor can be configured by the system or previously designated. In this case, a representative index for indicating a combination (e.g. [PRB, spreading code] or [PRB, spreading code, frequency factor]) of detailed resources may not be separately defined in a channel resource for the control information.

Referring to FIGS. 35 to 41, numerals in boxes mean resource indexes (i.e. resource A indexes for control information transmission). In the present embodiment, resource indexes for the control information are linked with [orthogonal code indexes, subcarrier shifts (or offsets or indexes)]. Accordingly, the control information is spread at the SC-FDMA symbol level using an orthogonal code corresponding to resource indexes and mapped to subcarriers corresponding to the resource indexes. While the resource indexes are counted in ascending order of frequency resource (subcarrier index) in FIGS. 35 to 41, the resource indexes may be counted on the basis of the orthogonal code index axis. FIGS. 35b, 36b, 37b, 38b, 39b and 40b show that resource indexing for the control information is limited by an RS multiplexing order. For example, if the RS multiplexing order is 3 and a Walsh code with SF=4 is used for control information transmission, [+1 +1 −1 −1] (resource index 3) may not be used, as in LTE.

The resource indexes may be relative values (e.g. offset). For example, PUCCH format 2/2a/2b may be transmitted through the outermost portion of a band, 1 PRB in which PUCCH formats 1/1a/1b and 2/2a/2b coexist may be located inside the outermost portion of the band, and PUCCH format 1/1a/1b may be transmitted through a portion inside the portion where PUCCH formats 1/1a/1b and 2/2a/2b coexist in LTE. When a PRB for PUCCH format 1/1a/1b and a PRB for PUCCH format 2/2a/2b are present together (only one PRB is allowed in LTE), if the number of ACK/NACK resources is M in the corresponding PRBs, n represents M+n. Here, each frequency resource (e.g. frequency factor) or orthogonal code index can be cell-specifically/UE-specifically hopped at the SC-FDMA symbol level/slot level.

FIG. 41 illustrates a case in which orthogonal resource indexes are staggered for each orthogonal code index or circularly shifted along the frequency axis. In this case, the resource indexes in FIG. 37a are staggered by subcarrier for each orthogonal code index. Circular shifts or orthogonal code indexes can be cell-specifically/UE-specifically hopped at the SC-FDMA symbol level/slot level.

FIG. 42 illustrates a resource indexing method for an RS. Resource indexing for an RS may conform to the method defined in LTE.

Referring to FIG. 42, numerals in boxes denote resource indexes (i.e. indexes of resource B for RS transmission). In this example, the resource indexes for the RS are linked with [circular shift values, orthogonal code indexes]. Accordingly, an RS sequence is circular-shifted by a value corresponding to a resource index along the frequency axis and covered in the time domain with an orthogonal code corresponding to the resource index. In FIG. 42, $\Delta_{shift}^{PUCCH}$ denotes a circular shift interval and a used circular shift value may be $c \cdot \Delta_{shift}^{PUCCH}$ (c being a positive integer). A phase shift value according to a circular shift can be given as $\alpha(n_s,l)=2\pi \cdot n_{cs}(n_s,l)/N_{sc}^{RB}$ where $n_s$ is a slot index, l is an SC-FDMA symbol index, $n_{cs}(n_s,l)$ is a circular shift value, and $N_{sc}^{RB}$ denotes the number of subcarriers that form a resource block.

In this example, the resource indexes for the RS are counted first along the circular shift axis. However, the resource indexes may be counted first along the orthogonal code axis.

$\Delta_{shift}^{PUCCH}$ of the RS and the frequency factor of control information (or a corresponding linear operation, e.g. the reciprocal of the frequency factor) can be signaled through physical control channel (e.g. PDCCH) or RRC signaling.

Resource indexing for the control information may correspond to resource indexing for the RS. In this case, only one of the control information resource index and RS resource index may be signaled to a UE through physical control channel (e.g. PDCCH)/RRC signaling and the other may be inferred from the resource index signaled to the UE. For example, the frequency factor can be inferred from information (e.g. the circular shift spacing) about circular shift used in the RS. If conventional $\Delta_{shift}^{PUCCH}$ signaling is reused, both $\Delta_{shift}^{PUCCH}$ for the RS and the frequency factor (interval) for the control information can be designated through one-time $\Delta_{shift}^{PUCCH}$ signaling. Specifically, they are associated with resource indexing shown in FIG. 42 and resource indexing shown in FIGS. 35b, 36b, 37b, 38b, 39b and 40b, respectively.

Table 17 shows an example of mapping $\Delta_{shift}^{PUCCH}$ and the frequency factor.

TABLE 17

| $\Delta_{shift}^{PUCCH}$ | Frequency Factor (FF) |
|---|---|
| 1 | 1 |
| 2 | 2 |
| 3 | 3 |
| 4 | 4 |
| 6 | 6 |
| 12 | 12 |

Table 18 shows an example of mapping $\Delta_{shift}^{PUCCH}$ and the frequency factor in consideration of the number of available resources (i.e. multiplexing order). For example, when the multiplexing order according to circular shift is 6 in one SC-FDMA symbol, $\Delta_{shift}^{PUCCH}=2$ and FF=6 can be paired.

TABLE 18

| $\Delta_{shift}^{PUCCH}$ | Frequency Factor (FF) | Multiplexing order due to circular shift only |
|---|---|---|
| 1 | 12 | 12 |
| 2 | 6 | 6 |

TABLE 18-continued

| $\Delta_{shift}^{PUCCH}$ | Frequency Factor (FF) | Multiplexing order due to circular shift only |
|---|---|---|
| 3 | 4 | 4 |
| 4 | 3 | 3 |
| 6 | 2 | 2 |
| 12 | 1 | 1 |

Alternatively, the frequency factor can be RRC signaled or implicitly determined on the basis of the number of DL CCs. Specifically, the frequency factor can be implicitly determined on the basis of the number of configured DL CCs or on the basis of the number of activated DL CCs. For example, a frequency factor for 5 configured (activated) DL CCs can be configured to 2 in advance and used. Frequency factors for 4, 3, 2 and 1 configured (activated) DL CCs can be implicitly configured and used, respectively.

Figure 43A:
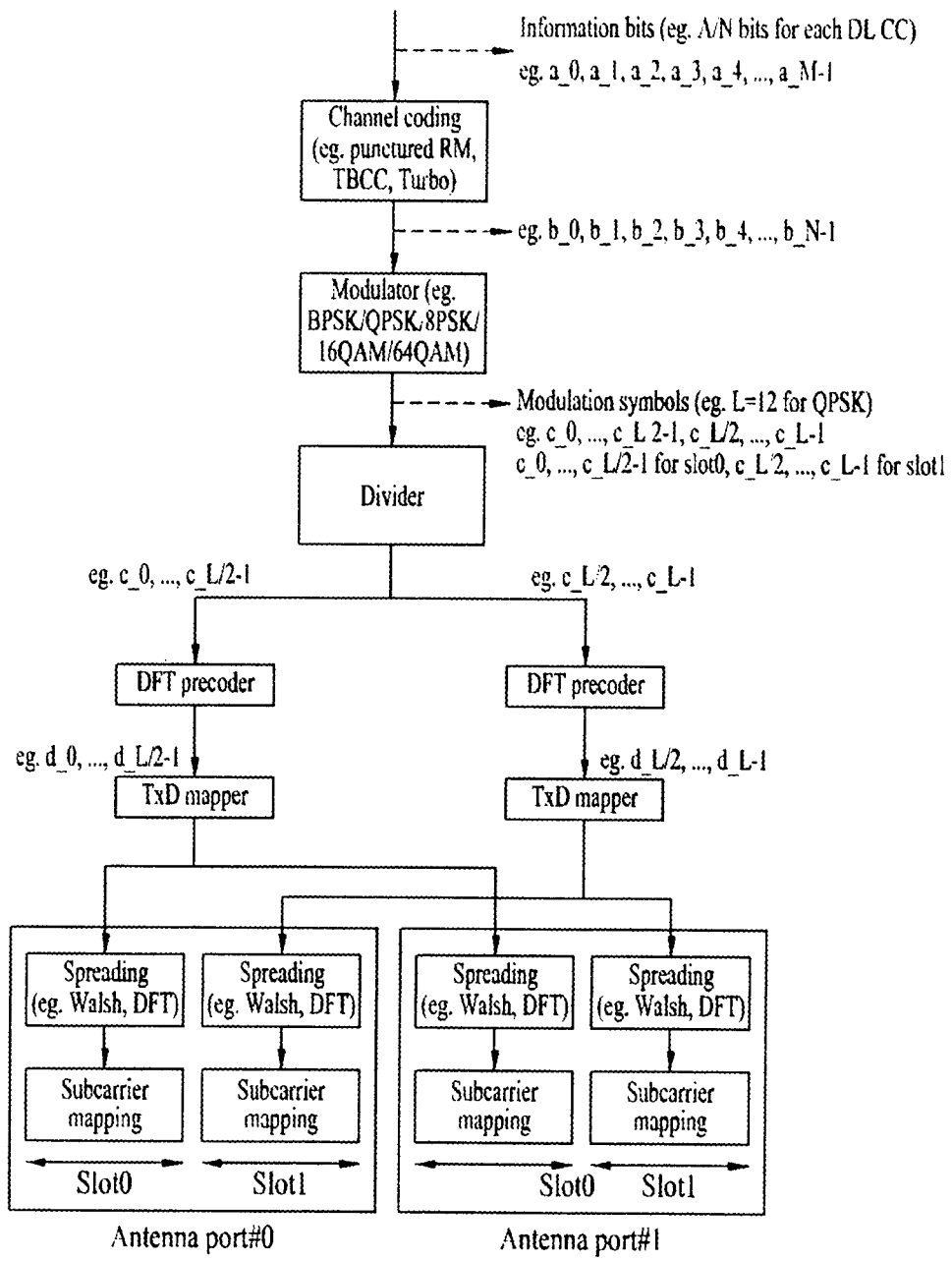
FIGS. 43A-C illustrate a signal processing procedure for transmitting a PUCCH through multiple antennas according to an embodiment of the present invention.

FIG. 43a illustrates a signal processing procedure to transmit control information through multiple antennas. Since the overall flow of the signal processing procedure shown in FIG. 43a is similar to those of embodiments 1 and 2, described with reference to FIGS. 29 to 34, the following description is focused on a transmit diversity (TxD) mapper, which is a main difference between the signal processing procedure of FIG. 43a and the signal processing procedures of FIGS. 29 to 34. The TxD mapper performs resource allocation/MIMO (Multiple Input Multiple Output) precoding/process for transmitting the control information through multiple antennas (ports).

A description will be given of a scheme of transmitting a PUCCH in a MIMO mode using the TxD mapper. While 2Tx transmit diversity scheme is described in the following embodiment, the embodiment can be equally/similarly applied to an n-Tx transmit diversity scheme. It is assumed that a (quasi) orthogonal resource for control information transmission is referred to as resource A and a (quasi) orthogonal resource for RS transmission is referred to as resource B. Logical indexes of resource A and resource B may be liked with each other. For example, if the logical index of resource B is given, the logical index of resource A can be automatically provided. The logical indexes of resource A and resource B may be configured through different physical configuration methods. The following two cases are present.

(1) Control information can be transmitted through the same PRB at all antennas (ports).

A. The control information can be transmitted through two different resources A (e.g. a combination of an orthogonal code and a subcarrier shift (or offset or index) according to frequency factor). For example, the orthogonal code includes a Walsh code and a DFT code and the frequency factor can be given as $N_{sc}/N_{freq}$ or the reciprocal thereof. Here, $N_{sc}$ denotes the number of subcarriers in a PRB and $N_{freq}$ denotes the number of subcarriers used for control information transmission.

B. An RS can be transmitted through two different resources B (e.g. a combination of a circular shift and a DFT cover) selected for each antenna (port).

(2) The control information can be transmitted through different PRBs for antennas. For example, the control information can be transmitted through PRB#4 at antenna (port) 0 and transmitted through PRB#6 at antenna (port) 1.

A. Resources for the control information transmitted through different antennas (ports) are not particularly limited (i.e. the resources can be equal to and different from each other).

B. Resources for RSs transmitted through different antennas (ports) are not particularly limited (i.e. the resources can be equal to and different from each other).

In a multi-antenna transmit (e.g. 2Tx transmit) mode, two resources A (e.g. a combination of an orthogonal code and subcarrier position (e.g. shift, offset or index) according to frequency factor) for control information transmission and two resources B (e.g. a combination of a circular shift and a DFT cover) for RS transmission can be defined in advance or provided through physical control channel (e.g. PDCCH)/RRC signaling. In this case, signaling for the control information and RS can be individually performed. When resource information for one antenna (port) is signaled, resource information for the other antenna (port) can be inferred from the previously signaled resource information. For example, code index m and/or the subcarrier position (e.g. shift, offset or index) according to frequency factor can be designated in advance or signaled from the BS. Otherwise, code index m and/or the subcarrier position (e.g. shift, offset or index) according to frequency factor can be implicitly linked with a CCE index that consists of a PDCCH. Or, code index m and/or the subcarrier position (e.g. shift, offset or index) according to frequency factor can be explicitly designated through PDCCH or RRC signaling. The code index m and/or the subcarrier position (e.g. shift, offset or index) according to frequency factor can be changed on a subframe, slot or multi-SC-FDMA symbol basis. That is, the code index m and/or the subcarrier position (e.g. shift, offset or index) according to frequency factor can be hopped in the unit of a specific time interval (e.g. slot).

If the multiplexing order for the RS is more than twice the multiplexing order for the control information, the following 2Tx transport diversity scheme can be applied. In this case, two from among resources CS+OC+PRB for the RS may be used for channel estimation of each transmit antenna and only one resource (subcarrier position+OC+PRB) may be used for the control information.

As another transport diversity scheme, the Alamouti scheme can be applied to an output value of the DFT precoder in the frequency domain. The Alamouti scheme can be represented by the following matrix.

$$\begin{pmatrix} s_1 & -s_2^* \\ s_2 & s_1^* \end{pmatrix} \qquad \text{[Equation 10]}$$

Here, column 0 and column 1 respectively denote signal vectors transmitted through antenna (port) 0 and antenna (port) 1, row 0 and row 1 respectively denote complex signal vectors transmitted through first and second subcarriers, * represents complex conjugate operation. Any form linearly transformed from the matrix can be applied to the present invention.

When the Alamouti scheme is applied to the PUCCH format according to the embodiment of the present invention, the order of DFT symbols mapped to SC-FDMA symbols corresponding to antenna (port) 1 is changed for every two DFT symbols. For example, d_0, d_1, d_2, d_3 are mapped to the SC-FDMA symbols corresponding to antenna (port) 0 whereas −d_1*, d_0*, −d_3*, d_2* are mapped to the SC-FDMA symbols corresponding to antenna (port) 1. This damages single carrier property of the signal mapped to antenna (port) 1, and thus CM increases at antenna (port) 1.

Figure 43B:
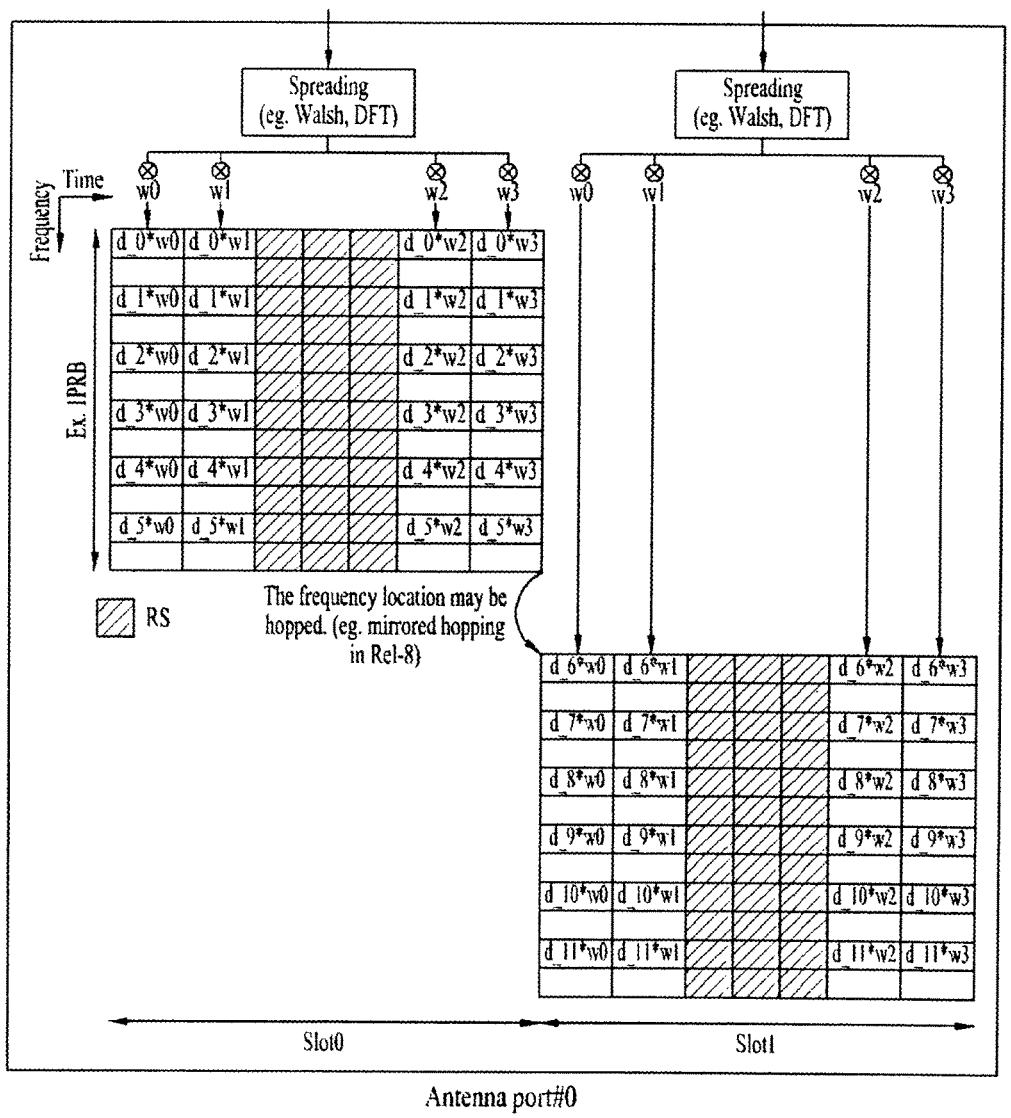
Figure 43C:
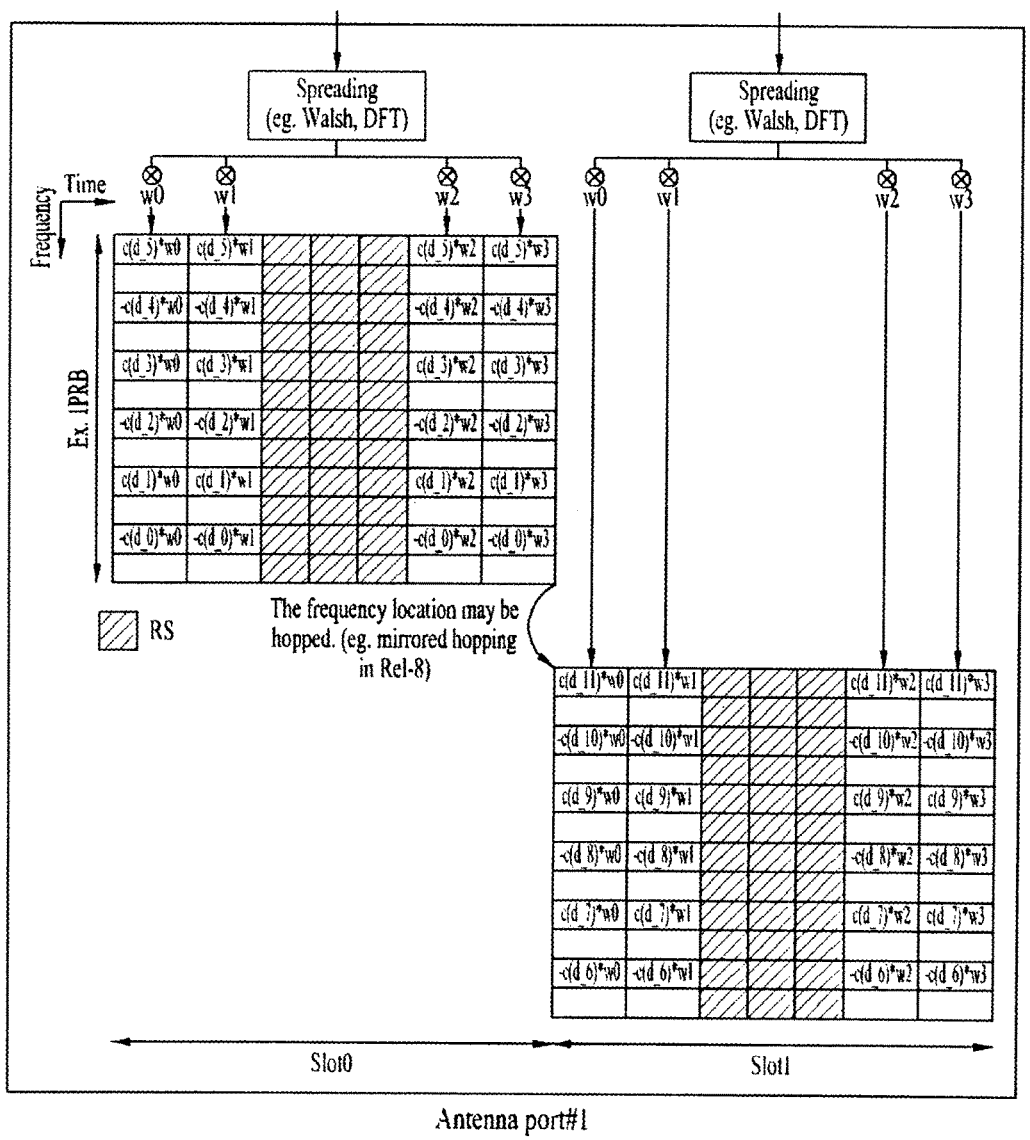

A multi-antenna coding scheme that does not cause CM increase even when the Alamouti scheme is applied will now be described with reference to FIGS. 43*b* and 43*c*. FIGS. 43*b* and 43*c* illustrate the spreading operation.

Referring to FIGS. 43*b* and 43*c*, when the control information is mapped to antenna (port) 0, the complex signal is mapped to subcarriers after being subjected to DFT precoding. When the control information is mapped to antenna (port) 1, (1) mapping to subcarriers in SC-FDMA symbols in reverse order, (2) complex conjugate operation and (3) alternative minus sign addition are performed. Operations (1), (2) and (3) are exemplary and the order of the operations can be changed. This scheme can be equally applied to the embodiments of the present invention. For example, referring to FIG. 29 or 30, a complex symbol sequence mapped to SC-FDMA symbols transmitted through a first antenna (port) and a second antenna (port) can be given as follows.

First antenna (port): $a_k$

Second antenna (port): $(-1)^{mod(k,2)} \cdot conj(a_{11-k})$ [Equation 11]

Here, $a_k$ denotes the complex symbol sequence mapped to subcarriers of the SC-FDMA symbols, k denotes a complex symbol index (0 to 11), mod (a, b) represents the remainder obtained when a is divided by b, and conj(a) represents the complex conjugate value of a.

Equation 12 assumes a case in which the complex signal is mapped to all subcarriers in the SC-FDMA symbols. Equation 16 can be normalized to Equation 11 considering a case in which the frequency factor is used as shown in FIGS. 31 to 34.

First antenna (port): $a_k$

Second antenna (port): $(-1)^{mod(k,2)} \cdot conj(a_{n-k})$ or $(-1)^{mod(k+1,2)} \cdot conj(a_{n-k})$ [Equation 12]

Here, n represents (length of complex symbol sequence $a_k$ mapped to the subcarriers of the SC-FDMA symbols)−1 (e.g. 0≤n≤11).

The complex symbol sequence mapped to the SC-FDMA symbols transmitted through the first antenna (port) or the second antenna (port) can be circular-shifted (e.g. shifted by half the length of the complex symbol sequence) in the frequency domain. Tables 19 to 21 show cases in which the Alamouti scheme is applied according to the embodiment of the present invention.

Example 3

Figure 44:
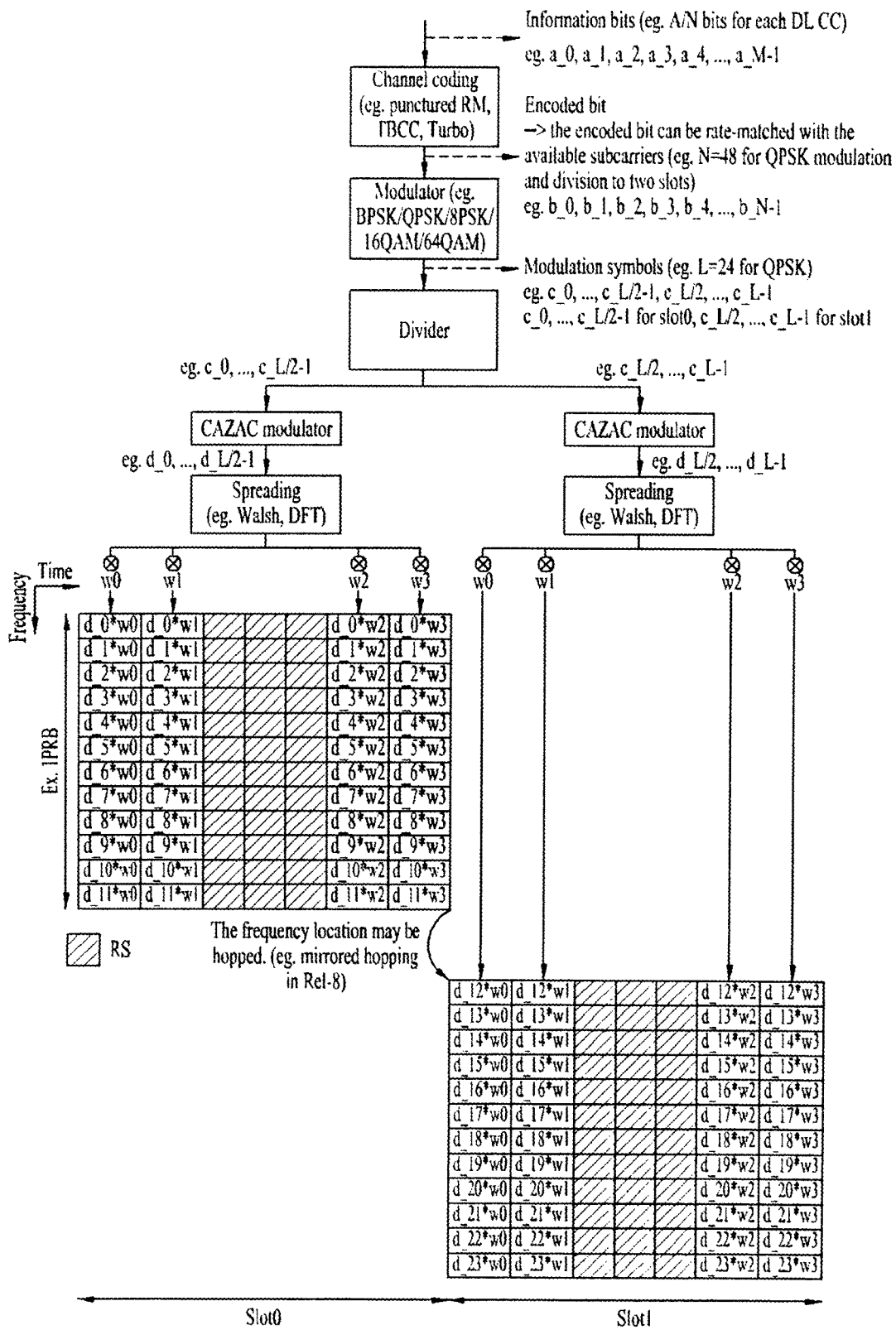
FIG. 44 illustrates a PUCCH format and a signal processing procedure for the same according to another embodiment of the present invention.

FIG. 44 illustrates a PUCCH format structure and a signal processing procedure for the same according to a third embodiment of the present invention. Since the overall flow of the signal processing procedure is similar to those described with reference to FIGS. 29 to 43, the following description is focused on a CAZAC modulator that is a main difference between the signal processing procedure of FIG. 44 and the signal processing procedures of FIGS. 29 to 43.

Referring to FIG. 44, the CAZAC modulator modulates the modulated symbols [c_0, c_1, c_L/2−1] and [c_L/2, c_L/2+1, . . . , c_L−1]) divided and assigned to corresponding slots into corresponding sequences to generate CAZAC modulated symbols [d_0, d_1, . . . , d_L/2−1] and [d_L/2, d_L/2+1, . . . , d_L−1]. The CAZAC modulator includes a CAZAC sequence or a sequence for LTE computer generated (CG) 1RB. For example, if the LTE CG sequence is r_0, . . . , r_L/2−1, a CAZAC modulated symbol may be d_n=c_n*r_n or d_n=conj(c_n)*r_n. While FIG. 44 illustrates slot-level joint coding, the present invention can be equally applied to separate coding for each slot, slot-level repetition, and a case in which a frequency factor is applied. In the present embodiment, cell-specific scrambling can be omitted because a CAZAC or CG sequence functioning as a base sequence is cell-specific. Otherwise, only UE-specific scrambling can be applied for greater randomization. A resource allocation method, relation with RS indexes, a signaling method, and transmit diversity can use the methods described in the above embodiments.

TABLE 19

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | $a_1$ | $a_2$ | $a_3$ | $a_4$ | $a_5$ | $a_6$ | $a_7$ | $a_8$ | $a_9$ | $a_{10}$ | $a_{11}$ |
| Antenna (port) 1 | $-a_{11}^*$ | $a_{10}^*$ | $-a_9^*$ | $a_8^*$ | $-a_7^*$ | $a_6^*$ | $-a_5^*$ | $a_4^*$ | $-a_3^*$ | $a_2^*$ | $-a_1^*$ | $a_0^*$ |

TABLE 20

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | $a_1$ | $a_2$ | $a_3$ | $a_4$ | $a_5$ | $a_6$ | $a_7$ | $a_8$ | $a_9$ | $a_{10}$ | $a_{11}$ |
| Antenna (port) 1 | $-a_5^*$ | $a_4^*$ | $-a_3^*$ | $a_2^*$ | $-a_1^*$ | $a_0^*$ | $-a_{11}^*$ | $a_{10}^*$ | $-a_9^*$ | $a_8^*$ | $-a_7^*$ | $a_6^*$ |

TABLE 21

| SC-FDMA symbol | Subcarrier index | | | | | | | | | | | |
|---|---|---|---|---|---|---|---|---|---|---|---|---|
| | 0 | 1 | 2 | 3 | 4 | 5 | 6 | 7 | 8 | 9 | 10 | 11 |
| Antenna (port) 0 | $a_0$ | | $a_1$ | | $a_2$ | | $a_3$ | | $a_4$ | | $a_5$ | |
| Antenna (port) 1 | $-a_5^*$ | | $a_4^*$ | | $-a_3^*$ | | $a_2^*$ | | $-a_1^*$ | | $a_0^*$ | |

Example 4

A description will be given of a case in which dynamic ACK/NACK resource allocation is applied to the new PUCCH formats described in the first, second and third embodiments. The following description can be equally applied to other new PUCCH formats as well as the new PUCCH formats according to the present invention. For example, LTE PUCCH format 2 can be reused as a new PUCCH format for multi-ACK/NACK. In this case, resource indexing for ACK/NACK can employ the method used in LTE PUCCH format 2, that is, the method of indexing resources on the circular shift axis first, and then indexing PRBs. Use of LTE PUCCH format 2 as a new PUCCH format has the advantage of using an existing format. However, because only up to 13 bits can be supported and a coding rate is limited in PUCCH format 2, the PUCCH format 2 is inferior to the PUCCH formats described in the above embodiments in terms of flexibility and performance.

A region (or PRB) for a new PUCCH format can be defined as follows.

1. An additional PUCCH region (or PRB) for LTE-A can be defined in addition to the PUCCH region defined in LTE.

2. Part of the PUCCH region (or PRB) defined in LTE can be derived. That is, some resources of the PUCCH region can be used as resources for the new PUCCH format while the PUCCH region is defined according to LTE.

A description will be given of PUCCH format adaptation according to a carrier aggregation scenario. A PUCCH format used for PUCCH format adaptation is not limited. The PUCCH format adaptation described in the specification is divided into the following two types.

1. PUCCH format adaptation according to carrier aggregation configuration

2. Format adaptation on the basis of the number of PDCCHs and/or PDSCHs allocated to a UE A. PUCCH format adaptation based only on the number of PDCCHs/PDSCHs B. Format adaptation based on the number of DL CCs carrying PDCCHs or PDSCHs As a first PUCCH format adaptation scheme, the format adaptation scheme according to carrier aggregation configuration is described. When the number (N) of cell-specifically or UE-specifically aggregated DL CCs is less than a specific value (e.g. 2), an ACK/NACK resource may correspond to the lowest CCE index of PDCCH as in LTE. Here, the aggregated DL CCs may be candidate DL CCs from which a PDCCH is detected for cross-carrier scheduling. Furthermore, the aggregated DL CCs may be some of DL CC sets configured for respective cells. Moreover, the aggregated DL CCs may be activated DL CCs. The PUCCH format used in this case may be the LTE PUCCH format 1/1a/1b. Schemes that can be used when N≥3 include multi-sequence modulation (MSM) that performs simultaneous transmission using M (M≤N) resources and ACK/NACK multiplexing (or sequence selection) that selects some of resources and transmits using the selected resources. The PUCCH format used in this case may be the LTE PUCCH format 1/1a/1b. When N−1, that is, when carrier aggregation is not performed (i.e. 1DL-1UL pairing), ACK/NACK resources can use the LTE rule and PUCCH format 1/1a/1b intact.

When the number (N) of aggregated DL CCs is equal to or greater than a specific value (e.g. 2), ACK/NACK can be transmitted through new PUCCH formats described in the first, second and third embodiments. A PUCCH resource can be configured such that it corresponds to the lowest CCE index regardless of whether a region (or PRB) for a new PUCCH format is defined exclusively or defined compatibly with LTE. In this case, transmitted multiple ACK/NACK information may correspond to data transmitted through multiple DL CCs.

As a second PUCCH format adaptation scheme, PUCCH format adaptation on the basis of the number of PDCCHs and/or PDSCHs assigned to a UE is described. While the number of DL CCs including PDCCHs equals the number of DL CCs including PDSCHs in non-cross-carrier scheduling, they may become different from each other when cross-carrier scheduling is employed. Furthermore, if the number of PDCCHs or PDSCHs for each DL CC is limited to 1, the number of PDCCHs/PDSCHs may correspond to the number of DL CCs used for the PDSCHs. An implicit rule for ACK/NACK resources relate to the PDCCHs. Since the number of PDSCHs equals the number of PDCCHs, the following description is made on the basis of the number of PDCCHs unless mentioned specifically.

Furthermore, PUCCH format adaptation based on the number of DL CCs carrying PDCCHs/PDSCHs can be achieved by extending PUCCH format adaptation based on the number of PDCCHs. Here, the PDCCHs may be scheduled PDCCHs. In other words, the PDCCHs may be present in a UE-specific search space. When the number of PDCCHs received through one DL CC is equal to or less than N, the UE transmits ACK/NACK using LTE PUCCH format 1a/1b. In this case, LTE rule (i.e. implicit resource allocation based on the lowest CCE index) may be used as a resource allocation rule. When the number of PDCCHs received through one DL CC is greater than N, the UE transmits ACK/NACK using a new PUCCH format. Here, for resource allocation, explicit resource allocation can be used (e.g. RRC, PDCCH signaling). If N=1, ACK/NACK information can be transmitted through the same physical channel as that in LTE PUCCH format 1/1a/1b and a corresponding resource can be determined by the lowest CCE index of PDCCHs. If N−2, ACK/NACK information can be transmitted using multi-sequence modulation (MSM) or channel selection based on LTE PUCCH format 1/1a/1b. In this case, resource allocation can conform to LTE rules (i.e. MSM or channel selection is performed using the lowest CCE indexes n_cce0 and n-cce1 of PDCCHs). Here, LTE based PUCCH transmission means not only MSM or channel selection but also other modified forms. For example, LTE PUCCH format 1/1a/1b has a spreading factor (SF) of 4. In this case, UE multiplexing or information quantity can be increased by reducing the SF (e.g., SF=2). The present invention also includes this type of the transmission scheme. In addition, the present invention includes a scheme of increasing the quantity of information in consideration of both RS and data resources during channel section. If N=3 and the number of PDCCHs detected by the UE is 2, resources can be inferred through the detected PDCCHs and transmitted. One DL CC carrying the PDCCHs may be a DL Primary CC (DL PCC).

As an another aspect, when a total of N scheduled PDCCHs is transmitted to the UE, ACK/NACK information may be transmitted using LTE resource allocation rule (implicit resource allocation) and a physical channel based on LTE PUCCH format 1/1a/1b if DL CCs carrying the N PDCCHs include at least one DL PCC. If the N PDCCHs are transmitted through a DL Secondary CC (DL SCC) only, multiple ACK/NACK information can be transmitted using a new PUCCH format. In this case, resource allocation can conform to explicit resource allocation rules (e.g. RRC signaling or PDCCH signaling).

As a still another aspect, when the number of PDCCHs scheduled to one UE is equal to or less than a specific value (N), resources for ACK/NACK transmission may conform to LTE rules corresponding to the lowest CCE index of a PDCCH. In this case, LTE PUCCH format 1/1a/1b can be used. When N≥3, MSM which simultaneously transmits ACK/NACK information using M (M≤N) resources or ACK/NACK multiplexing (or sequence selection) which selects some of multiple resources and transmits using the selected resources can be used. In this case, LTE PUCCH 1/1a/1b can be used. When N=1, that is, when only one PDCCH is scheduled for the UE, resources for ACK/NACK transmission can use LTE rule and PUCCH format 1/1a/1b intact.

As a third PUCCH format adaptation scheme, PUCCH format adaptation on the basis of the type of a carrier in which PDCCHs and/or PDSCHs allocated to the UE are transmitted is described. Prior to explanation of this scheme, cases in which ACK/NACK feedback is needed in LTE are described. ACK/NACK feedback for DL is required in LTE in the following three cases, which are equally applied to LTE-A.

Case 1: ACK/NACK feedback for PDSCH(s) indicated by PDCCH(s) detected from subframe(s) n-k is needed. Here, k∈K and K depends on the subframe index n and UL-DL configuration and is composed of M elements $\{k_0, k_1, \ldots k_{M-1}\}$. The following table 22 shows K: $\{k_0, k_1, \ldots k_{M-1}\}$. Case 1 relates to PDSCH(s) which needs normal ACK/NACK feedback. In the following description, case 1 is referred to as 'ACK/NACK for PDSCH with PDCCH'.

Case 2: ACK/NACK feedback for PDCCH(s) on subframe(s) n-k, which indicates DL semi-persistent scheduling (SPS) release, is needed. Here, k∈K and K depends on the subframe index n and UL-DL configuration and is composed of M elements $\{k_0, k_1, \ldots k_{M-1}\}$. In this case, ACK/NACK of case 2 means ACK/NACK feedback for PDCCH(s) for SPS release. ACK/NACK feedback for PDCCH(s) that indicates SPS activation is not performed while ACK/NACK feedback for DL SPS release is carried out. In the following description, case 2 is referred to as 'ACK/NACK for DL SPS release'.

Case 3: ACK/NACK feedback for PDSCH(s) transmission without PDCCH(s) corresponding to subframe(s) n-k is needed. Here, k∈K and K depends on the subframe index n and UL-DL configuration and is composed of M elements $\{k_0, k_1, \ldots k_{M-1}\}$. Case 3 relates to PDSCH(s) without PDCCH(s) and means ACK/NACK feedback for SPS PDSCH(s). In the following description, case 3 is referred to as 'ACK/NACK for DL SPS'.

TABLE 22

Downlink association set index$^K$: $\{k_0, k_1, \ldots k_{M-1}\}$ for TDD

| UL-DL Configuration | Subframe n | | | | | | | | | |
|---|---|---|---|---|---|---|---|---|---|---|
| | 0 | 1 | 2 | 3 | 4 | 5 | 6 | 7 | 8 | 9 |
| 0 | — | — | 6 | — | 4 | — | — | 6 | — | 4 |
| 1 | — | — | 7, 6 | 4 | — | — | — | 7, 6 | 4 | — |
| 2 | — | — | 8, 7, 4, 6 | — | — | — | — | 8, 7, 4, 6 | — | — |
| 3 | — | — | 7, 6, 11 | 6, 5 | 5, 4 | — | — | — | — | — |
| 4 | — | — | 12, 8, 7, 11 | 6, 5, 4, 7 | — | — | — | — | — | — |
| 5 | — | — | 13, 12, 9, 8, 7, 5, 4, 11, 6 | — | — | — | — | — | — | — |
| 6 | — | — | 7 | 7 | 5 | — | — | 7 | 7 | — |

In the case of FDD, M is 1 all the time and K corresponds to $\{k_0\}=\{4\}$ all the time.

Figure 45:
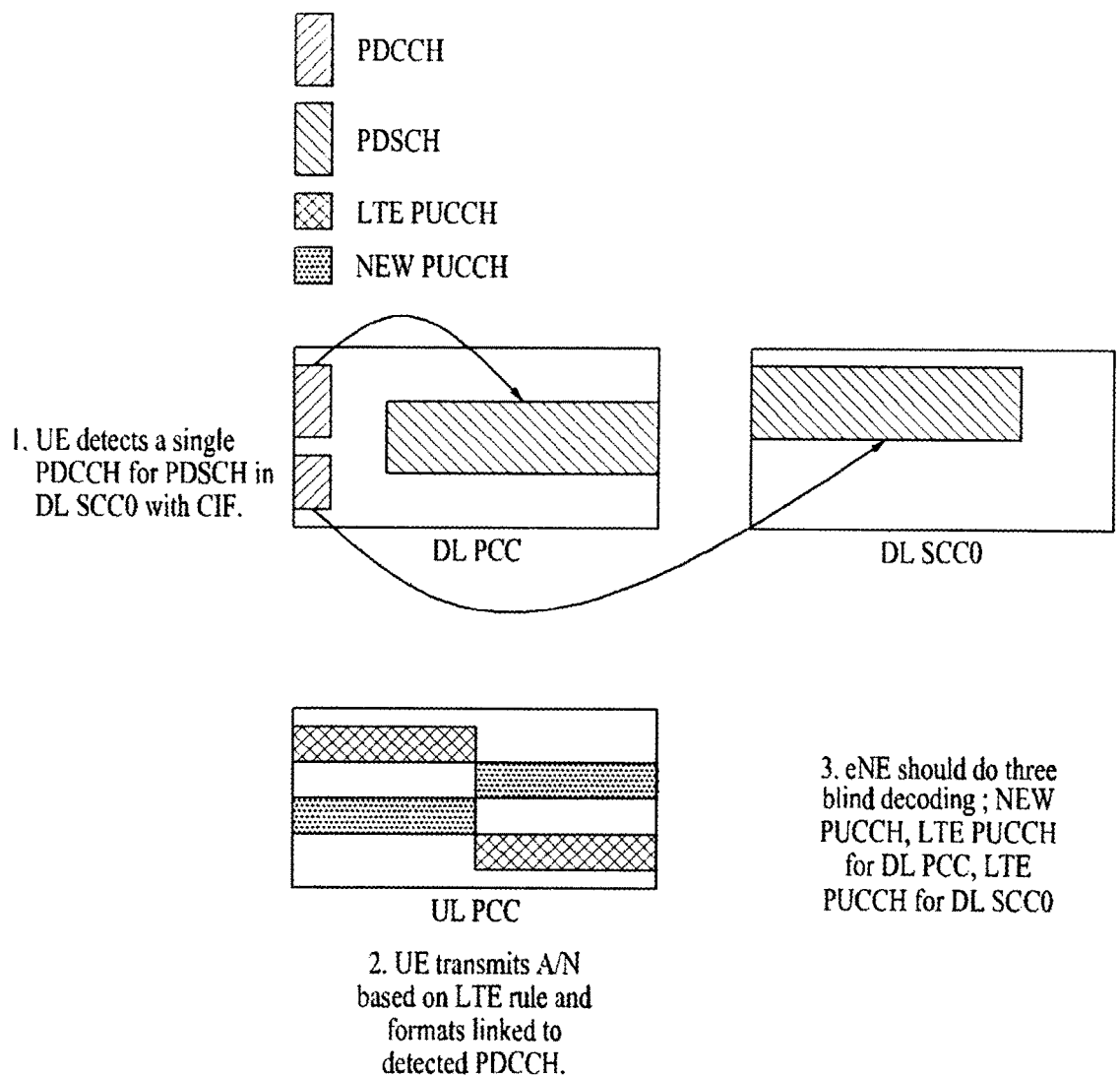
FIG. 45 illustrates PUCCH format adaptation and a blind decoding procedure of a BS in a carrier aggregation system.

FIG. 45 illustrates PUCCH format adaptation and a blind decoding operation of the BS according to PUCCH format adaptation in a carrier aggregation system. For convenience of description, the description will focus on the case in which the UE transmit 'ACK/NACK for PDSCH with PDCCH'. Considering cross-carrier scheduling (when CIF is configured), multiple PDCCHs may be transmitted through one DL CC. For example, 2 PDCCHs for PDSCHs that will be transmitted through DL PCC and DL SCC0 can be transmitted through the DL PCC.

Referring to FIG. 45, PDSCH0 is transmitted on DL PCC, and PDCCH0 for the PDSCH0 is also transmitted on DL PCC. In addition, PDCCH1 for a PDSCH that will be transmitted through DL SCC0 is transmitted in the DL PCC. PDSCH1 indicated by PDCCH1 is transmitted on DL SCC0. In this case, the UE may detect the PDCCHs in the following cases.

(1) The UE successfully detects both PDCCH0 and PDCCH1

(2) The UE successfully detects PDCCH0 only.

(3) The UE successfully detects PDCCH1 only.

(4) The UE fails to detect both PDCCH0 and PDCCH1.

It is assumed that ACK/NACK information is fed back using LTE rule and an LTE PUCCH format when the UE detects one PDCCH (or PDSCH), and the ACK/NACK information is fed back using a new PUCCH format/rule/resource when the UE detects two or more PDCCHs (or PDSCHs). The UE may transmit a PCCH according to a PDCCH detection result as follows.

The UE transmits a PUCCH using the new PUCCH format/rule/resource in the case of (1) and (4).

The UE transmits a PUCCH using an LTE PUCCH format/rule/resource corresponding to PDCCH0 in the case of (2).

The UE transmits a PUCCH using an LTE PUCCH format/rule/resource corresponding to PDCCH1 in the case of (3).

The BS needs to perform blind decoding for the above three cases in order to successfully receive the PUCCH. Accordingly, the number of blind decoding operations increases as the number of cross-carrier scheduling scenarios increases.

The present invention additionally proposes schemes for minimizing the number of blind decoding operations when cross-carrier scheduling is permitted. These schemes will be described for a case in which the UE receives one PDCCH (PDSCH). Here, the UE receiving one PDCCH (or PDSCH) means the UE receiving one PDCCH (or PDSCH) irrespective of the number of PDCCHs (or PDSCHs) that the BS actually transmits.

(Scheme 1) ACK/NACK may be transmitted using the LTE PUCCH format/rule/resource when one PDCCH is received through DL PCC and non-cross-carrier scheduling is employed, whereas ACK/NACK may be transmitted using a new PUCCH format/rule/resource in other cases. Non-cross-carrier scheduling includes a case in which a cross-carrier scheduling mode is not configured, a case in which a CIF is not configured, and a case in which a CIF indicates self-scheduling. When a PDCCH transmission DL CC (scheduling DL CC) and a PDSCH transmission DL CC (scheduled DL CC) are the same (i.e. in the case of non-cross-carrier scheduling for the corresponding PDSCH) and the number PDCCH (or PDSCH) is one, the DL CC may be assumed as a DL PCC.

(Scheme 2) ACK/NACK may be transmitted using the LTE PUCCH format/rule/resource when the CIF of PDCCH indicates a DL PCC, and ACK/NACK may be transmitted using a new PUCCH format/rule/resource in other cases. For example, if the CIF of the DL PCC is 0, the UE can transmit ACK/NACK through a UL PCC using the LTE PUCCH format/rule/resource when a PDCCH with CIF=0 is received through DL SCC0 and a PDSCH is received through the DL PCC. Meanwhile, cross-carrier scheduling may be restricted in LTE-A depending on the type of carries. Specifically, in LTE-A, cross-scheduling from DL PCC to DL SCC(s) may be supported, but cross-scheduling from DL SCC(s) to DL PCC can be restricted so as not to be supported. In this case, since only CIF of DL PCC PDCCH can indicate DL PCC, (Scheme 1) and (Scheme 2) becomes the same.

(Scheme 3) A hybrid method of the above two schemes can be used. For example, when one PDCCH is received through the DL PCC and non-cross-carrier scheduling is employed, or when the CIF of a detected PDCCH indicates the DL PCC, the UE can transmit ACK/NACK through the UL PCC according to the LTE PUCCH format/rule/resource.

Figure 46:
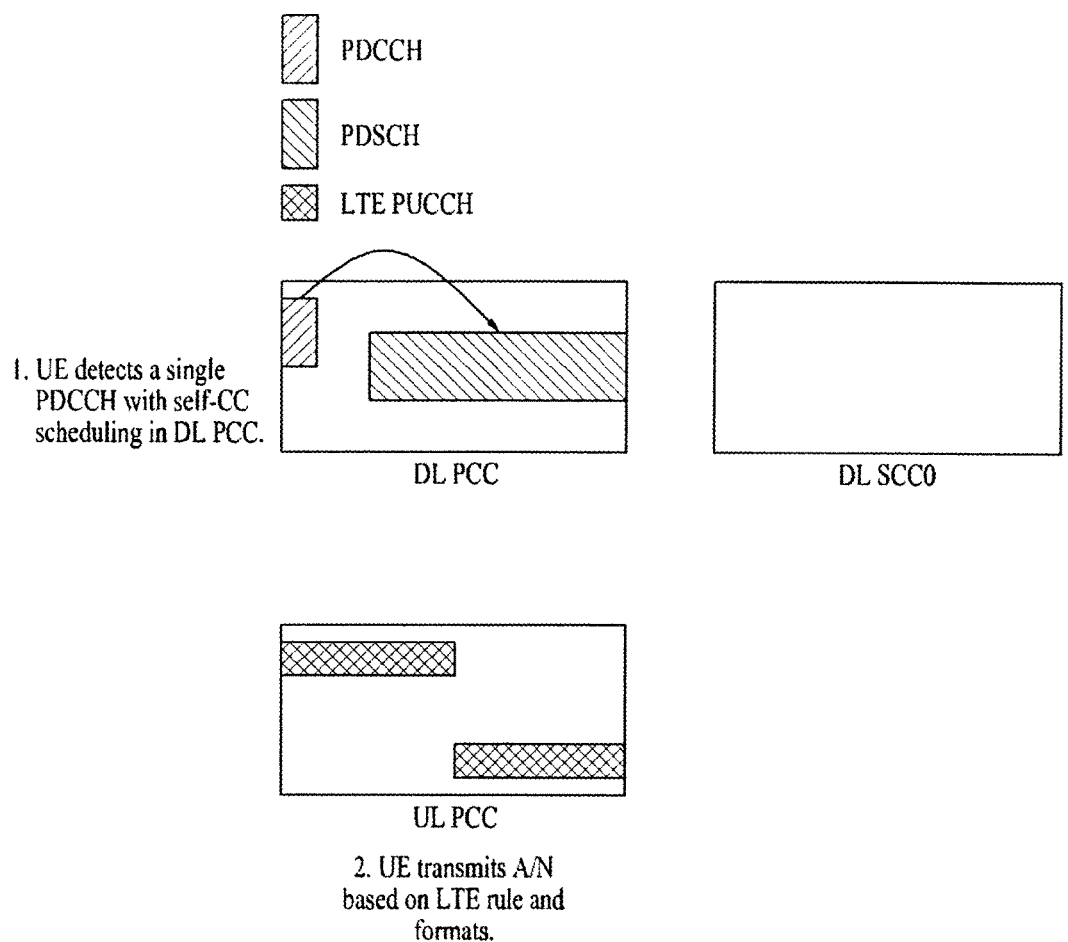
FIGS. 46, 47 and 48 illustrate PUCCH format adaptation according to an embodiment of the present invention.
Figure 47:
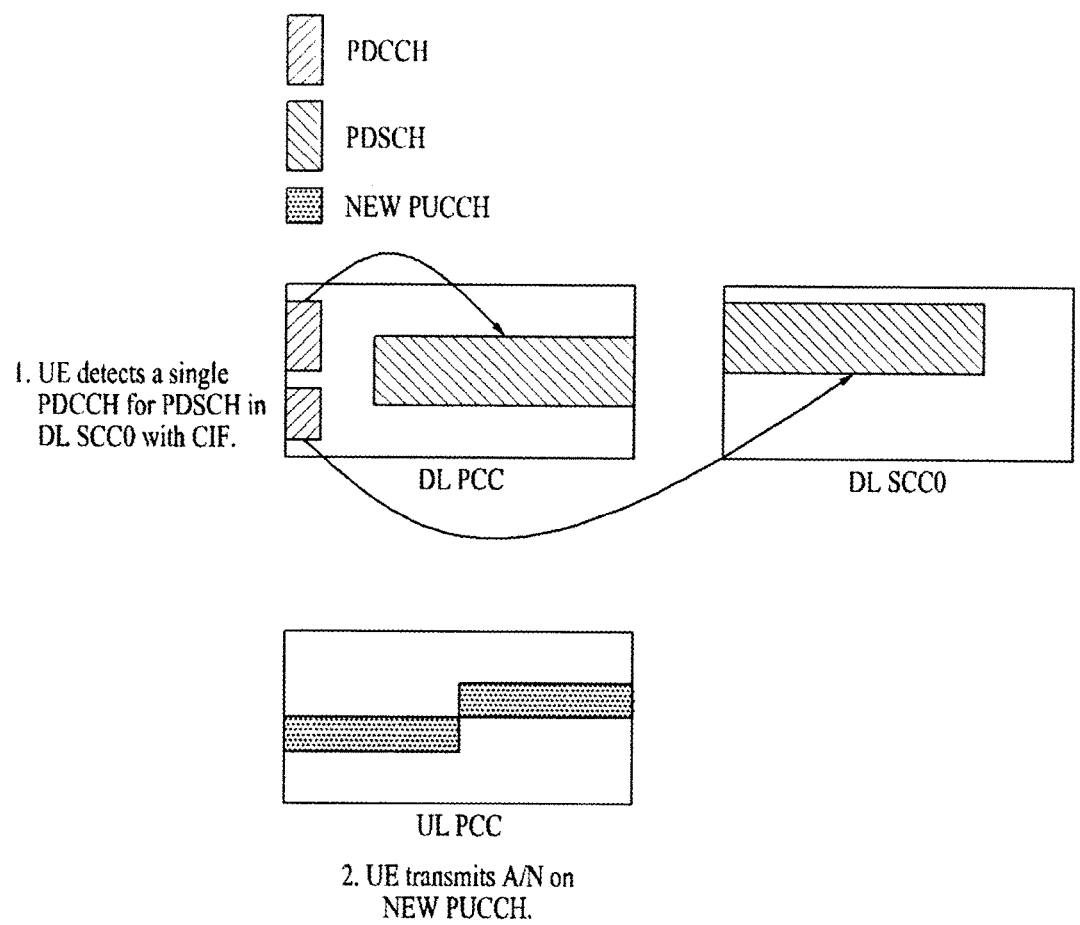
Figure 48:
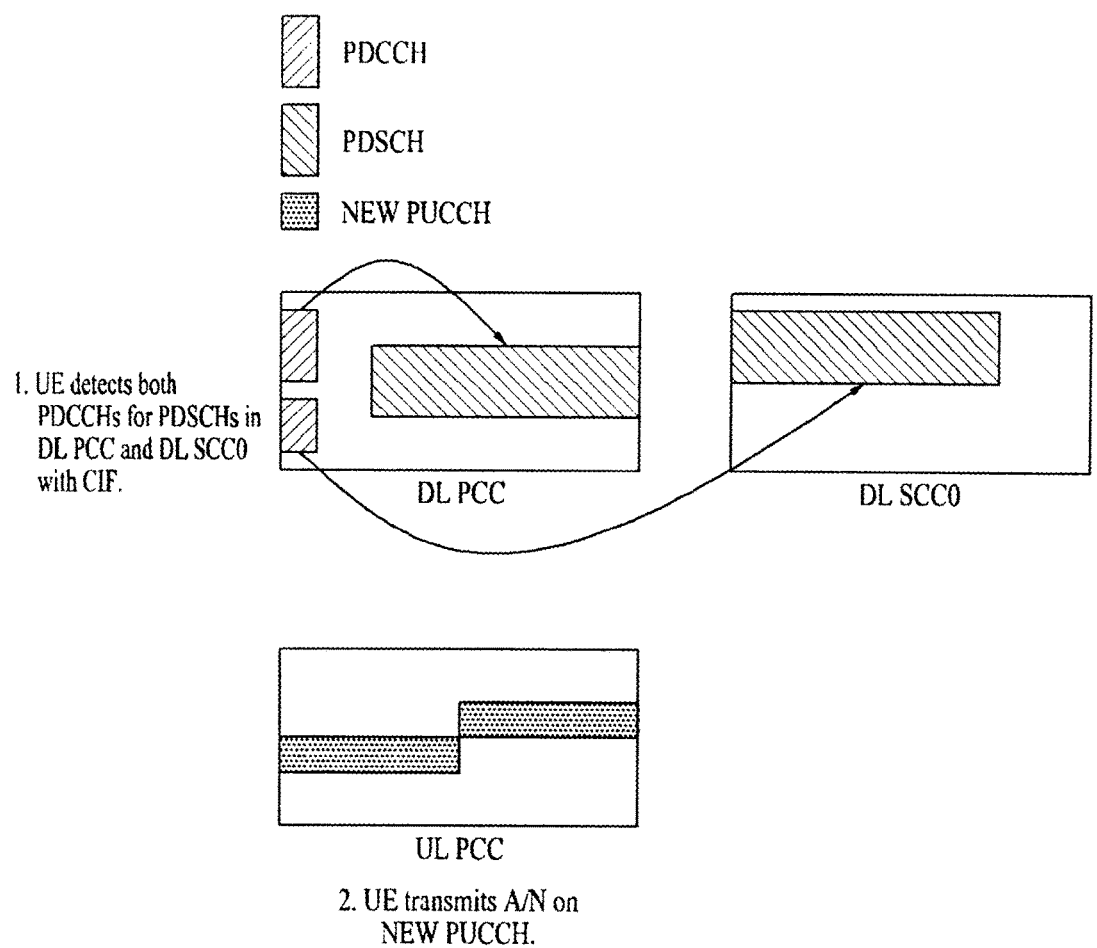

FIGS. 46, 47 and 48 illustrate PUCCH format adaptation according to an embodiment of the present invention. FIG. 46 shows a case in which ACK/NACK is fed back using an LTE PUCCH format/rule/resource and FIGS. 47 and 48 show a case in which ACK/NACK is fed back using a new PUCCH format/rule/resource according to an embodiment of the present invention. While description of the present embodiment is focused on scheme 1, it can be applied to scheme 2 and scheme 3 (not shown) in a similar manner.

Referring to FIG. 46, the UE detects one PDCCH through the DL PCC and recognizes non-cross-carrier scheduling irrespective of the number of PDCCHs actually transmitted from the BS. Non-cross-carrier scheduling includes a case in which a cross-carrier scheduling mode is not configured, a case in which a CIF is not configured, and a case in which the CIF indicates self-scheduling. That is, when one PDCCH is detected from the DL PCC through self-scheduling, the UE can feed back ACK/NACK using an LTE PUCCH format/rule/resource corresponding to the PDCCH. For example, the UE can feed back ACK/NACK using PUCCH format 1a/1b illustrated in FIGS. 13 and 14 and a resource linked to the lowest CCE index from among CCE indexes used for PDCCH transmission.

Referring to FIG. 47, the BS transmits PDCCH0 and PDCCH1 through a DL PCC. PDCCH0 is assigned for PDSCH0 transmitted through the DL PCC. PDCCH1 is assigned for PDSCH0 transmitted through a DL SCC and performs cross-carrier scheduling using a CIF. It is assumed that the UE successfully detects PDCCH1 only. In this case, the UE can feed back ACK/NACK using a new PUCCH format/rule/resource because the CIF indicates the DL SCC (that is, cross-carrier scheduling) although the UE has detected PDCCH1 through the DL PCC. For example, the UE can feed back ACK/NACK using a resource provided through the PUCCH format and explicit signaling (e.g. RRC signaling, PDCCH) illustrated in FIG. 29.

Referring to FIG. 48, the BS transmits PDCCH0 and PDCCH1 through a DL PCC. PDCCH0 is assigned for PDSCH0 transmitted through the DL PCC. PDCCH1 is assigned for PDSCH1 transmitted through a DL SCC and performs cross-carrier scheduling using a CIF. It is assumed that the UE successfully detects both PDCCH0 and PDCCH1. In this case, the UE can feed back ACK/NACK using a new PUCCH format/rule/resource because it receives multiple PDCCHs irrespective of the DL PCC. For example, the UE can feed back ACK/NACK using the PUCCH format illustrated in FIG. 29 and a resource given by explicit signaling (e.g. RRC signaling, PDCCH).

The aforementioned description focused on the case of performing PUCCH format adaptation in consideration of both the types of carriers in which a PDCCH and a PDSCH are transmitted when 'ACK/NACK for PDSCH with PDCCH' is transmitted. However, if cross-carrier scheduling is restricted depending on carrier type, PDCCH format adaptation may be performed in consideration of only the type of the carrier in which a PDCCH or PDSCH is transmitted. For example, in the case of LTE-A, cross-scheduling from DL SCC(s) to a DL PCC is restricted such that the cross-scheduling is not supported, while cross-scheduling from the DL PCC to DL SCC(s) may be supported. In this case, a PDSCH received in the DL PCC is scheduled from a DL PCC PDCCH only. On the other hand, a PDSCH received in a DL SCC may be scheduled from the DL PCC PDCCH or a DL SCC PDCCH. Accordingly, the aforementioned scheme 1 and scheme 2 can be modified to a scheme for transmitting ACK/NACK using an LTE PUCCH format/rule/resource when one PDSCH is received in the DL PCC and transmitting ACK/NACK using a new PUCCH format/rule/resource in other cases. That is, when two or more PDSCHs are received in the DL PCC or one or more PDSCHs are received in a DL SCC, ACK/NACK can be transmitted using the new PUCCH format/rule/resource.

A description will be given of transmission of 'ACK/NACK for DL SPS release'. Since a PDCCH for 'DL SPS release' does not involve a PDSCH, PUCCH format adaptation can be performed in consideration of the type of the carrier in which the PDCCH is transmitted. For example, when only one PDCCH that indicates DL SPS release is detected from the DL PCC, the UE can transmit ACK/NACK using an LTE PUCCH format/rule/resource. On the other hand, when two or more PDCCHs that indicate DL SPS release are detected, a PDCCH that indicates DL SPS release is detected from a DL SCC, or a PDCCH that indicates DL SPS release and a normal PDCCH are simultaneously detected, ACK/NACK can be fed back using a new PUCCH format/rule/resource. In the case of LTE-A, a PDCCH that indicates DL SPS release may be restricted such that the PDCCH is present in the DL PCC only. In this case, the aforementioned scheme 1 and scheme 2 can be modified to a scheme for transmitting ACK/NACK using an LTE PUCCH format/rule/resource when one PDCCH that indicates DL SPS release is received and transmitting ACK/NACK using a new PUCCH format/rule/resource in other cases. That is, when two or more PDCCHs that indicate DL SPS release are detected, or when a PDCCH that indicates SPS release and a normal PDCCH are simultaneously detected, ACK/NACK can be transmitted using the new PUCCH format/rule/resource.

A case in which 'ACK/NACK for DL SPS' is transmitted will now be described. Since a PDSCH for SPS does not involve a PDSCH, PUCCH format adaptation can be performed in consideration of the type of the carrier in which the PDSCH is transmitted. For example, when one SPS PDSCH is detected from the DL PCC, the UE can transmit ACK/NACK using an LTE PUCCH format/rule/resource. On the other hand, when two or more SPS PDSCHs are received, when an SPS PDSCH is detected from a DL SCC, or when an SPS PDSCH and a normal PDSCH are simultaneously detected, ACK/NACK can be fed back using a new PUCCH format/rule/resource. In this case, ACK/NACK feedback can be performed using the new PUCCH format/rule/resource. In the case of LTE-A, a PDSCH without PDCCH (=SPS) is restricted such that the PDSCH is present in the DL PCC only. In this case, the aforementioned scheme 1 and scheme 2 can be modified to a scheme for transmitting ACK/NACK using an LTE PUCCH format/rule/resource when one SPS PDSCH is received and transmitting ACK/NACK using a new PUCCH format/rule/resource in other cases. That is, when two or more SPS PDSCHs are detected or when an SPS PDSCH and a normal PDSCH are simultaneously detected, ACK/NACK can be transmitted using the new PUCCH format/rule/resource.

In LTE, a PUCCH resource index for ACK/NACK feedback is determined on the basis of a CCE index of a corresponding PDCCH. Specifically, a resource index n, for ACK/NACK transmission is given by $n_{cce}+N\_PUCCH^{(1)}$ in LTE. Here, $n_{cce}$ denotes the lowest CCE index constituting the PDCCH and $N\_PUCCH^{(1)}$ denotes a value configured by higher layers. Since a PDCCH that corresponds to an SPS PDSCH is not present, a CCE based PUCCH index cannot be allocated. Accordingly, LTE signals a PUCCH resource index set, which will be used when the SPS PDSCH will be transmitted, through RRC signaling and designates which of PUCCH resource index set will be used through a TPC field of a corresponding PDCCH when directing SPS activation.

Table 23 shows PUCCH resource indexes for DL SPS scheduling.

TABLE 23

| Value of 'TPC command for PUCCH' $n_{PUCCH}^{(1)}$ | |
| --- | --- |
| '00' | The first PUCCH resource index configured by the higher layers |
| '01' | The second PUCCH resource index configured by the higher layers |
| '10' | The third PUCCH resource index configured by the higher layers |
| '11' | The fourth PUCCH resource index configured by the higher layers |

A description will be given of error handling. It is assumed that PUCCH format adaptation is performed according to whether the number of detected PDCCHs is 2 or greater. If a scheduler transmits 2 PDCCHs (which may correspond to 2 PDSCHs transmitted through 2 DL CCs, in general) to one UE, the UE may mis-detect that one PDCCH has been scheduled. In this case, while the BS expects to receive ACK/NACK information through a new PUCCH format for two or more PDCCHs, the UE transmits ACK/NACK information through an LTE PUCCH format since the UE has detected one PDCCH. The BS recognizes that DTX is generated for the other PDCCH because the BS receives a PUCCH format different from the expected format.

Recognition of DTX status of the UE by the BS may affect performance in incremental redundancy (IR) based HARQ. When DTX is generated, for example, because the UE is not aware of the fact that a PDCCH has been transmitted, the UE cannot store a decoded soft bit result value of a PDSCH corresponding to the PDCCH in a soft buffer. Accordingly, when DTX is generated, it is necessary for the BS not to change a redundancy version (RV) or to transmit as many system bits as possible in the event of HARQ retransmission. However, if the BS is not aware of the DTX status of the UE and performs retransmission with a different RV value, system throughput may be decreased because the RV is changed and system bits are lost during retransmission. For this reason, since the WCDMA specification, 3GPP specifies that the DTX status of the UE is signaled to the BS.

A description will be given of PUCCH format adaptation depending on UCI bit size as another aspect of the present invention. In the case of new PUCCH format, it is difficult to use conventional punctured RM coding because a coded bit size is different from that of LTE. As a solution to this, tail-biting convolutional coding (TBCC) defined in LTE can be used for the new PUCCH format. However, due to characteristic of TBCC, channel coding performance for information bit sizes smaller than (constraint length)−1 cannot be ensured and the currently defined scheme for TBCC cannot be used without being modified. For example, because TBCC of LTE has a constraint length of 7, zero-padding can be performed for information having less than 6 bits until the information becomes 6 bits, or a channel coding input size. Accordingly, the present invention proposes a scheme of using LTE PUCCH format 1/1a/1b for transmission (including LTE PUCCH format transmission, MSM and channel selection) of UCI having less than M bits and using a new PUCCH format employing TBCC for UCI having M bits or more. The value M can be determined such that it corresponds to a constraint length. For example, M=K−1 (K being the constraint length). When K=7, M may be 6. When M=K−2, for example, channel selection used in LTE TDD is employed for an information bit size of 4 or less. In the case of an information bit size of 5, one arbitrary bit (e.g. bit 0) can be padded to generate 6 bits and a new PUCCH format employing TBCC can be used. For an information bit size of greater than 6 bits, a new PUCCH format using TBCC can be employed.

Alternatively, it is possible to adaptively use LTE format 2 or a new PUCCH format depending on the number of configured DL CCs, the number of activated DL CCs, the number of scheduled DL grants (or PDSCHs), or the information bit size. For example, LTE PUCCH format 2 can be used when the number of configured DL CCs is M1 or less, the number of activated DL CCs is M2 or less, the number of scheduled DL grants (or PDSCHs) (or the number of DL CCs carrying a allocated DL grant) is M3 or less, or the information bit size is M4 or less, whereas a new PUCCH format can be used when the number of configured DL CCs is greater than M1, the number of activated DL CCs is greater than M2, the number of scheduled DL grants (or PDSCHs) (or the number of DL CCs carrying a allocated DL grant) is greater than M3, or the information bit size is greater than M4. For example, LTE PUCCH format 2 can be used when the information bit size is M4 or less, otherwise the DFT-based PUCCH format illustrated in FIG. 29 can be used as a new PUCCH format. A channel coding scheme used for the new PUCCH format may be (32,0) RM coding or TBCC. When TBCC is used as the channel coding scheme for the new PUCCH format, M1, M2, M3 and M4 may be related to the constraint length (K) of TBCC. A value of K−1 relates to a memory size of TBCC. TBCC cannot ensure performance for information bit sizes of less than K−1 while ensuring the performance for information bit sizes of K−1 or greater. For example, when K=7, a new PUCCH format employing TBCC can be used for a payload of 6 bits or more whereas PUCCH format 2 using punctured RM coding defined in LTE can be used for a payload of less than 6 bits.

Figure 49:
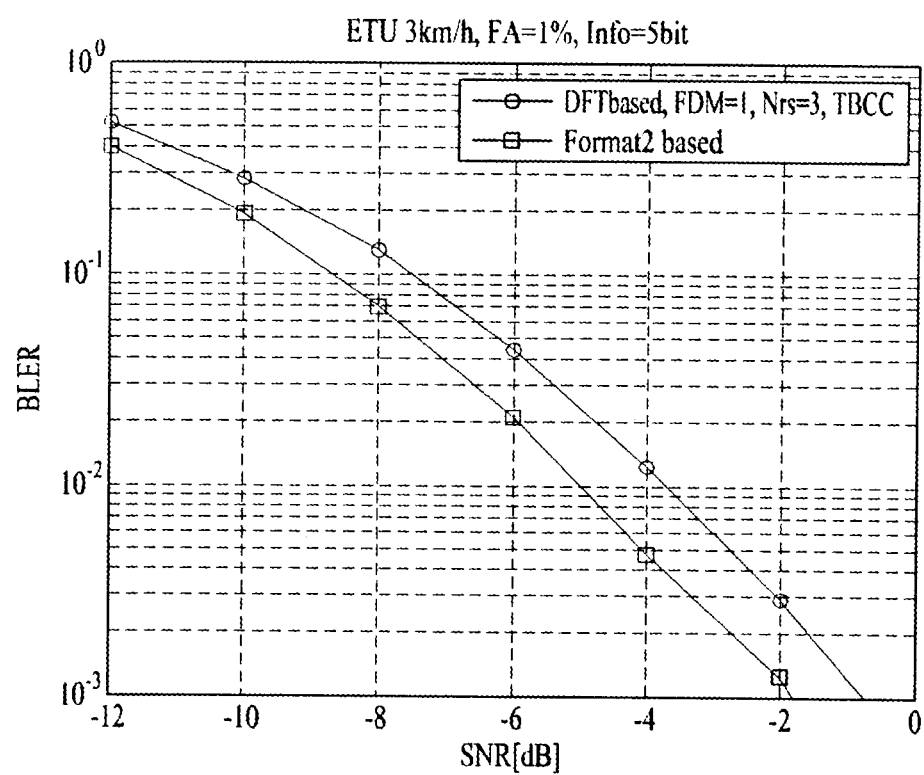
FIGS. 49, 50 and 51 show a UCI bit length and a block error rate according to PUCCH format.
Figure 50:
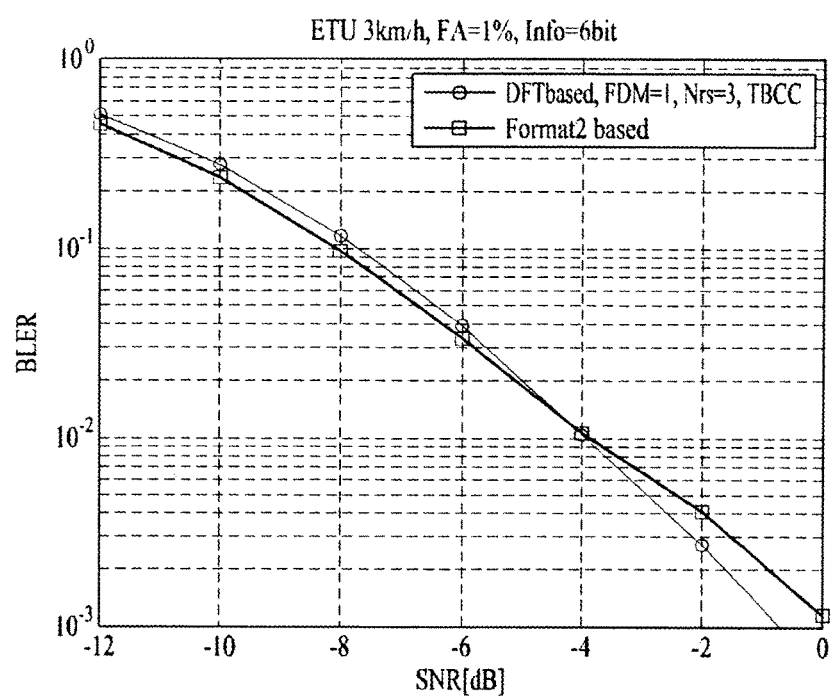
Figure 51:
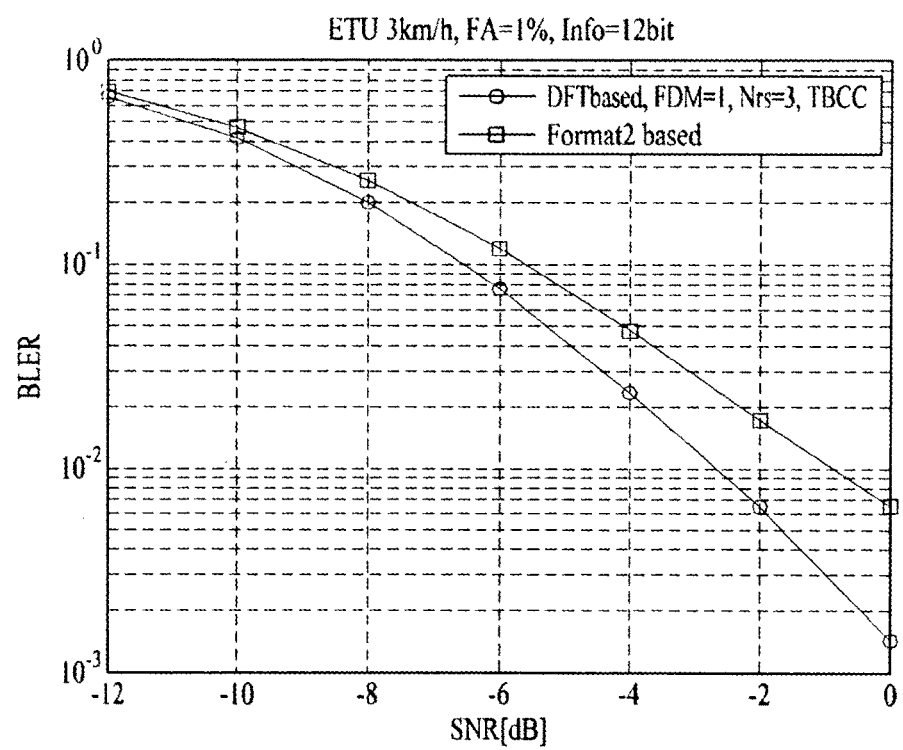

FIG. 49 shows a block error rate according to PUCCH format when UCI is 5-bit information, FIG. 50 shows a block error rate according to PUCCH format when UCI is 6-bit information, and FIG. 51 shows a block error rate according to PUCCH format when UCI is 12-bit information. The PUCCH format shown in FIG. 29 is used as a new PUCCH format. The constraint length (K) of DFT based TBCC is 7. Referring to FIGS. 49, 50 and 51, LTE PUCCH format 2 is superior to other PUCCH formats for information bit sizes less than K−1 (that is, 6 bits) and the DFT-based PUCCH format using TBCC is superior to other PUCCH formats for information bit sizes K−1 or greater. For convenience of description, while LTE PUCCH format 2 using punctured RM and DFT-based PUCCH format using TBCC are compared with each other, the present invention is not limited to thereto. That is, coding schemes other than those described herein can be adaptively applied to PUCCH formats depending on information bit size.

The present invention can be equally applied to adaptive use of LTE PUCCH format 2 or a new PUCCH format depending on the number of configured DL CCs, the number of activated DL CCs or the number of allocated DL grants (or the number of DL CCs carrying allocated DL grants). For example, it is necessary to support 5-bit information, if each of two DL CCs needs to transmit two codewords ($5^2$−1 states are needed). Accordingly, ACK/NACK for two or less DL CCs (or two activated DL CCs or two allocated PDCCHs) is transmitted using LTE PUCCH format 2 and ACK/NACK for more than two DL CCs is transmitted using a new PUCCH format.

Alternatively, it is necessary to support 5-bit information, if each of three DL CCs needs to transmit one codeword ($3^3$−1 states are needed). Accordingly, ACK/NACK for three or less DL CCs (or three activated DL CCs or three allocated PDCCHs) is transmitted using LTE PUCCH format 2 and ACK/NACK for more than three DL CCs is transmitted using a new PUCCH format.

A description will be given of a resource determination method for ACK/NACK and a DTX handing method in a new PUCCH format. Here, it is assumed that the new PUCCH format can simultaneously transmit ACK/NACK information corresponding to multiple DL CCs and information including DTX statuses of DL CCs. For example, if 5 DL CCs are present and each DL CC transmits 2 codewords, the new PUCCH format can carry at least 12-bit information for supporting ACK/NACK and DTX for the 5 DL CCs.

While a case in which PUCCH resources for the new PUCCH format are exclusively reserved for each CC and a case in which at least some of a plurality of CCs are shared are described for facilitation of explanation, the present invention is not limited thereto. If 4 DL CCs are present and 10 PUCCH resources are reserved for each DL CC as an example of exclusive reservation of resources for PUCCH transmission for each CC, 40 (=10*4) PUCCH resources can be reserved, PUCCH resource indexes 0 to 9 can be used for DL CC#0, PUCCH resource indexes 10 to 19 can be used for DL CC#1, PUCCH resource indexes 20 to 29 can be used for DL CC#2, and PUCCH resource indexes 30 to 39 can be used for DL CC#3 (PUCCH resource stacking). If 4 DL CCs are present and 10 PUCCH resources are reserved for each DL CC as an example of sharing PUCCH resources by multiple CCs, PUCCH resource indexes 0 to 9 can be shared for all DL CCs.

As described above, a PUCCH region (or PRB) in which the new PUCCH format can be used can be defined as a new region (or a specific section of resources) for LTE-A or defined using some resources defined in LTE. Furthermore, "lowest CCE" concept can be used as in LTE or another implicit method can be applied.

Examples of detailed resource allocation according to the present invention will now be described.

A case in which resources are stacked and defined for DL CCs is described as a first example. DL CCs may include the above-mentioned CCs (e.g. configured DL CCs, activated DL CCs, DL CCs including scheduled PDCCHs, etc.)

It is assumed that 4 ACK/NACK signals need to be transmitted for 4 PDSCHs transmitted through 4 DL CCs and the ACK/NACK signals are transmitted through one UL CC (e.g. anchor UL carrier). Here, ACK/NACK includes ACK, NACK, DTX and NACK/DTX. It is assumed that 10 PUCCH resources are reserved for each DL CC such that a total of 40 PUCCH resources are reserved. While the present embodiment is described for one UE (i.e. UE#0), it can be equally applied to multiple UEs. Furthermore, while the present embodiment describes sequential indexing of resources 0 to 39 in exclusive resource definition, it can also be applied to a case in which 4 PUCCH resource regions each having indexes 0 to 9 for each DL CCs are present.

Figure 52:
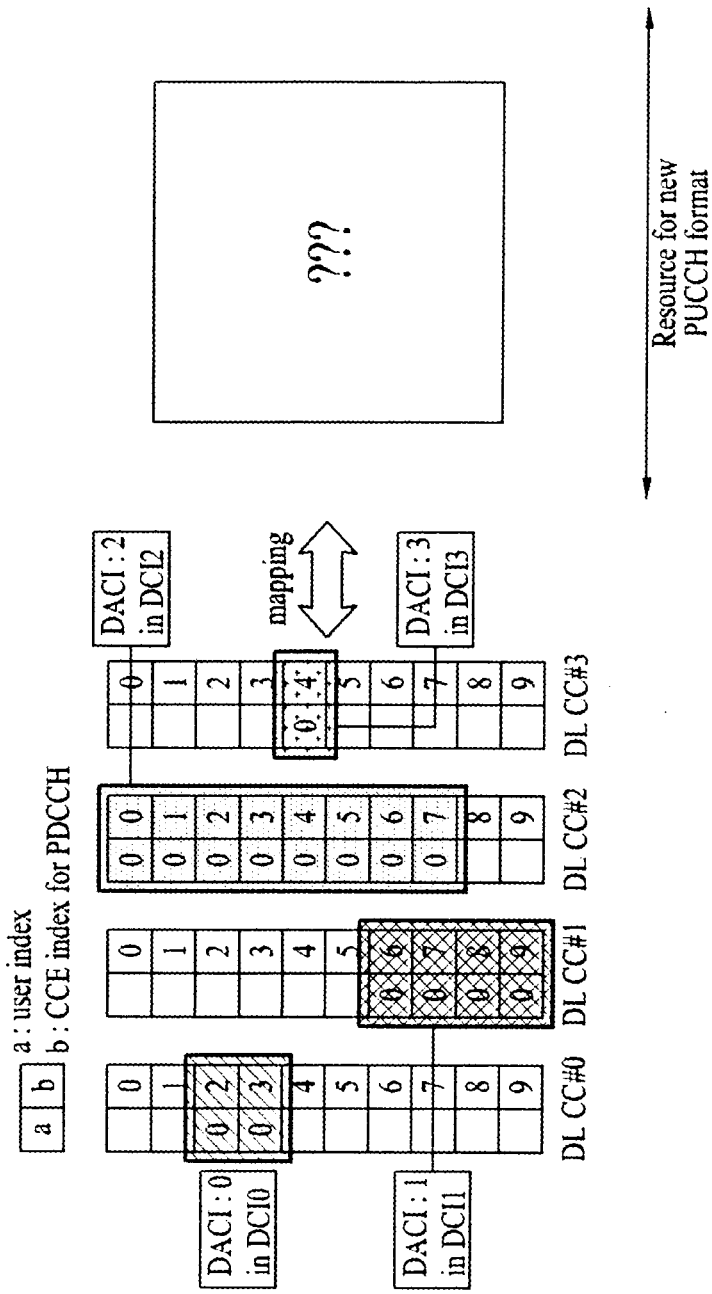
FIGS. 52 to 63 illustrate PUCCH resource allocation according to another embodiment of the present invention.

FIG. 52 illustrates an example of transmitting multiple PDCCHs in association with a downlink assignment carrier index (DACI) at UE#0. In this case, statuses of all DL CCs for PDSCHs are transmitted according to the new PUCCH format, and thus it is difficult to apply CCE based implicit mapping of LTE. In the present embodiment, it is assumed that one PDCCH is transmitted to UE#0 for each CC, UE#0 successfully decodes all PDCCHs to generate no DTX, and CCE indexing in each DL CC starts from 0. Furthermore, CCE indexing can include CCE indexing of previous DL CCs. For example, CCE indexes for DL CC#1 may be 10 to 19.

A DACI is a counter for PDCCHs transmitted to a UE and is configured for each UE. When a plurality of PDCCHs is transmitted, the DACI can indicate the order of the PDCCHs. If 4 PDCCHs are transmitted, as shown in FIG. 45, the DACI has values of 0 to 3. The DACI may be included in a DCI field of the corresponding PDCCHs and signaled to the corresponding UE, or signaled to the UE through other signaling methods. A downlink assignment index (DAI) field used in LTE TDD can be used as a DACI field.

The DACI can indicate the number of PDSCHs (or the number of PDCCHs) in all DL CCs. For example, if the DACI indicates the number of PDCCHs in the example shown in FIG. 45, all the DACI values in the PDCCHs may be 4. When the DACI indicates the number of PDCCHs, the DACI can be applied to a case in which the UE transmits ACK/NACK in an ACK/NACK bundling mode. ACK/NACK bundling is a method of transmitting representative ACK/NACK through a logical AND operation. For example, NACK is transmitted as a representative value when at least one of ACK/NACK results corresponds to NACK and ACK is transmitted as a representative value when all the ACK/NACK results correspond to ACK. If the number of PDCCHs successfully decoded by the UE is 3 although a DACI value indicating the total number of PDCCHs is 4, which means that one PDCCH is not decoded, NACK, DTX or NACK/DTX can be signaled as a representative value to the BS. Accordingly, the BS and the UE can be aware of a DTX status using the DACI. The method of transmitting NACK when DTX is generated is exemplary and a DTX status may be signaled by transmitting no information. The present invention is not limited by the DTX signaling scheme.

For facilitation of description, a case in which the DACI is used as a CC index counter is described. A DACI counter can be set such that it corresponds to a carrier indicator field (CIF) for cross-carrier scheduling. For example, if a CIF value is 3 bits, a DACI value may also be 3 bits.

The DACI may be counted from a low frequency CC to a high frequency CC (or counted from a high frequency CC to a low frequency CC). Otherwise, the DACI may be circularly counted in ascending order from the primary carrier. If multiple PDCCHs are transmitted in one DL CC, the DACI can be counted from a low CCE index to a high CCE index. For example, when the lowest CCE index of PDCCH0 in DL CC#0 for a PDSCH of DL CC#1 is 10 and the lowest CCE index of PDCCH1 in DL CC#0 for a PDSCH of DL CC#2 is 20, PDCCH0 may have a DACI value lower than that of PDCCH1. Alternatively, a DACI value transmitted in each PDCCH may be determined by the network without a particular rule and transmitted. That is, the DACI may not conform to a specific rule.

The DACI may be defined as a combination with a DAI used in LTE TDD. For example, when 4 DAI statuses and 5 DACI statuses are present, a total of 20 combinations of DAI and DACI can be defined with indexes of 0 to 19. Even in this case, the present invention is applicable.

A primary objective of the DACI is to enable the UE to detect DTX. For example, if decoding of a PDCCH corresponding to DL CC#2 fails in the example of FIG. 45, UE#0 acquires DACI counter values 0, 1 and 3 through DCI0, DCI1 and DCI3, respectively. UE#0 may recognize that blind decoding of DCI2 has failed (i.e. enters a DTX status) because DACI=2 is missed and transmit the DTX status to the BS.

However, even when the DACI is used, UE#0 cannot be aware of whether or not blind decoding of the last DCI fails. In other words, when UE#0 fails to decode the last DCI even though the BS has transmitted the last DCI to UE#0, UE#0 cannot be aware of whether decoding of the last DCI fails or the BS does not transmit the last DCI. Referring to FIG. 52, when UE#0 fails to decode DCI3 although the BS has transmitted DCI3 in DL CC#3, UE#0 does not know whether DCI3 is present or decoding of DCI3 fails.

Therefore, the present embodiment proposes a method for correctly providing ACK/NACK (including DTX) states for all DL PDSCHs to the BS and UEs. Specifically, the present embodiment proposes a method of transmitting ACK/NACK information using a PUCCH resource corresponding to a PDCCH over which the last value of the DACI counter is transmitted.

Figure 53:
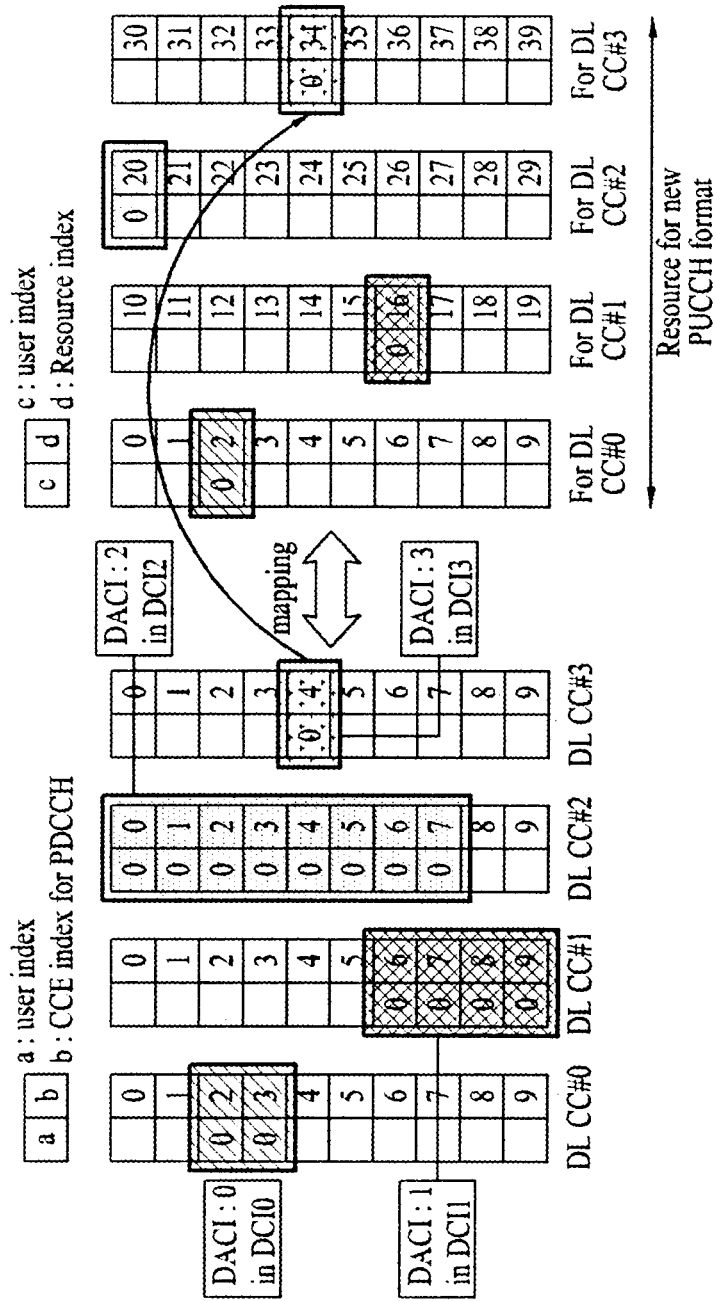

FIG. 53 illustrates an embodiment according to the present invention. This embodiment shows a case in which the BS transmits 4 PDCCHs and UE#0 successfully decodes all PDCCHs. In this case, ACK/NACK information for 4 PDSCHs transmitted through 4 DL CCs is delivered through PUCCH resource 34 corresponding to the lowest CCE index 4 of a PDCCH having the largest DACI value 3 from among the detected PDCCHs. If the DACI is counted in reverse order (e.g. 3, 2, 1, 0), the ACK/NACK information can be transmitted through PUCCH resource 2 corresponding to the lowest CCE index 2 of the first PDCCH (DL CC#0).

Figure 54:
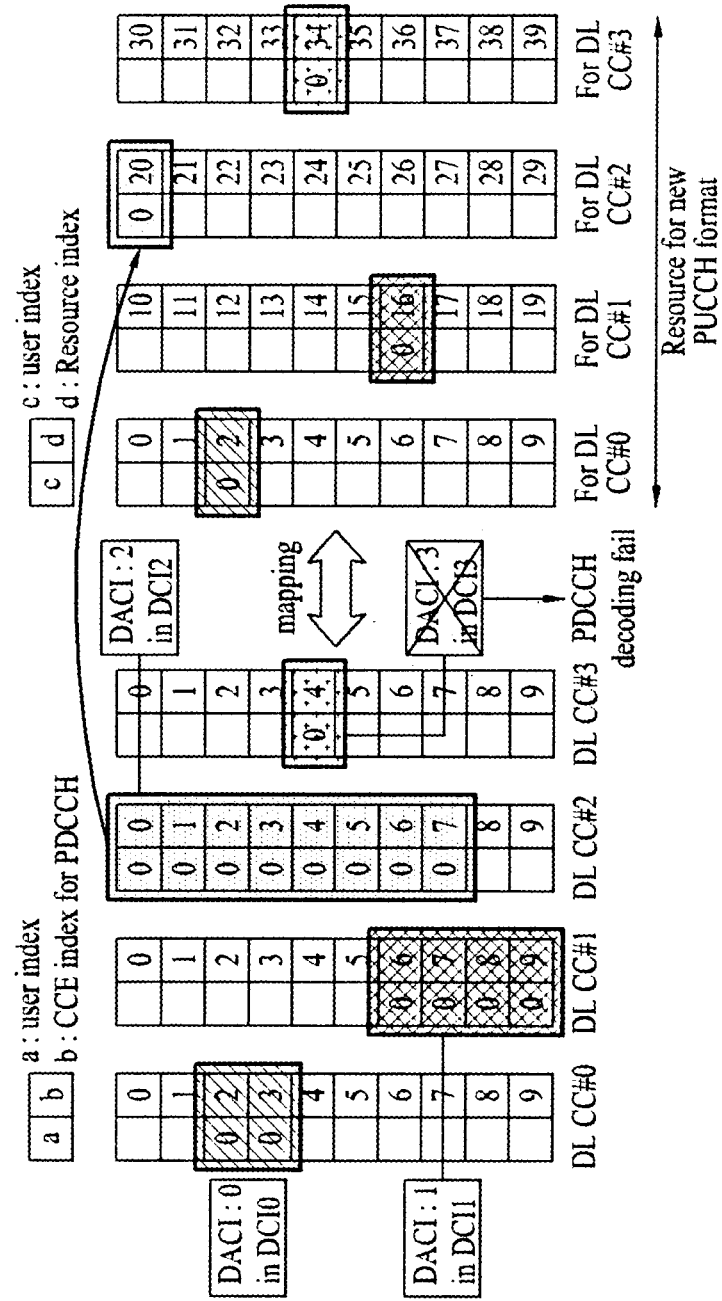

FIG. 54 illustrates a case in which UE#0 successfully decodes a PDCCH corresponding to DCI2 and fails to decode a PDCCH corresponding to DCI3. The BS will expect to receive ACK/NACK information through PUCCH resource 34 from UE#0 on the assumption that UE#0 successfully decodes DCI3. However, when UE#0 successfully decodes DCI2 (it is not necessary to consider whether or not DCI0 and DCI1 are successfully decoded because UE#0 can recognize it through DACI) but fails to decode DCI3, UE#0 transmits the ACK/NACK information through PUCCH resource 20 corresponding to DCI2. Accordingly, the BS can recognize whether DTX was occurred as for the last DCI3 through the transmitted resource.

Figure 55:
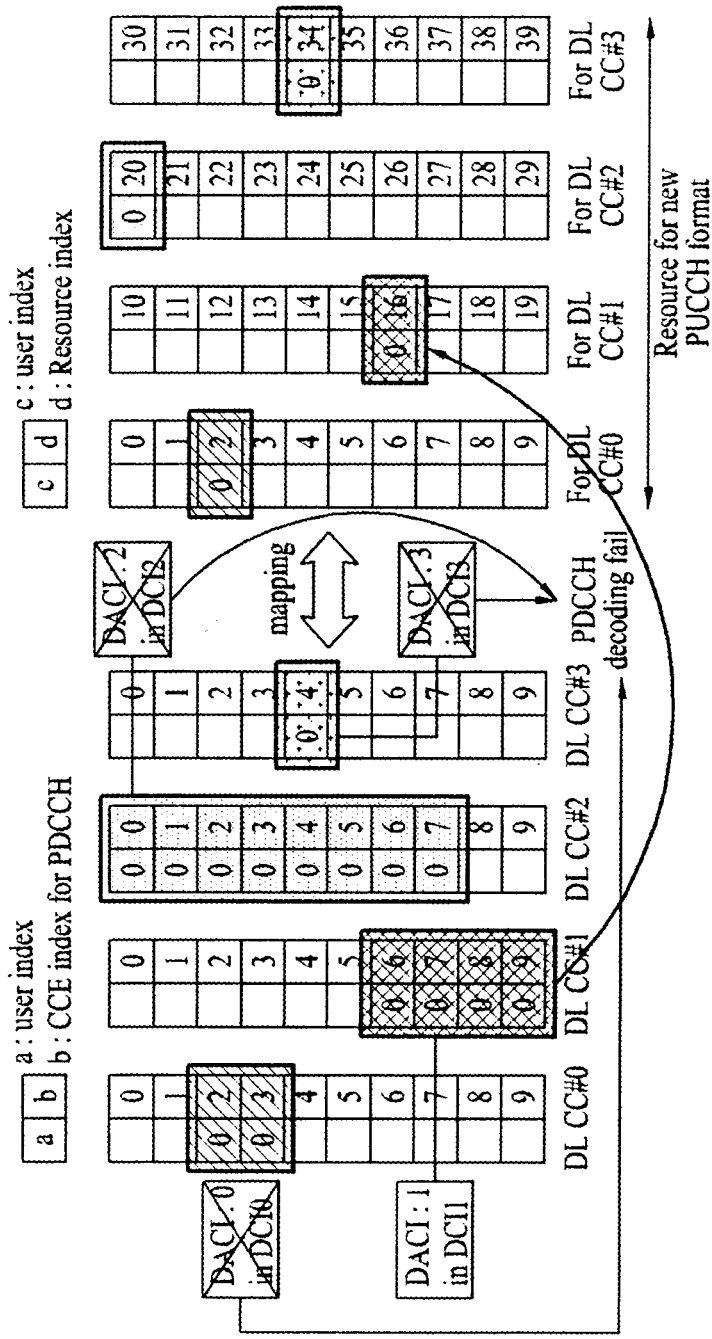

FIG. 55 illustrates a case in which UE#0 fails to decode DCI0, DCI2 and DCI3. UE#0 can recognize whether decoding of DCI0 fails through a received DACI because UE#0 has successfully decoded DCI1. However, UE#0 cannot be aware of whether DTX is generated for DCI2 and DCI3. UE#0 transmits ACK/NACK information through PUCCH resource 16 corresponding to the lowest CCE index 6 of a PDCCH having the largest DACI value 1 from among detected PDCCHs although UE#0 does not know whether DTX is generated for DCI2 and DCI3. Accordingly, the BS can recognize that DTX is generated for DCI2 and DCI3.

Figure 56:
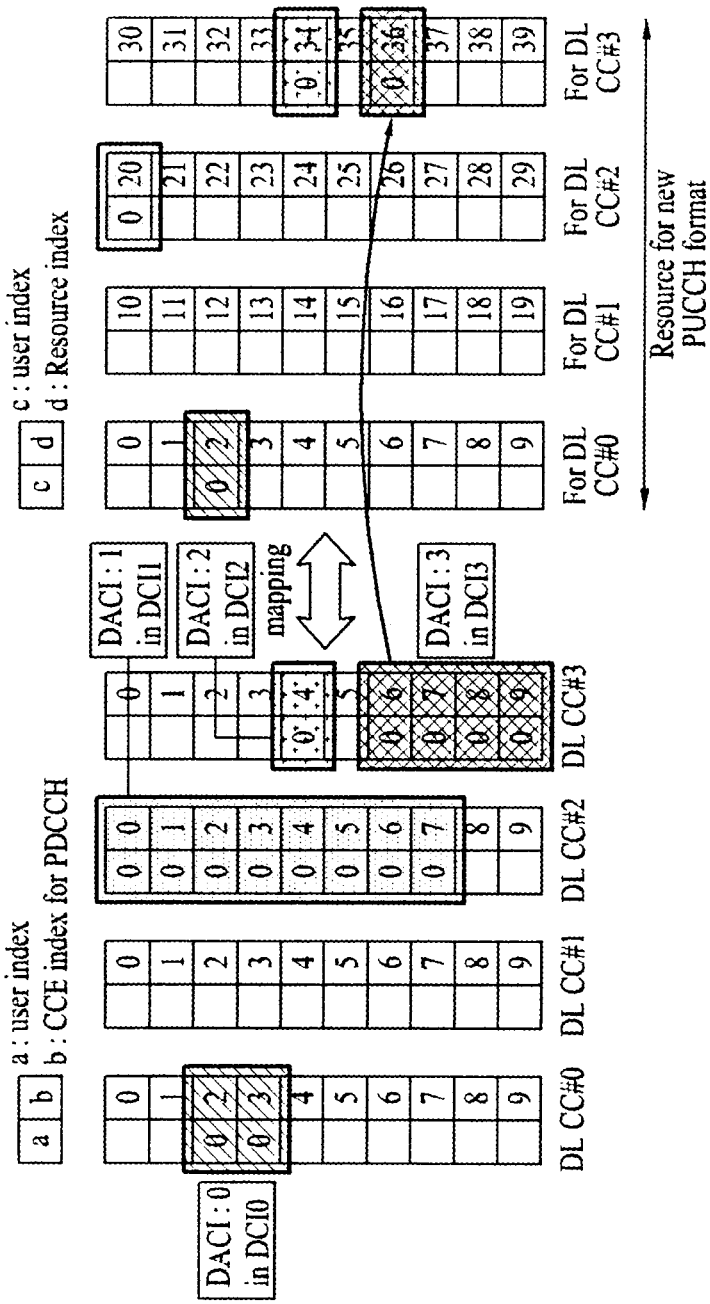

FIG. 56 illustrates a case in which 2 PDCCHs are transmitted through DL CC#3 on the assumption that the DACI is counted from a low CCE index to a high CCE index when a plurality of PDCCHs is transmitted through one DL CC. In this case, UE#0 transmits ACK/NACK information through PUCCH resource 36 corresponding to the lowest CCE index 6 of a PDCCH having the largest DACI value 3 from among detected PDCCHs.

Figure 57:
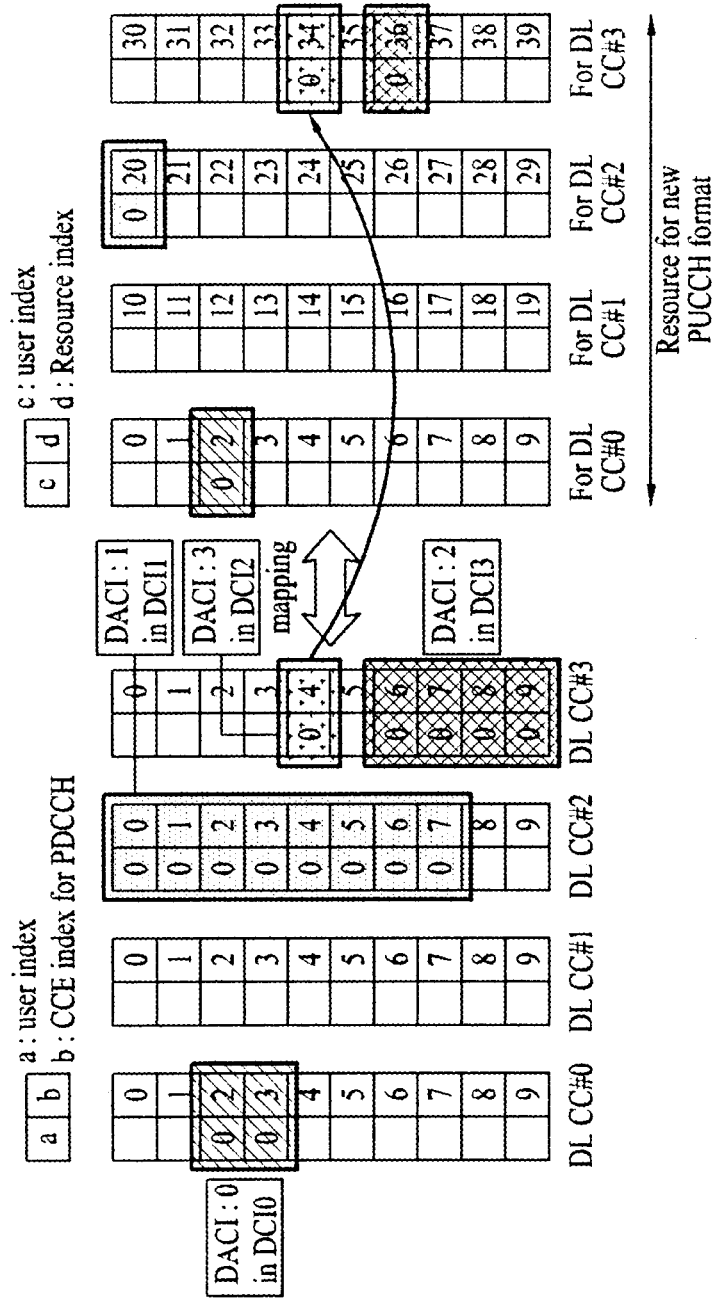

FIG. 57 illustrates a case in which 2 PDCCHs are transmitted through DL CC#3 and a DCI having a lower CCE index has a larger DACI value. In this case, UE#0 transmits ACK/NACK information through PUCCH resource 34 corresponding to the lowest CCE index 4 of a PDCCH having the largest DACI value 3 from among detected PDCCHs.

A description will be given of a case in which PUCCHs for DL CCs are defined such that the PUCCHs are shared with reference to FIGS. 58, 59 and 60.

Figure 58:
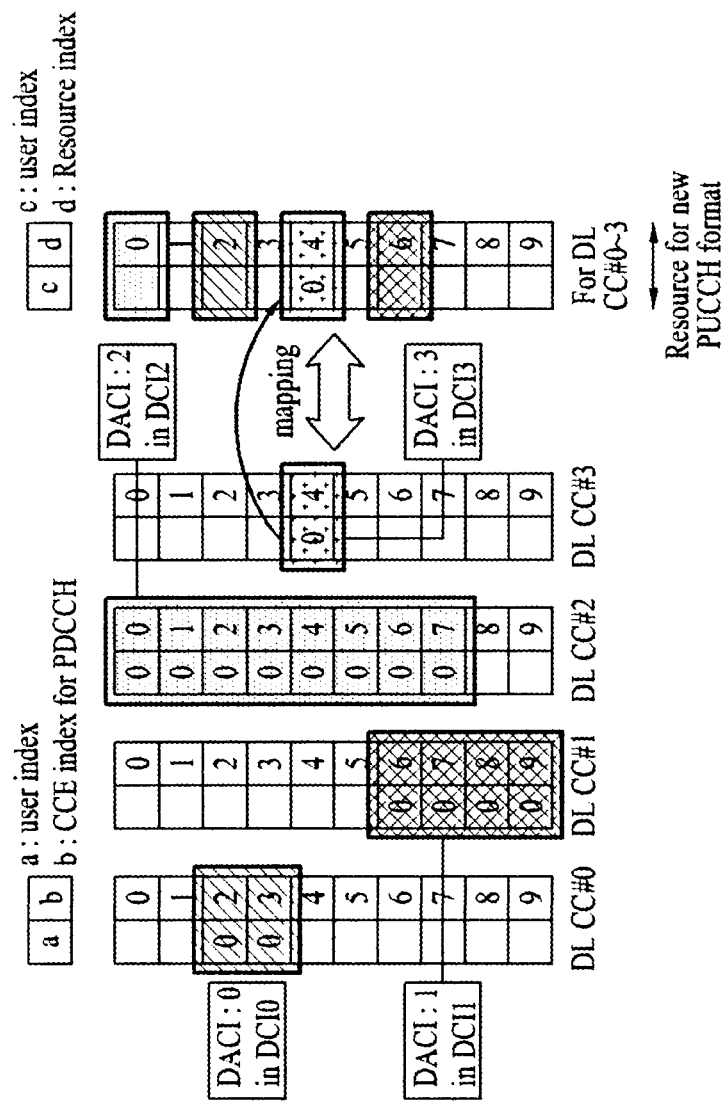

FIG. 58 illustrates a case in which UE#0 successfully decodes all 4 PDCCHs for DL CCs while the PDCCHs are shared. In this case, UE#0 transmits ACK/NACK information through PUCCH resource 4 corresponding to the lowest CCE index 4 of a PDCCH having the largest DACI value 3 from among the detected PDCCHs.

Figure 59:
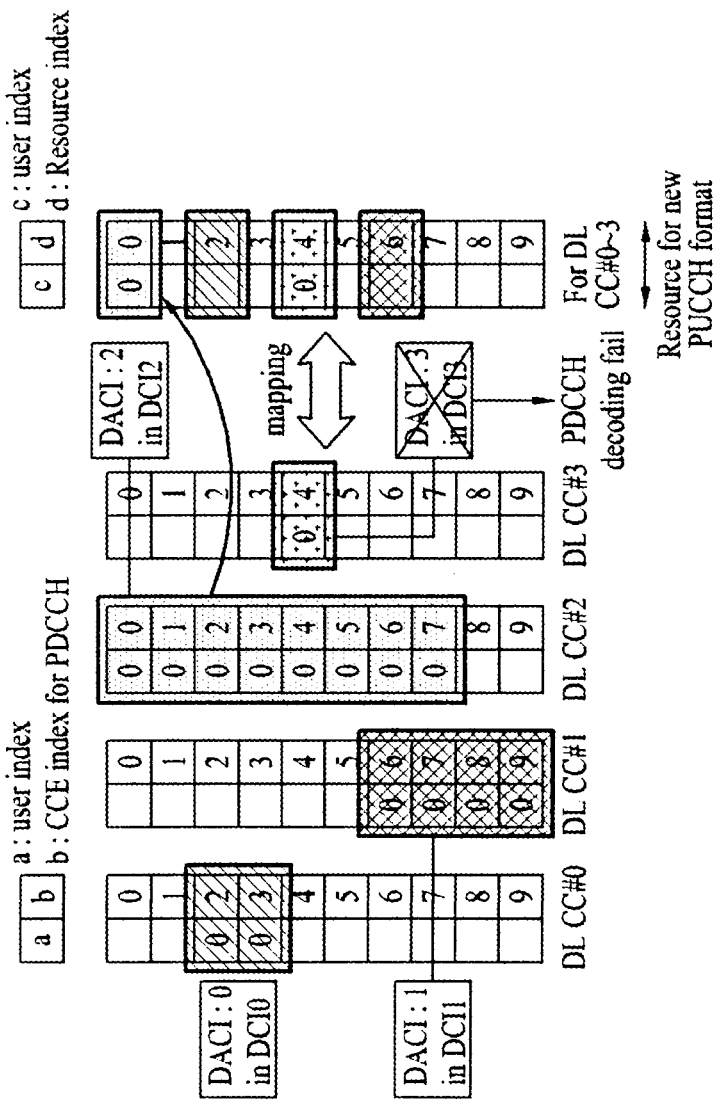

FIG. 59 illustrates a case in which UE#0 fails to decode DCI3 with DACI=3. In this case, UE#0 transmits ACK/NACK information through PUCCH resource 0 corresponding to the lowest CCE index 0 of a PDCCH having the largest DACI value 2 from among the detected PDCCHs. Accordingly, the BS can recognize that DTX is generated for DCI3.

Figure 60:
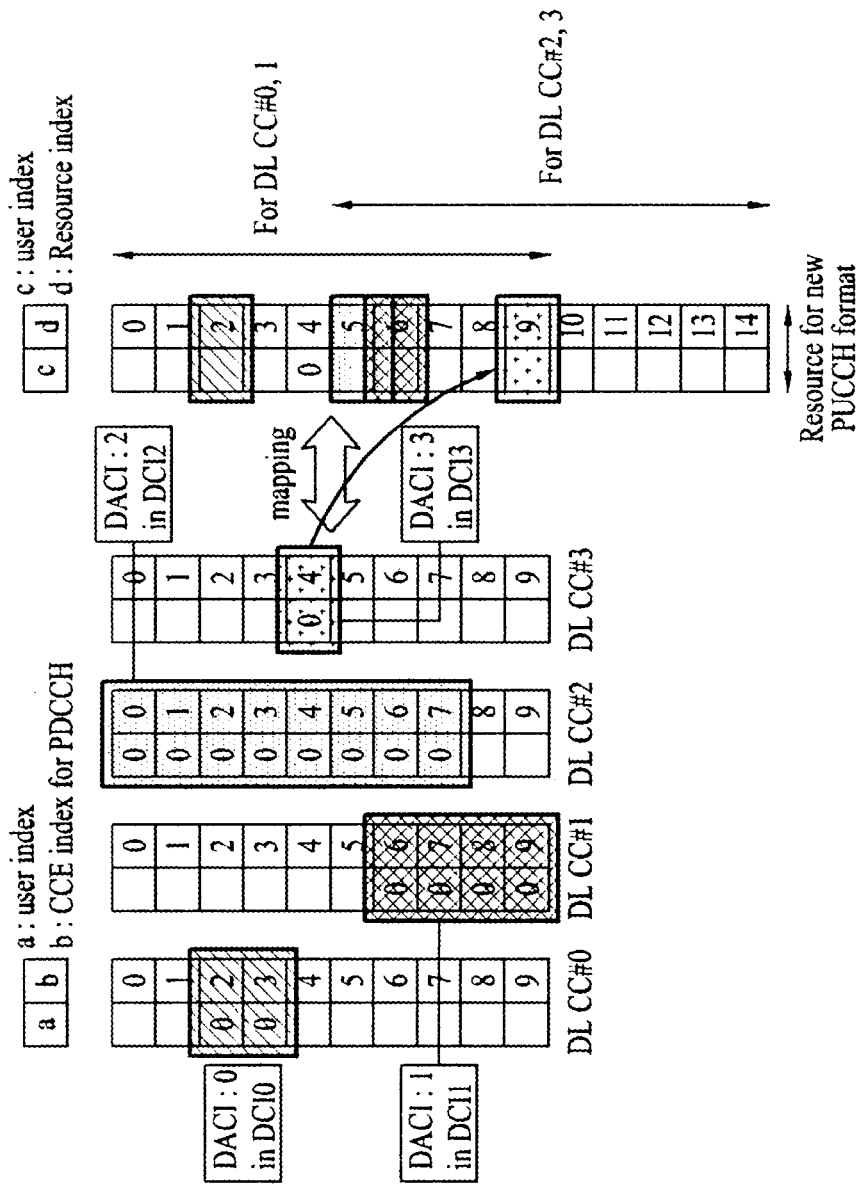

FIG. 60 illustrates a case in which PUCCH resources for DL CCs partially overlap. UE#0 transmits ACK/NACK information in the same manner as the above cases.

Another scheme for solving a DTX problem for the last DACI value will now be described. Specifically, a scheme of simultaneously using a parameter indicating a PDCCH counter value and a parameter indicating the number of PDCCHs is proposed.

For example, if DACI0 serves as a PDCCH counter (e.g. DACI counts 0 to 7 when it is 3 bits), DACI1 can transmit information indicating the number of allocated PDCCHs (or PDSCHs) (e.g. DACI transmits 1 to 8 when it is 3 bits; 0 need not be transmitted). For example, when 4 PDCCHs are transmitted, each PDCCH may carry the following information.

DCI0: DACI0=0, DACI1=4
DCI1: DACI0=1, DACI1=4
DCI2: DACI0=2, DACI1=4
DCI3: DACI0=3, DACI1=4

Here, DACI1 can be additionally defined with DACI0. Alternatively, DACI1 may be transmitted over one or more of the PDCCHs. Alternatively, if one of DCIs is limited such that cross-carrier scheduling is not permitted therefor, the CIF field of the corresponding DCI can be used to carry DACI1. Alternatively, DACI0 and DACI1 can be transmitted through RRC signaling or broadcasting signaling.

Another method for solving the DTX problem in the last DACI value uses RRC signaling. In this method, a specific UE can be assigned a unique PUCCH resource through RRC signaling. The PUCCH resource may be a resource shared by multiple UEs or a resource allocated for SPS or ACK/NACK repetition. When DTX is generated in at least one PDCCH, the specific UE transmits ACK/NACK information through the PUCCH resource assigned thereto through RRC signaling. When no DTX is generated, the UE performs dynamic ACK/NACK operation in an implicit manner. Conversely, the UE may transmit the ACK/NACK information using the PUCCH resource allocated thereto when no DTX is generated and may implicitly perform the dynamic ACK/NACK operation when DTX is generated. In this case, the DACI may simply indicate the number of transmitted PDCCHs. When the DACI indicates the number of transmitted PDCCHs, it is impossible to know which PDCCH is lost and only whether or not DTX is generated can be recognized. The implicit rule for the dynamic ACK/NACK operation is to transmit HARQ-ACK/NACK information using a PUCCH resource corresponding to the lowest CCE index of a PDCCH having the largest CCE index among PDCCH(s) of the largest CC index, a PUCCH resource corresponding to the lowest CCE index of a PDCCH having the lowest CCE index among PDCCH(s) of the largest CC index, a PUCCH resource corresponding to the lowest CCE index of a PDCCH having the lowest CCE index, among PDCCH(s) of the lowest CC index, or a PUCCH resource corresponding to the lowest CCE index of a PDCCH having the largest CCE index among PDCCH(s) of the lowest CC index.

If the DACI is defined as a counter, it is possible to perform implicit mapping using the lowest CCE index of a PDCCH having the largest DACI value.

Figure 61:
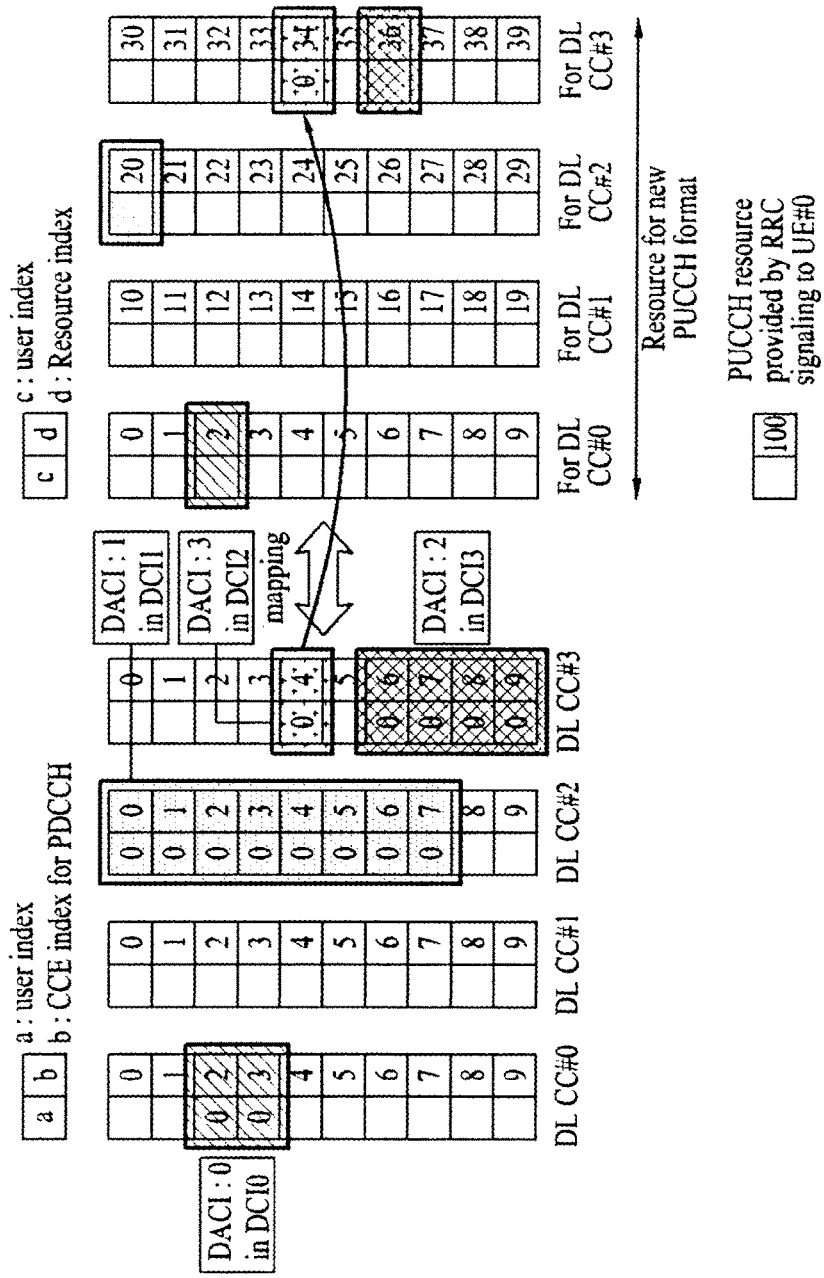

FIG. 61 illustrates a case in which a PUCCH resource is defined by the lowest CCE index of a PDCCH having the lowest CCE index among PDCCH(s) of the largest CC index, according to the implicit rule and DTX is not generated for any PDCCH. Since DTX is not generated, UE#0 transmits ACK/NACK information through PUCCH resource 34 corresponding to the lowest CCE index 4 of a PDCCH having the largest DACI value 3 from among detected PDCCHs. The ACK/NACK information may be information bundled for control information of all PDSCHs.

Figure 62:
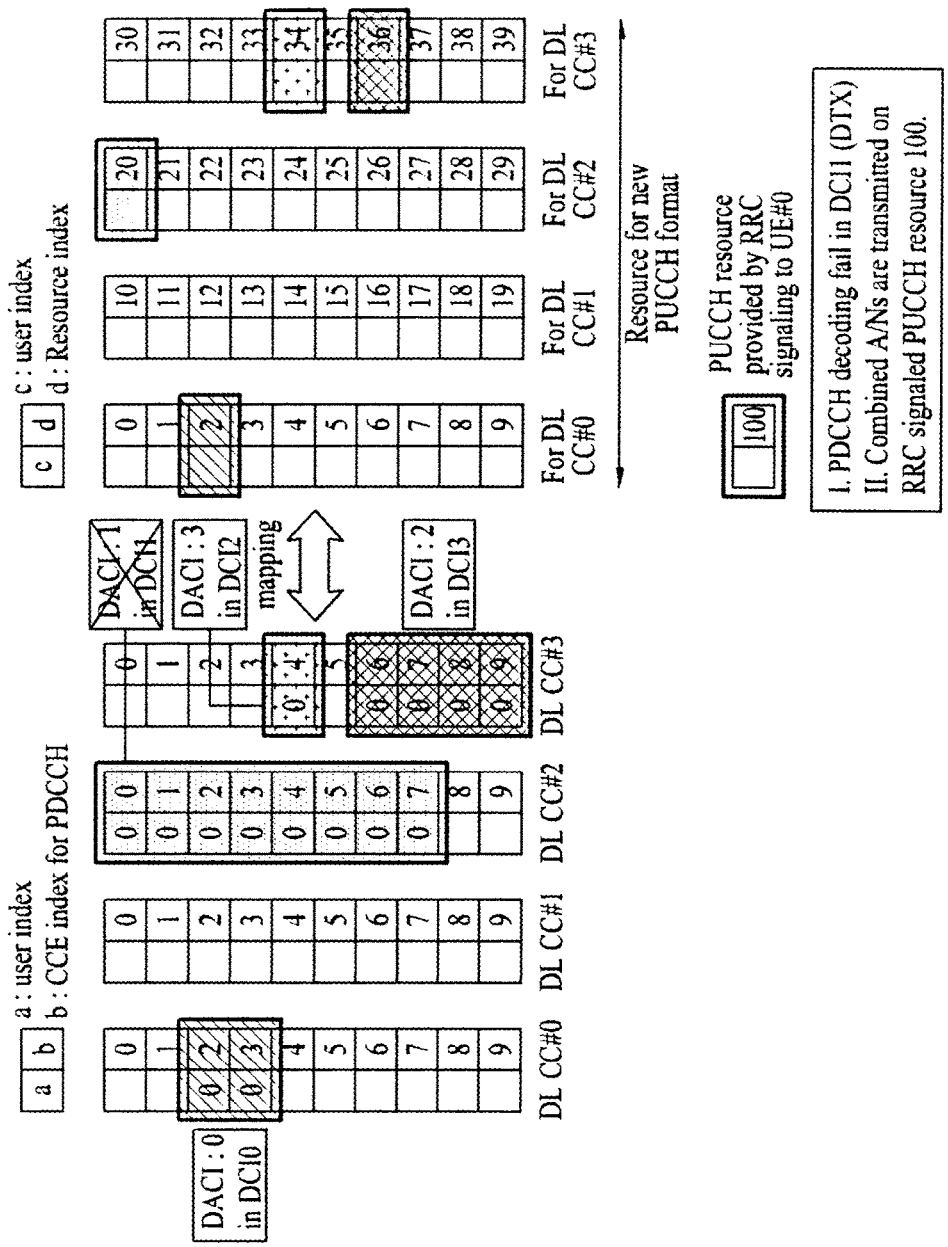

FIG. 62 illustrates a case in which DTX is generated for DCI1. In this case, UE#0 recognizes that DTX is generated for a DCI corresponding to DACI=2 because UE#0 has successfully performed decoding for DACI=0, DACI=1 and DACI=3. UE#0 transmits ACK/NACK information through RRC-signaled PUCCH resource 100 because DTX has been generated. The ACK/NACK information may be information bundled for control information of all PDSCHs.

Figure 63:
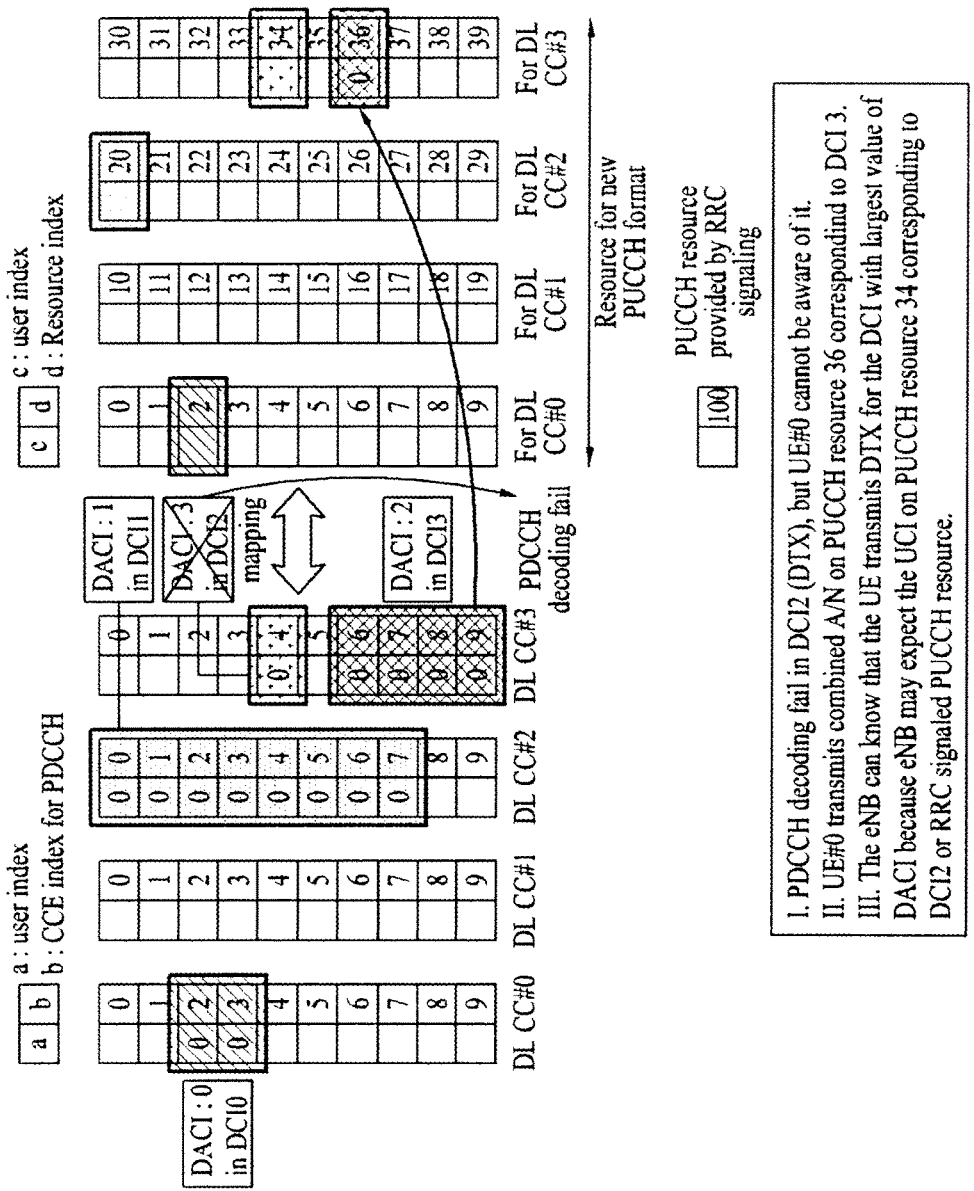

FIG. 63 illustrates a case in which UE#0 fails to decode a PDCCH having the last DACI value. In this case, UE#0 cannot be aware of whether DTX is generated for a DCI corresponding to DACI=3. Accordingly, UE#0 recognizes that DTX is not generated and transmits ACK/NACK information through PUCCH resource 36 corresponding to the lowest CCE index 6 of a PDCCH having the largest DACI value 2 from among detected PDCCHs. The BS expects to receive ACK/NACK information (combined ACK/NACK) through PUCCH resource 34 corresponding to DCI2, which corresponds to the PDCCH having the largest DACI value, or RRC-signaled PUCCH resource 100. However, UE#0 transmits the ACK/NACK information through PUCCH resource 36 corresponding to DCI3, and thus the BS recognizes that DTX is generated for DCI2.

The above-mentioned methods may be combined. For example, the format adaptation and the schemes for detecting DTX (i.e. the scheme of using the CCE index of the PDCCH carrying the last DACI value, the scheme of simultaneously transmitting DACI0 and DACI1, and the scheme of using RRC signaling) can be combined.

Figure 64:
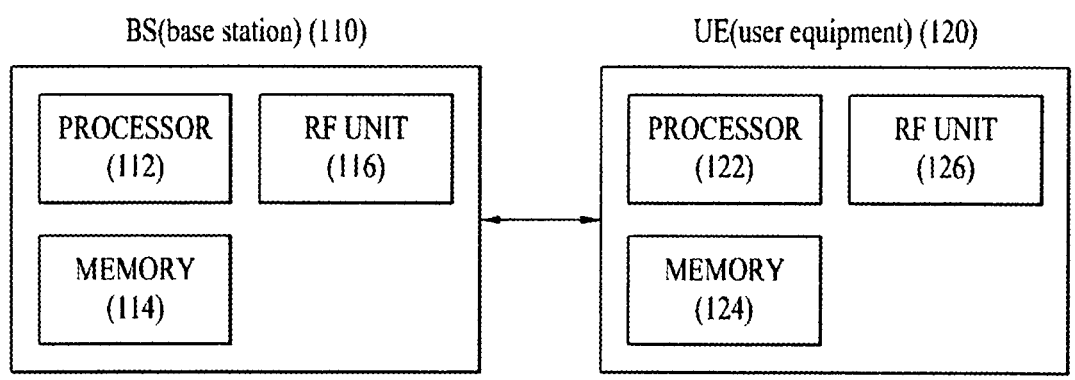
FIG. 64 illustrates configurations of a BS and a UE applicable to the present invention.

FIG. 64 is a block diagram showing configurations of a BS and a UE.

Referring to FIG. 64, a wireless communication system includes a BS 110 and a UE 120. The BS includes a processor 112, a memory 114, an RF unit 116. The processor 112 may be configured to implement the procedures and/or methods proposed by the present invention. The memory 114 is connected to the processor 112 and stores information related to operations of the processor 112. The RF unit 116 is connected to the processor 112, transmits and/or receives an RF signal. The UE 120 includes a processor 122, a memory 124, and an RF unit 126. The processor 112 may be configured to implement the procedures and/or methods proposed by the present invention. The memory 124 is connected to the processor 122 and stores information related to operations of the processor 122. The RF unit 126 is connected to the processor 122, transmits and/or receives an RF signal. The BS 110 and/or UE 120 may include a single antenna or multiple antennas.

The embodiments of the present invention described hereinbelow are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It will be obvious to those skilled in the art that claims that are not explicitly cited in each other in the appended claims may be presented in combination as an embodiment of the present invention or included as a new claim by a subsequent amendment after the application is filed.

In the embodiments of the present invention, a description is made centering on a data transmission and reception relationship among a BS, a relay, and an MS. In some cases, a specific operation described as performed by the BS may be performed by an upper node of the BS. Namely, it is apparent that, in a network comprised of a plurality of network nodes including a BS, various operations performed for communication with an MS may be performed by the BS, or network nodes other than the BS. The term 'BS' may be replaced with the term 'fixed station', 'Node B', 'enhanced Node B (eNode B or eNB)', 'access point', etc. The term 'UE' may be replaced with the term 'Mobile Station (MS)', 'Mobile Subscriber Station (MSS)', 'mobile terminal', etc.

The embodiments of the present invention may be achieved by various means, for example, hardware, firmware, software, or a combination thereof. In a hardware configuration, the methods according to the embodiments of the present invention may be achieved by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, microprocessors, etc.

In a firmware or software configuration, the embodiments of the present invention may be implemented in the form of a module, a procedure, a function, etc. For example, software code may be stored in a memory unit and executed by a processor. The memory unit is located at the interior or exterior of the processor and may transmit and receive data to and from the processor via various known means.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The present invention can be used for a UE, a BS or other devices in a wireless communication system. Specifically, the present invention is applicable to a method for transmitting uplink control information and an apparatus therefor.

The invention claimed is:

1. A method for transmitting uplink control information at a User Equipment (UE) in a wireless communication system, the method comprising:
   detecting one or more Physical Downlink Shared Channels (PDSCHs) in a subframe; and
   transmitting ACK/NACK information for the one or more PDSCHs via one of a first Physical Uplink Control Channel (PUCCH) format and a second PUCCH format,
   wherein if only a single PDSCH is detected on a Primary CC (PCC), the ACK/NACK information is transmitted using the first PUCCH format,
   wherein if any one of the one or more PDSCHs is detected at least on a secondary CC (SCC), the ACK/NACK information is transmitted using the second PUCCH format, and
   wherein, for the second PUCCH format, the 24 modulation symbols are equally divided into 2 slots, and the 12 modulation symbols of each slot are spread over plural SC-FDMA symbols.

2. The method of claim 1, wherein the single PDSCH includes a single PDSCH with a corresponding PDCCH, or a single PDSCH without a corresponding PDCCH.

3. The method of claim 1, wherein the first PUCCH format carries only one modulation symbol, and the second PUCCH format carries 24 modulation symbols.

4. The method of claim 3, wherein, for the first PUCCH format, the one modulation symbol is spread over 12 subcarriers of a Single Carrier Frequency Division Multiple Access (SC-FDMA) symbol using a CAZAC sequence.

5. The method of claim 1, wherein the first PUCCH format is a PUCCH format 1a/1b, and the second PUCCH format is a PUCCH format 3.

6. A User Equipment (UE) in a wireless communication system, and the UE comprising:
   a transmitter and a receiver; and
   a processor, operatively coupled to the transmitter and the receiver,
   wherein the processor is configured to:
      detect one or more Physical Downlink Shared Channels (PDSCHs) in a subframe, and
      transmit ACK/NACK information for the one or more PDSCHs via one of a first Physical Uplink Control Channel (PUCCH) format and a second PUCCH format,
   wherein if only a single PDSCH is detected on a Primary CC (PCC), the ACK/NACK information is transmitted using the first PUCCH format,
   wherein if any one of the one or more PDSCHs is detected at least on a secondary CC (SCC), the ACK/NACK information is transmitted using the second PUCCH format, and
   wherein, for the second PUCCH format, the 24 modulation symbols are equally divided into 2 slots, and the 12 modulation symbols of each slot are spread over plural SC-FDMA symbols.

7. The UE of claim 6, wherein the single PDSCH includes a single PDSCH with a corresponding PDCCH, or a single PDSCH without a corresponding PDCCH.

8. The UE of claim 6, wherein the first PUCCH format carries only one modulation symbol, and the second PUCCH format carries 24 modulation symbols.

9. The UE of claim 8, wherein, for the first PUCCH format, the one modulation symbol is spread over 12 subcarriers of a Single Carrier Frequency Division Multiple Access (SC-FDMA) symbol using a CAZAC sequence.

10. The UE of claim 6, wherein the first PUCCH format is a PUCCH format 1a/1b, and the second PUCCH format is a PUCCH format 3.

* * * * *